US011029566B2

(12) United States Patent
Robinson et al.

(10) Patent No.: US 11,029,566 B2
(45) Date of Patent: Jun. 8, 2021

(54) DIFFUSER FOR PRIVACY DISPLAY

(71) Applicant: RealD Spark, LLC, Beverly Hills, CA (US)

(72) Inventors: Michael G. Robinson, Boulder, CO (US); Robert A. Ramsey, Boulder, CO (US); Graham J. Woodgate, Henley-on-Thames (GB)

(73) Assignee: RealD Spark, LLC, Beverly Hills, CA (US)

( * ) Notice: Subject to any disclaimer, the term of this patent is extended or adjusted under 35 U.S.C. 154(b) by 0 days.

(21) Appl. No.: 16/786,329

(22) Filed: Feb. 10, 2020

(65) Prior Publication Data

US 2020/0257153 A1 Aug. 13, 2020

Related U.S. Application Data

(60) Provisional application No. 62/804,382, filed on Feb. 12, 2019.

(51) Int. Cl.
*G02F 1/13363* (2006.01)
*G02F 1/1335* (2006.01)
*G02F 1/13357* (2006.01)

(52) U.S. Cl.
CPC .... *G02F 1/13363* (2013.01); *G02F 1/133504* (2013.01); *G02F 1/133528* (2013.01);
(Continued)

(58) Field of Classification Search
CPC .................................................. G02F 1/13363
See application file for complete search history.

(56) References Cited

U.S. PATENT DOCUMENTS 4,621,898 A 11/1986 Cohen
4,974,941 A 12/1990 Gibbons et al.
(Continued)

FOREIGN PATENT DOCUMENTS

CA 2222313 A1 6/1998
CN 104133292 A 11/2014
(Continued)

OTHER PUBLICATIONS

Adachi, et al. "P-228L: Late-News Poster: Controllable Viewing-Angle Displays using a Hybrid Aligned Nematic Liquid Crystal Cell", ISSN, SID 2006 Digest, pp. 705-708.
(Continued)

*Primary Examiner* — Sang V Nguyen
(74) *Attorney, Agent, or Firm* — Penny L. Lowry

(57) ABSTRACT

A privacy display comprises a polarised output spatial light modulator, reflective polariser, plural polar control retarders and a polariser. A birefringent surface relief diffuser structure is arranged to transmit light from the display with high transparency and provide diffuse reflection of ambient light to head-on display users. In a privacy mode of operation, on-axis light from the spatial light modulator is directed without loss and with low diffusion, whereas off-axis light has reduced luminance and increased diffusion. Further, overall display reflectivity is reduced for on-axis reflections of ambient light, while reflectivity is increased for off-axis light. The visibility of the display to off-axis snoopers is reduced by means of luminance reduction, increased frontal reflectivity and diffusion of ambient light. In a public mode of operation, the liquid crystal retardance is adjusted so that off-axis luminance and reflectivity are unmodified.

7 Claims, 29 Drawing Sheets

(52) U.S. Cl.
CPC .. *G02F 1/133602* (2013.01); *G02F 1/133618* (2021.01); *G02F 2202/40* (2013.01); *G02F 2203/12* (2013.01)

(56) References Cited

U.S. PATENT DOCUMENTS

| | | |
|---|---|---|
| 5,005,108 A | 4/1991 | Pristash et al. |
| 5,035,491 A | 7/1991 | Kawagishi et al. |
| 5,658,490 A | 8/1997 | Sharp et al. |
| 5,715,028 A | 2/1998 | Abileah et al. |
| 5,808,784 A | 9/1998 | Ando et al. |
| 5,835,166 A | 11/1998 | Hall et al. |
| 5,894,361 A | 4/1999 | Yamazaki et al. |
| 6,055,103 A | 4/2000 | Woodgate et al. |
| 6,099,758 A | 8/2000 | Verrall et al. |
| 6,144,433 A | 11/2000 | Tillin et al. |
| 6,204,904 B1 | 3/2001 | Tillin et al. |
| 6,222,672 B1 | 4/2001 | Towler et al. |
| 6,392,727 B1 | 5/2002 | Larson et al. |
| 6,437,915 B2 | 8/2002 | Moseley et al. |
| 7,067,985 B2 | 6/2006 | Adachi |
| 7,163,319 B2 | 1/2007 | Kuo et al. |
| 7,227,602 B2 | 6/2007 | Jeon et al. |
| 7,524,542 B2 | 4/2009 | Kim et al. |
| 7,528,893 B2 | 5/2009 | Schultz et al. |
| 7,528,913 B2 | 5/2009 | Kobayashi |
| 7,633,586 B2 | 12/2009 | Winlow et al. |
| 7,660,047 B1 | 2/2010 | Travis et al. |
| 7,766,534 B2 | 8/2010 | Iwasaki |
| 7,834,834 B2 | 11/2010 | Takatani et al. |
| 7,970,246 B2 | 6/2011 | Travis et al. |
| 7,991,257 B1 | 8/2011 | Coleman |
| 8,098,350 B2 | 1/2012 | Sakai et al. |
| 8,154,686 B2 | 4/2012 | Mather et al. |
| 8,237,876 B2 | 8/2012 | Tan et al. |
| 8,249,408 B2 | 8/2012 | Coleman |
| 8,262,271 B2 | 9/2012 | Tillin et al. |
| 8,646,931 B2 | 2/2014 | Choi et al. |
| 8,801,260 B2 | 8/2014 | Urano et al. |
| 8,939,595 B2 | 1/2015 | Choi et al. |
| 8,973,149 B2 | 3/2015 | Buck |
| 9,195,087 B2 | 11/2015 | Terashima |
| 9,274,260 B2 | 3/2016 | Urano et al. |
| 9,304,241 B2 | 4/2016 | Wang et al. |
| 9,324,234 B2 | 4/2016 | Ricci et al. |
| 9,448,355 B2 | 9/2016 | Urano et al. |
| 9,501,036 B2 | 11/2016 | Kang et al. |
| 9,519,153 B2 | 12/2016 | Robinson et al. |
| 10,054,732 B2 | 8/2018 | Robinson et al. |
| 10,126,575 B1 | 11/2018 | Robinson et al. |
| 10,303,030 B2 | 5/2019 | Robinson et al. |
| 10,401,638 B2 | 9/2019 | Robinson et al. |
| 10,488,705 B2 | 11/2019 | Xu et al. |
| 10,649,248 B1 | 5/2020 | Jiang et al. |
| 10,649,259 B2 | 5/2020 | Lee et al. |
| 2002/0024529 A1 | 2/2002 | Miller et al. |
| 2002/0171793 A1 | 11/2002 | Sharp et al. |
| 2003/0089956 A1 | 5/2003 | Allen et al. |
| 2003/0107686 A1 | 6/2003 | Sato et al. |
| 2004/0015729 A1 | 1/2004 | Elms et al. |
| 2004/0100598 A1 | 5/2004 | Adachi et al. |
| 2004/0125430 A1 | 7/2004 | Kasajima et al. |
| 2004/0145703 A1 | 7/2004 | O'Connor et al. |
| 2004/0240777 A1* | 12/2004 | Woodgate ............ G02B 30/25 385/16 |
| 2005/0111100 A1 | 5/2005 | Mather et al. |
| 2005/0117186 A1 | 6/2005 | Li et al. |
| 2005/0157225 A1 | 7/2005 | Toyooka et al. |
| 2005/0190326 A1 | 9/2005 | Jeon et al. |
| 2005/0190329 A1 | 9/2005 | Okumura |
| 2005/0219693 A1 | 10/2005 | Hartkop et al. |
| 2006/0082702 A1 | 4/2006 | Jacobs et al. |
| 2006/0203162 A1 | 9/2006 | Ito et al. |
| 2006/0215244 A1 | 9/2006 | Yosha et al. |
| 2006/0244884 A1 | 11/2006 | Jeon et al. |
| 2006/0262258 A1 | 11/2006 | Wang et al. |
| 2006/0262558 A1 | 11/2006 | Cornelissen |
| 2006/0268207 A1 | 11/2006 | Tan et al. |
| 2006/0285040 A1 | 12/2006 | Kobayashi |
| 2007/0035964 A1 | 2/2007 | Olczak |
| 2007/0047254 A1 | 3/2007 | Schardt et al. |
| 2007/0064163 A1 | 3/2007 | Tan et al. |
| 2007/0139772 A1 | 6/2007 | Wang |
| 2007/0223251 A1 | 9/2007 | Liao |
| 2007/0285775 A1 | 12/2007 | Lesage et al. |
| 2008/0068329 A1 | 3/2008 | Shestak et al. |
| 2008/0158491 A1 | 7/2008 | Zhu et al. |
| 2008/0285310 A1 | 11/2008 | Aylward et al. |
| 2008/0316198 A1 | 12/2008 | Fukushima et al. |
| 2009/0040426 A1 | 2/2009 | Mather et al. |
| 2009/0085894 A1 | 4/2009 | Gandhi et al. |
| 2009/0086509 A1 | 4/2009 | Omori et al. |
| 2009/0128735 A1 | 5/2009 | Larson et al. |
| 2009/0128746 A1 | 5/2009 | Kean et al. |
| 2009/0174843 A1 | 7/2009 | Sakai et al. |
| 2009/0213298 A1 | 8/2009 | Mimura et al. |
| 2009/0213305 A1 | 8/2009 | Ohmuro et al. |
| 2009/0244415 A1 | 10/2009 | Ide |
| 2010/0002296 A1 | 1/2010 | Choi et al. |
| 2010/0128200 A1 | 5/2010 | Morishita et al. |
| 2010/0149459 A1 | 6/2010 | Yabuta et al. |
| 2010/0177113 A1 | 7/2010 | Gay et al. |
| 2010/0205667 A1 | 8/2010 | Anderson et al. |
| 2010/0238376 A1 | 9/2010 | Sakai et al. |
| 2010/0283930 A1 | 11/2010 | Park et al. |
| 2010/0289989 A1 | 11/2010 | Adachi et al. |
| 2010/0295755 A1 | 11/2010 | Broughton et al. |
| 2010/0328438 A1 | 12/2010 | Ohyama et al. |
| 2011/0018860 A1 | 1/2011 | Parry-Jones et al. |
| 2011/0032483 A1 | 2/2011 | Hruska et al. |
| 2011/0241983 A1 | 10/2011 | Chang |
| 2011/0286222 A1 | 11/2011 | Coleman |
| 2011/0321143 A1 | 12/2011 | Angaluri et al. |
| 2012/0002121 A1 | 1/2012 | Pirs et al. |
| 2012/0086875 A1 | 4/2012 | Yokota |
| 2012/0127573 A1 | 5/2012 | Robinson et al. |
| 2012/0147280 A1 | 6/2012 | Osterman et al. |
| 2012/0235891 A1 | 9/2012 | Nishitani et al. |
| 2012/0294037 A1 | 11/2012 | Holman et al. |
| 2012/0299913 A1 | 11/2012 | Robinson et al. |
| 2012/0314145 A1 | 12/2012 | Robinson |
| 2012/0327101 A1 | 12/2012 | Blixt et al. |
| 2013/0039062 A1 | 2/2013 | Vintner et al. |
| 2013/0100097 A1 | 4/2013 | Martin |
| 2013/0107174 A1 | 5/2013 | Yun et al. |
| 2013/0128165 A1 | 5/2013 | Lee et al. |
| 2013/0242231 A1 | 9/2013 | Kurata et al. |
| 2013/0278544 A1 | 10/2013 | Cok |
| 2013/0293793 A1 | 11/2013 | Lu |
| 2013/0300985 A1 | 11/2013 | Bulda |
| 2013/0307831 A1 | 11/2013 | Robinson et al. |
| 2013/0321340 A1 | 12/2013 | Seo et al. |
| 2013/0328866 A1 | 12/2013 | Woodgate et al. |
| 2014/0009508 A1 | 1/2014 | Woodgate et al. |
| 2014/0022619 A1 | 1/2014 | Woodgate et al. |
| 2014/0071382 A1 | 3/2014 | Scardato |
| 2014/0098418 A1 | 4/2014 | Lin |
| 2014/0111760 A1 | 4/2014 | Guo et al. |
| 2014/0132887 A1 | 5/2014 | Kurata |
| 2014/0201844 A1 | 7/2014 | Buck |
| 2014/0211125 A1 | 7/2014 | Kurata |
| 2014/0232960 A1 | 8/2014 | Schwartz et al. |
| 2014/0240344 A1 | 8/2014 | Tomono et al. |
| 2014/0240828 A1 | 8/2014 | Robinson et al. |
| 2014/0268358 A1 | 9/2014 | Kusaka et al. |
| 2014/0286043 A1 | 9/2014 | Sykora et al. |
| 2014/0289835 A1 | 9/2014 | Varshaysky et al. |
| 2014/0361990 A1 | 12/2014 | Leister |
| 2015/0055366 A1 | 2/2015 | Chang et al. |
| 2015/0116212 A1 | 4/2015 | Freed et al. |
| 2015/0177447 A1 | 6/2015 | Woodgate et al. |
| 2015/0177563 A1 | 6/2015 | Cho et al. |
| 2015/0185398 A1 | 7/2015 | Chang et al. |
| 2015/0205157 A1 | 7/2015 | Sakai et al. |

(56) References Cited

U.S. PATENT DOCUMENTS

| | | |
|---|---|---|
| 2015/0268479 A1 | 9/2015 | Woodgate et al. |
| 2015/0286061 A1 | 10/2015 | Seo et al. |
| 2015/0286817 A1 | 10/2015 | Haddad et al. |
| 2015/0301400 A1 | 10/2015 | Kimura et al. |
| 2015/0346417 A1 | 12/2015 | Powell |
| 2015/0346532 A1 | 12/2015 | Do et al. |
| 2015/0378085 A1 | 12/2015 | Robinson et al. |
| 2016/0103264 A1 | 4/2016 | Lee et al. |
| 2016/0132721 A1 | 5/2016 | Bostick et al. |
| 2016/0147074 A1 | 5/2016 | Kobayashi et al. |
| 2016/0154259 A1 | 6/2016 | Kim et al. |
| 2016/0216420 A1 | 7/2016 | Gaides et al. |
| 2016/0216540 A1 | 7/2016 | Cho et al. |
| 2016/0224106 A1 | 8/2016 | Liu |
| 2016/0238869 A1 | 8/2016 | Osterman et al. |
| 2016/0334898 A1 | 11/2016 | Kwak et al. |
| 2016/0349444 A1 | 12/2016 | Robinson et al. |
| 2016/0356943 A1 | 12/2016 | Choi et al. |
| 2016/0357046 A1 | 12/2016 | Choi et al. |
| 2017/0003436 A1 | 1/2017 | Inoue et al. |
| 2017/0031206 A1 | 2/2017 | Smith et al. |
| 2017/0090103 A1 | 3/2017 | Holman |
| 2017/0092187 A1 | 3/2017 | Bergquist |
| 2017/0092229 A1 | 3/2017 | Greenebaum et al. |
| 2017/0115485 A1 | 4/2017 | Saito et al. |
| 2017/0123241 A1 | 5/2017 | Su et al. |
| 2017/0139110 A1 | 5/2017 | Woodgate et al. |
| 2017/0168633 A1 | 6/2017 | Kwak et al. |
| 2017/0205558 A1 | 7/2017 | Hirayama et al. |
| 2017/0236494 A1 | 8/2017 | Sommerlade et al. |
| 2017/0269283 A1 | 9/2017 | Wang et al. |
| 2017/0269285 A1 | 9/2017 | Hirayama et al. |
| 2017/0329399 A1 | 11/2017 | Azam et al. |
| 2017/0336661 A1 | 11/2017 | Harrold et al. |
| 2017/0339398 A1 | 11/2017 | Woodgate et al. |
| 2017/0343715 A1 | 11/2017 | Fang et al. |
| 2018/0014007 A1 | 1/2018 | Brown |
| 2018/0052346 A1 | 2/2018 | Sakai et al. |
| 2018/0082068 A1 | 3/2018 | Lancioni et al. |
| 2018/0095581 A1 | 4/2018 | Hwang et al. |
| 2018/0113334 A1 | 4/2018 | Fang et al. |
| 2018/0188576 A1 | 7/2018 | Xu et al. |
| 2018/0188603 A1 | 7/2018 | Fang et al. |
| 2018/0196275 A1 | 7/2018 | Robinson et al. |
| 2018/0210243 A1 | 7/2018 | Fang et al. |
| 2018/0231811 A1 | 8/2018 | Wu |
| 2018/0252949 A1 | 9/2018 | Klippstein et al. |
| 2018/0259799 A1 | 9/2018 | Kroon |
| 2018/0259812 A1 | 9/2018 | Goda et al. |
| 2018/0321523 A1* | 11/2018 | Robinson .............. G02F 1/1343 |
| 2018/0321553 A1* | 11/2018 | Robinson .............. G02B 6/005 |
| 2018/0329245 A1 | 11/2018 | Robinson et al. |
| 2018/0364526 A1 | 12/2018 | Finnemeyer et al. |
| 2019/0086706 A1 | 3/2019 | Robinson et al. |
| 2019/0121173 A1 | 4/2019 | Robinson et al. |
| 2019/0154896 A1 | 5/2019 | Yanai |
| 2019/0196236 A1 | 6/2019 | Chen et al. |
| 2019/0197928 A1 | 6/2019 | Schubert et al. |
| 2019/0215509 A1 | 7/2019 | Woodgate et al. |
| 2019/0227366 A1 | 7/2019 | Harrold et al. |
| 2019/0235304 A1 | 8/2019 | Tamada et al. |
| 2019/0250458 A1 | 8/2019 | Robinson et al. |
| 2019/0293858 A1 | 9/2019 | Woodgate et al. |
| 2019/0293983 A1 | 9/2019 | Robinson et al. |
| 2019/0353944 A1 | 11/2019 | Acreman et al. |
| 2020/0159055 A1 | 5/2020 | Robinson et al. |
| 2020/0225402 A1 | 7/2020 | Ihas et al. |

FOREIGN PATENT DOCUMENTS

| | | |
|---|---|---|
| CN | 204740413 U | 11/2015 |
| CN | 209171779 U | 7/2019 |
| GB | 2418518 A | 3/2006 |
| GB | 2428100 A | 1/2007 |
| GB | 2482065 A | 1/2012 |
| GB | 2486935 B | 9/2013 |
| JP | H01130783 U | 9/1989 |
| JP | 2007273288 A | 10/2007 |
| KR | 20120011228 A | 2/2012 |
| KR | 101990286 B1 | 6/2019 |
| TW | M537663 U | 3/2017 |
| WO | 2005071449 A2 | 8/2005 |
| WO | 2010021926 A2 | 2/2010 |
| WO | 2014011328 A1 | 1/2014 |
| WO | 2015040776 A1 | 3/2015 |
| WO | 2015057625 A1 | 4/2015 |
| WO | 2015143227 A1 | 9/2015 |
| WO | 2015157184 A1 | 10/2015 |
| WO | 2015190311 A1 | 12/2015 |
| WO | 2018035492 A1 | 2/2018 |
| WO | 2018208618 A1 | 11/2018 |
| WO | 2019055755 A1 | 3/2019 |
| WO | 2019067846 A1 | 4/2019 |
| WO | 2019147762 A1 | 8/2019 |

OTHER PUBLICATIONS

Brudy et al., "Is Anyone Looking? Mitigating Shoulder Surfing on Public Displays through Awareness and Protection", Proceedings of the International Symposium on Persuasive Displays (Jun. 3, 2014), pp. 1-6.
CN201780030715.3 Notification of the First Office Action dated Jan. 21, 2020.
EP-16860628.3 Extended European Search Report of European Patent Office dated Apr. 26, 2019.
EP-17799963.8 Extended European Search Report of European Patent Office dated Oct. 9, 2019.
Gass, et al. "Privacy LCD Technology for Cellular Phones", Sharp Laboratories of Europe Ltd, Mobile LCD Group, Feb. 2007, pp. 45-49.
Ishikawa, T., "New Design for a Highly Collimating Turning Film", SID 06 Digest, pp. 514-517.
Kalantar, et al. "Backlight Unit With Double Surface Light Emission," J. Soc. Inf. Display, vol. 12, Issue 4, pp. 379-387 (Dec. 2004).
PCT/US2016/058695 International search report and written opinion of the international searching authority dated Feb. 28, 2017.
PCT/US2017/032734 International search report and written opinion of the international searching authority dated Jul. 27, 2017.
PCT/US2018/031206 International search report and written opinion of the international searching authority dated Jul. 20, 2018.
PCT/US2018/031218 International Preliminary Report on Patentability dated Nov. 21, 2019.
PCT/US2018/031218 International search report and written opinion of the international searching authority dated Jul. 19, 2018.
PCT/US2018/051021 International search report and written opinion of the international searching authority dated Nov. 21, 2018.
PCT/US2018/051027 International search report and written opinion of the international searching authority dated Nov. 30, 2018.
PCT/US2018/053328 International search report and written opinion of the international searching authority dated Nov. 30, 2018.
PCT/US2018/059249 International search report and written opinion of the international searching authority dated Jan. 3, 2019.
PCT/US2018/059256 International search report and written opinion of the international searching authority dated Jan. 3, 2019.
PCT/US2019/014889 International search report and written opinion of the international searching authority dated May 24, 2019.
PCT/US2019/014902 International search report and written opinion of the international searching authority dated Jun. 25, 2019.
PCT/US2019/023659 International search report and written opinion of the international searching authority dated Jun. 10, 2019.
PCT/US2019/038409 International search report and written opinion of the international searching authority dated Sep. 19, 2019.
PCT/US2019/038466 International search report and written opinion of the international searching authority dated Nov. 5, 2019.
PCT/US2019/042027 International search report and written opinion of the international searching authority dated Oct. 15, 2019.
PCT/US2019/054291 International search report and written opinion of the international searching authority dated Jan. 6, 2020.

(56) References Cited

OTHER PUBLICATIONS

PCT/US2019/059990 International search report and written opinion of the international searching authority dated Feb. 28, 2020.
PCT/US2019/066208 International search report and written opinion of the international searching authority dated Feb. 27, 2020.
PCT/US2020/017537 International search report and written opinion of the international searching authority dated Apr. 29, 2020.
Weindorf et al., "Active Circular Polarizer OLED E-Mirror", Proceedings of the Society for Information Display 25th Annual Symposium of Vehicle Displays, Livonia, MI, pp. 225-237, Sep. 25-26, 2018.
PCT/US2020/060155 International search report and written opinion of the international searching authority dated Feb. 5, 2021.
PCT/US2020/060191 International search report and written opinion of the international searching authority dated Feb. 8, 2021.
Robson, et al. "Spatial and temporal contrast-sensitivity functions of the visual system", J. Opt. Soc. Amer., vol. 56, pp. 1141-1142 (1966).
Simonyan et al., "Very Deep Convolutional Networks for Large-Scale Image Recognition", ICLR 2015.
PCT/US2020/063638 International search report and written opinion of the international searching authority dated Mar. 2, 2021.
PCT/US2020/053863 International search report and written opinion of the international searching authority dated Mar. 12, 2021.
PCT/US2020/064633 International search report and written opinion of the international searching authority dated Mar. 15, 2021.

\* cited by examiner

Transmission

Transmission

Lateral angle (°)

Reflectivity

Reflectivity

DIFFUSER FOR PRIVACY DISPLAY

TECHNICAL FIELD

This disclosure generally relates to illumination from light modulation devices, and more specifically relates to diffusing optical stacks for use in a display including a privacy display.

BACKGROUND

Privacy displays provide image visibility to a primary user that is typically in an on-axis position and reduced visibility of image content to a snooper, that is typically in an off-axis position. A privacy function may be provided by micro-louvre optical films that transmit a high luminance from a display in an on-axis direction with low luminance in off-axis positions, however such films are not switchable, and thus the display is limited to privacy only function.

Switchable privacy displays may be provided by control of the off-axis optical output.

Control may be provided by means of luminance reduction, for example by means of switchable backlights for a liquid crystal display (LCD) spatial light modulator. Display backlights in general employ waveguides and light sources arranged along at least one input edge of the waveguide. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. Pat. No. 9,519,153, which is herein incorporated by reference in its entirety.

Control of off-axis privacy may further be provided by means of contrast reduction, for example by adjusting the liquid crystal bias tilt in an In-Plane-Switching LCD.

BRIEF SUMMARY

According to a first aspect of the present disclosure there is provided a display device for use in ambient illumination, the display device comprising: a spatial light modulator arranged to output light; an output polariser arranged on the output side of the spatial light modulator, the output polariser being a linear polariser having an electric vector transmission direction; and an output diffuser structure arranged on the output side of the output polariser, the output diffuser structure comprising first and second structured output layers arranged on the output side of the output polariser, the first structured output layer being on the output side of the second structured output layer and having an output surface on the output side, and the first and second structured output layers comprising first and second transparent materials that have an interface surface therebetween, at least one of the first and second transparent materials being a birefringent material having an optical axis that is aligned parallel or orthogonal to the electric vector transmission direction of the output polariser, wherein: the output surface of the first structured output layer has a first surface relief profile; the interface surface has a second surface relief profile; the first surface relief profile and the second surface relief profile have the same, aligned shapes but with a relative scaling in amplitude along an axis normal to the plane of the output polariser so that the amplitude of the first surface relief profile is less than the amplitude of the second surface relief profile; for light output from the output polariser, the refractive index of the first transparent material is greater than the refractive index of the second transparent material, said relative scaling and said refractive indices of the first and second transparent materials are selected so that the output diffuser structure introduces no net angular deflection of light rays passed by the output polariser along an axis along a normal to the plane of the output polariser.

Advantageously a display device may be arranged to provide diffuse reflection of ambient light and simultaneously provide substantially no diffusion to an on-axis observer of light transmitted by the diffuser. Image fidelity may be increased for the display user, while the visibility of distracting specular reflections may be improved. The diffuser may be provided with high efficiency and in a thin layer. The thickness of components between the pixel plane and the front of the display may be increased without degrading image fidelity. Polar luminance and reflectivity control components for privacy display and touch screen components may be added to the front of the display to advantageously increase functionality without loss of image fidelity and without visibility of specular reflections.

Advantageously front surface Fresnel reflections may be increased, reducing visibility of specular reflections. Desirable refractive index differences may be conveniently provided between the first and second transparent materials. The diffusion cone angle size for off-axis viewing of image pixels by an off-axis may be increased in size to achieve an increase in visual security level by blurring the appearance of said image pixels.

The at least one birefringent material may be a cured liquid crystal material. Advantageously a solid layer may be provided with low thickness.

The second structured output layer may have an input surface on the input side that is planar. Advantageously cost and complexity is reduced.

At least one polar diffusion control retarder may be arranged between the output polariser and the output diffuser structure wherein the at least one polar diffusion control retarder may be capable of simultaneously introducing no net relative phase shift to orthogonal polarisation components of light passed by the output polariser along an axis along a normal to the plane of the at least one polar diffusion control retarder and introducing a relative phase shift to orthogonal polarisation components of light passed by the output polariser along an axis inclined to a normal to the plane of the at least one polar diffusion control retarder. Advantageously the diffusion for off-axis viewing may be increased, to achieve increased visual security level. The on-axis viewer may maintain a high fidelity image.

The at least one polar diffusion control retarder may comprise a switchable liquid crystal retarder comprising a layer of liquid crystal material, wherein the at least one polar diffusion control retarder may be arranged, in a switchable state of the switchable liquid crystal retarder, simultaneously to introduce no net relative phase shift to orthogonal polarisation components of light passed by the output polariser along an axis along a normal to the plane of the at least one polar diffusion control retarder and to introduce a net relative phase shift to orthogonal polarisation components of light passed by the output polariser along an axis inclined to a normal to the plane of the at least one polar diffusion control retarder. Off-axis diffusion of transmitted light may be reduced for viewing in public mode so that off-axis users may be provided with high image visibility. In privacy mode of operation, the display may be provided with high image visibility to the primary on-axis user and the image seen by the snooper may have increased diffusion and reduced image fidelity, achieving increased visual security level.

The spatial light modulator has a display polariser arranged on the output side thereof; the output polariser is an additional polariser arranged on the output side of the spatial light modulator as the display polariser, the additional polariser being a linear polariser; and the display device further comprises plural retarders arranged between the additional polariser and the display polariser. The plural retarders comprise: at least one polar phase control retarder arranged that is capable of simultaneously introducing no net relative phase shift to orthogonal polarisation components of light passed by the display polariser along an axis along a normal to the plane of the at least one polar phase control retarder and introducing a relative phase shift to orthogonal polarisation components of light passed by the reflective polariser along an axis inclined to a normal to the plane of the at least one polar phase control retarder. The off-axis luminance may be reduced to a snooper while high luminance is maintained for the on-axis display user. The off-axis luminance reduction may cooperate with the off-axis diffusion increase of the output diffuser structure. Advantageously visual security level is increased for the snooper while high image visibility is provided for the on-axis user in a privacy display.

The display device may further comprise a reflective polariser arranged between the display polariser and the at least one polar phase control retarder, the reflective polariser being a linear polariser. In a privacy display, off-axis reflectivity may be increased while on-axis reflectivity is substantially constant. Advantageously visual security level is increased.

The at least one polar phase control retarder may comprise a switchable liquid crystal retarder comprising a layer of liquid crystal material, wherein the at least one polar phase control retarder may be arranged, in a switchable state of the switchable liquid crystal retarder, simultaneously to introduce no net relative phase shift to orthogonal polarisation components of light passed by the reflective polariser along an axis along a normal to the plane of the at least one polar phase control retarder and to introduce a net relative phase shift to orthogonal polarisation components of light passed by the reflective polariser along an axis inclined to a normal to the plane of the at least one polar phase control retarder. Advantageously the display may be switched between a public mode with high image visibility over a wide viewing angle and a privacy mode with high image visibility for an on-axis user and high visual security level for off-axis snoopers.

The output diffuser structure may be arranged at an increased distance from the pixel plane. For on-axis viewing positions, the diffuser has substantially no effect on image fidelity, while for off-axis viewing positions the image fidelity is advantageously further degraded by the increased separation to improve off-axis privacy performance to a snooper.

The output polariser may be a display polariser of the spatial light modulator. Separation between the output diffuser structure and pixels of the spatial light modulator may be reduced. Advantageously image fidelity may be increased and complexity reduced.

Said relative scaling, said refractive indices of the first and second transparent materials, and thickness of the first structured output layer may be selected so that the output diffuser structure further introduces a net angular deflection to light rays passed by the output polariser along an axis inclined to a normal to the plane of the output polariser. Diffusion for off-axis viewing positions may be increased. Image fidelity may be reduced for off-axis viewers while high on-axis fidelity is provided. The visibility of an image to an off-axis snooper may advantageously be reduced.

The display device may further comprise a backlight arranged to output light, the spatial light modulator being a transmissive spatial light modulator arranged to receive output light from the backlight, wherein the backlight may provide a luminance at polar angles to the normal to the spatial light modulator greater than 45 degrees that is at most 30% of the luminance along the normal to the spatial light modulator, preferably at most 20% of the luminance along the normal to the spatial light modulator, and most preferably at most 10% of the luminance along the normal to the spatial light modulator. The off-axis luminance is reduced for snooper viewing locations. Advantageously the visual security level may be further increased and thickness reduced.

Embodiments of the present disclosure may be used in a variety of optical systems. The embodiments may include or work with a variety of projectors, projection systems, optical components, displays, microdisplays, computer systems, processors, self-contained projector systems, visual and/or audio-visual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which.

DETAILED DESCRIPTION

Figure 1A:
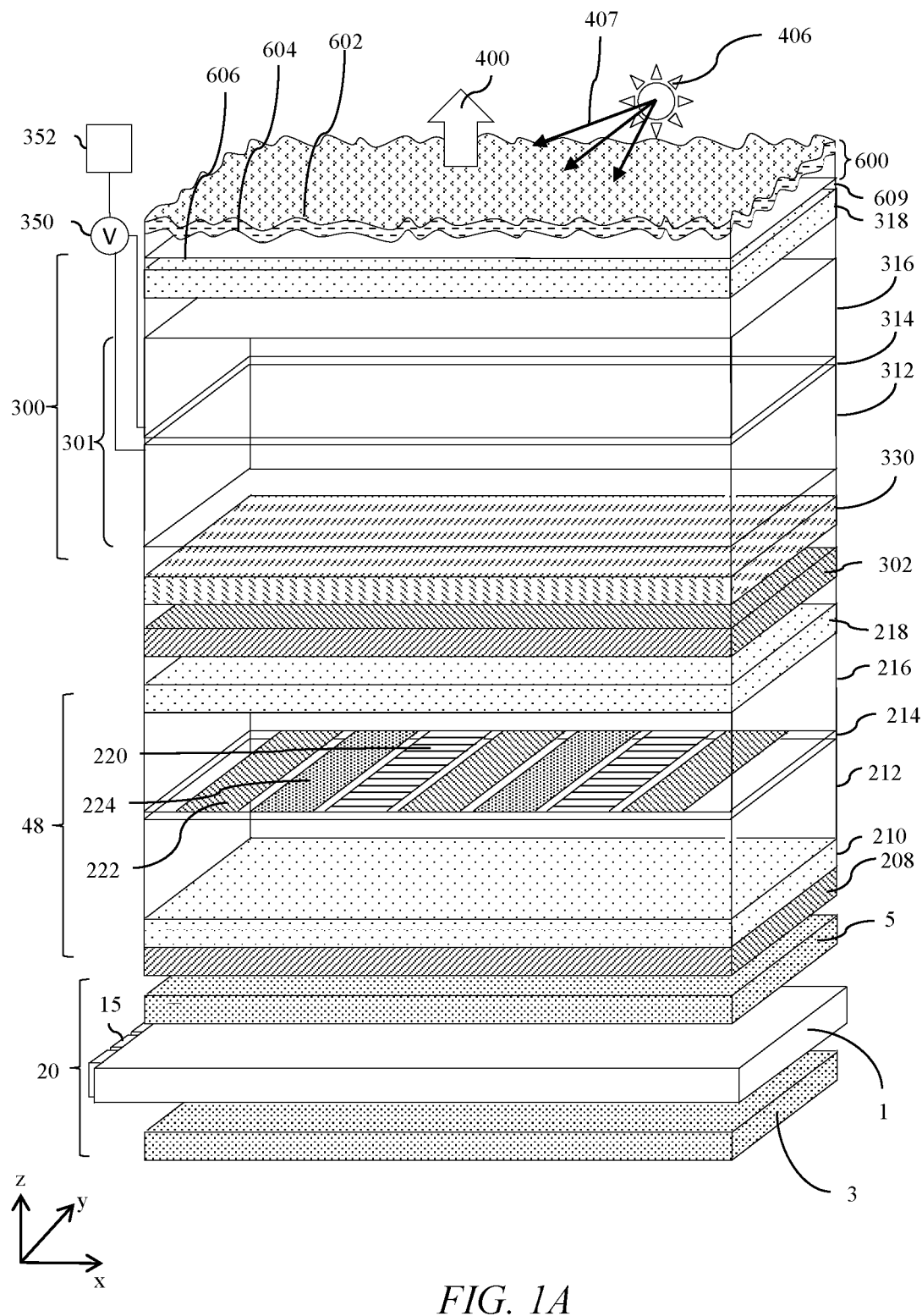
FIG. 1A is a diagram illustrating in side perspective view a switchable privacy display for use in ambient illumination comprising a transmissive spatial light modulator, reflective polariser, compensated switchable retarder and birefringent diffuser structure.

Terms related to optical retarders for the purposes of the present disclosure will now be described.

In a layer comprising a uniaxial birefringent material there is a direction governing the optical anisotropy whereas all directions perpendicular to it (or at a given angle to it) have equivalent birefringence.

The optical axis of an optical retarder refers to the direction of propagation of a light ray in the uniaxial birefringent material in which no birefringence is experienced. This is different from the optical axis of an optical system which may for example be parallel to a line of symmetry or normal to a display surface along which a principal ray propagates.

For light propagating in a direction orthogonal to the optical axis, the optical axis is the slow axis when linearly polarized light with an electric vector direction parallel to the slow axis travels at the slowest speed. The slow axis direction is the direction with the highest refractive index at the design wavelength. Similarly the fast axis direction is the direction with the lowest refractive index at the design wavelength.

For positive dielectric anisotropy uniaxial birefringent materials the slow axis direction is the extraordinary axis of the birefringent material. For negative dielectric anisotropy uniaxial birefringent materials the fast axis direction is the extraordinary axis of the birefringent material.

The terms half a wavelength and quarter a wavelength refer to the operation of a retarder for a design wavelength $\lambda_0$ that may typically be between 500 nm and 570 nm. In the present illustrative embodiments exemplary retardance values are provided for a wavelength of 550 nm unless otherwise specified.

The retarder provides a relative phase shift between two orthogonal polarization components of the light wave incident thereon and is characterized by the amount of relative phase, $\Gamma$, that it imparts on the two polarization components. In some contexts, the term "phase shift" is used without the word "relative" but still meaning relative phase shift. The relative phase shift is related to the birefringence $\Delta n$ and the thickness d of the retarder by:

$$\Gamma = 2\cdot\pi\cdot\Delta n\cdot d/\lambda_0 \qquad \text{eqn. 1}$$

In eqn. 1, $\Delta n$ is defined as the difference between the extraordinary and the ordinary index of refraction, i.e.

$$\Delta n = n_e - n_o \qquad \text{eqn. 2}$$

For a half-wave retarder, the relationship between d, $\Delta n$, and $\lambda_0$ is chosen so that the phase shift between polarization components is $\Gamma = \pi$. For a quarter-wave retarder, the relationship between d, $\Delta n$, and $\lambda_0$ is chosen so that the phase shift between polarization components is $\delta = \pi/2$.

The term half-wave retarder herein typically refers to light propagating normal to the retarder and normal to the spatial light modulator.

Some aspects of the propagation of light rays through a transparent retarder between a pair of polarisers will now be described.

The state of polarisation (SOP) of a light ray is described by the relative amplitude and phase shift between any two orthogonal polarization components. Transparent retarders do not alter the relative amplitudes of these orthogonal polarisation components but act only on their relative phase. Providing a net phase shift between the orthogonal polarisation components alters the SOP whereas maintaining net relative phase preserves the SOP.

A linear SOP has a polarisation component with a non-zero amplitude and an orthogonal polarisation component which has zero amplitude.

A linear polariser transmits a unique linear SOP that has a linear polarisation component parallel to the electric vector transmission direction of the linear polariser and attenuates light with a different SOP.

Absorbing polarisers are polarisers that absorb one polarisation component of incident light and transmit a second orthogonal polarisation component. Examples of absorbing linear polarisers are dichroic polarisers.

Reflective polarisers are polarisers that reflect one polarisation component of incident light and transmit a second orthogonal polarisation component. Examples of reflective polarisers that are linear polarisers are multilayer polymeric film stacks such as DBEF™ or APF™ from 3M Corporation, or wire grid polarisers such as ProFlux™ from Moxtek. Reflective linear polarisers may further comprise cholesteric reflective materials and a quarter waveplate arranged in series.

A retarder arranged between a linear polariser and a parallel linear analysing polariser that introduces no relative net phase shift provides full transmission of the light other than residual absorption within the linear polariser.

A retarder that provides a relative net phase shift between orthogonal polarisation components changes the SOP and provides attenuation at the analysing polariser.

In the present disclosure an 'A-plate' refers to an optical retarder utilizing a layer of birefringent material with its optical axis parallel to the plane of the layer.

A 'positive A-plate' refers to positively birefringent A-plates, i.e. A-plates with a positive $\Delta n$.

In the present disclosure a 'C-plate' refers to an optical retarder utilizing a layer of birefringent material with its optical axis perpendicular to the plane of the layer. A 'positive C-plate' refers to positively birefringent C-plate, i.e. a C-plate with a positive $\Delta n$. A 'negative C-plate' refers to a negatively birefringent C-plate, i.e. a C-plate with a negative $\Delta n$.

'O-plate' refers to an optical retarder utilizing a layer of birefringent material with its optical axis having a component parallel to the plane of the layer and a component perpendicular to the plane of the layer. A 'positive O-plate' refers to positively birefringent O-plates, i.e. O-plates with a positive $\Delta n$.

Achromatic retarders may be provided wherein the material of the retarder is provided with a retardance $\Delta n \cdot d$ that varies with wavelength $\lambda$ as $$\Delta n \cdot d/\lambda = \kappa \qquad \text{eqn. 3}$$

where $\kappa$ is substantially a constant.

Examples of suitable materials include modified polycarbonates from Teijin Films. Achromatic retarders may be provided in the present embodiments to advantageously minimise color changes between polar angular viewing directions which have low luminance reduction and polar angular viewing directions which have increased luminance reductions as will be described below.

Various other terms used in the present disclosure related to retarders and to liquid crystals will now be described.

A liquid crystal cell has a retardance given by $\Delta n \cdot d$ where $\Delta n$ is the birefringence of the liquid crystal material in the liquid crystal cell and d is the thickness of the liquid crystal cell, independent of the alignment of the liquid crystal material in the liquid crystal cell.

Homogeneous alignment refers to the alignment of liquid crystals in switchable LCDs where molecules align substantially parallel to a substrate. Homogeneous alignment is sometimes referred to as planar alignment. Homogeneous alignment may typically be provided with a small pre-tilt such as 2 degrees, so that the molecules at the surfaces of the alignment layers of the liquid crystal cell are slightly inclined as will be described below. Pretilt is arranged to minimise degeneracies in switching of cells.

In the present disclosure, homeotropic alignment is the state in which rod-like liquid crystalline molecules align substantially perpendicularly to the substrate. In discotic liquid crystals homeotropic alignment is defined as the state in which an axis of the column structure, which is formed by disc-like liquid crystalline molecules, aligns perpendicularly to a surface. In homeotropic alignment, pretilt is the tilt angle of the molecules that are close to the alignment layer and is typically close to 90 degrees and for example may be 88 degrees.

In a twisted liquid crystal layer a twisted configuration (also known as a helical structure or helix) of nematic liquid crystal molecules is provided. The twist may be achieved by means of a non-parallel alignment of alignment layers. Further, cholesteric dopants may be added to the liquid crystal material to break degeneracy of the twist direction (clockwise or anti-clockwise) and to further control the pitch of the twist in the relaxed (typically undriven) state. A supertwisted liquid crystal layer has a twist of greater than 180 degrees. A twisted nematic layer used in spatial light modulators typically has a twist of 90 degrees.

Liquid crystal molecules with positive dielectric anisotropy are switched from a homogeneous alignment (such as an A-plate retarder orientation) to a homeotropic alignment (such as a C-plate or O-plate retarder orientation) by means of an applied electric field.

Liquid crystal molecules with negative dielectric anisotropy are switched from a homeotropic alignment (such as a C-plate or O-plate retarder orientation) to a homogeneous alignment (such as an A-plate retarder orientation) by means of an applied electric field.

Rod-like molecules have a positive birefringence so that $n_e > n_o$ as described in eqn. 2. Discotic molecules have negative birefringence so that $n_e < n_o$.

Positive retarders such as A-plates, positive O-plates and positive C-plates may typically be provided by stretched films or rod-like liquid crystal molecules. Negative retarders such as negative C-plates may be provided by stretched films or discotic like liquid crystal molecules.

Parallel liquid crystal cell alignment refers to the alignment direction of homogeneous alignment layers being parallel or more typically antiparallel. In the case of pre-tilted homeotropic alignment, the alignment layers may have components that are substantially parallel or antiparallel. Hybrid aligned liquid crystal cells may have one homogeneous alignment layer and one homeotropic alignment layer. Twisted liquid crystal cells may be provided by alignment layers that do not have parallel alignment, for example oriented at 90 degrees to each other.

Transmissive spatial light modulators may further comprise retarders between the input display polariser and the output display polariser for example as disclosed in U.S. Pat. No. 8,237,876, which is herein incorporated by reference in its entirety. Such retarders (not shown) are in a different place to the passive retarders of the present embodiments. Such retarders compensate for contrast degradations for off-axis viewing locations, which is a different effect to the luminance reduction for off-axis viewing positions of the present embodiments.

A private mode of operation of a display is one in which an observer sees a low contrast sensitivity such that an image is not clearly visible. Contrast sensitivity is a measure of the ability to discern between luminances of different levels in a static image. Inverse contrast sensitivity may be used as a measure of visual security, in that a high visual security level (VSL) corresponds to low image visibility.

For a privacy display providing an image to an observer, visual security may be given as:

$$VSL = (Y+R)/(Y-K) \qquad \text{eqn. 4}$$

where VSL is the visual security level, Y is the luminance of the white state of the display at a snooper viewing angle, K is the luminance of the black state of the display at the snooper viewing angle and R is the luminance of reflected light from the display.

Panel contrast ratio is given as:

$$C = Y/K \qquad \text{eqn. 5}$$

The image contrast ratio, C is determined by the grey levels provided at least by the pixels of the spatial light modulator and further by mixing between adjacent pixels due to diffusion in the optical system. Increasing diffusion between the pixels and the observers may degrade panel contrast.

For high contrast optical LCD modes, the white state transmission remains substantially constant with viewing angle. In the contrast reducing liquid crystal modes of the present embodiments, white state transmission typically reduces as black state transmission increases such that $$Y + K \sim P \cdot L \qquad \text{eqn. 6}$$

The visual security level may then be further given as:

$$VSL = \frac{(C + I \cdot \rho/\pi \cdot (C+1)/(P \cdot L))}{(C-1)} \qquad \text{eqn. 7}$$

where off-axis relative luminance, P is typically defined as the percentage of head-on luminance, L at the snooper angle and the display may have image contrast ratio C and the surface reflectivity is $\rho$.

The off-axis relative luminance, P is sometimes referred to as the privacy level. However, such privacy level P describes relative luminance of a display at a given polar angle compared to head-on luminance, and is not a measure of privacy appearance.

The display may be illuminated by Lambertian ambient illuminance I. Thus in a perfectly dark environment, a high contrast display has VSL of approximately 1.0. As ambient illuminance increases, the perceived image contrast degrades, VSL increases and a private image is perceived.

For typical liquid crystal displays the panel contrast C is above 100:1 for almost all viewing angles, allowing the visual security level to be approximated to:

$$VSL = 1 + I \cdot \rho/(\pi \cdot P \cdot L) \qquad \text{eqn. 8}$$

In comparison to privacy displays, desirably wide angle displays are easily observed in standard ambient illuminance conditions. One measure of image visibility is given by the contrast sensitivity such as the Michelson contrast which is given by:

$$M=(I_{max}-I_{min})/(I_{max}+I_{min}) \qquad \text{eqn. 9}$$

and so:

$$M=((Y+R)-(K+R))/((Y+R)+(K+R))=(Y-K)/(Y+K+2\cdot R) \qquad \text{eqn. 10}$$

Thus the visual security level (VSL), is equivalent (but not identical to) 1/M. In the present discussion, for a given off-axis relative luminance, P the wide angle image visibility, W is approximated as $$W=1/\text{VSL}=1/(1+I\cdot\rho/(\pi\cdot P\cdot L)) \qquad \text{eqn. 11}$$

Switchable directional display apparatuses for use in privacy display for example and comprising plural retarders arranged between a display polariser and an additional polariser are described in U.S. Pat. No. 10,126,575 and in U.S. Patent Publ. No. 2019-0086706, both of which are herein incorporated by reference in their entireties. Directional display apparatuses further comprising reflective polarisers arranged between the display polariser and retarders are described in U.S. Pat. No. 10,303,030 and in U.S. Patent Publ. No. 2019-0250458, both of which are herein incorporated by reference in their entireties. Directional display polarisers comprising passive retarders arranged between a display polariser and an additional polariser are described in U.S. Patent Publ. No. 2018-0321553, which is herein incorporated by reference in its entirety.

The structure and operation of various switchable display devices will now be described. In this description, common elements have common reference numerals. It is noted that the disclosure relating to any element applies to each device in which the same or corresponding element is provided. Accordingly, for brevity such disclosure is not repeated.

Figure 1B:
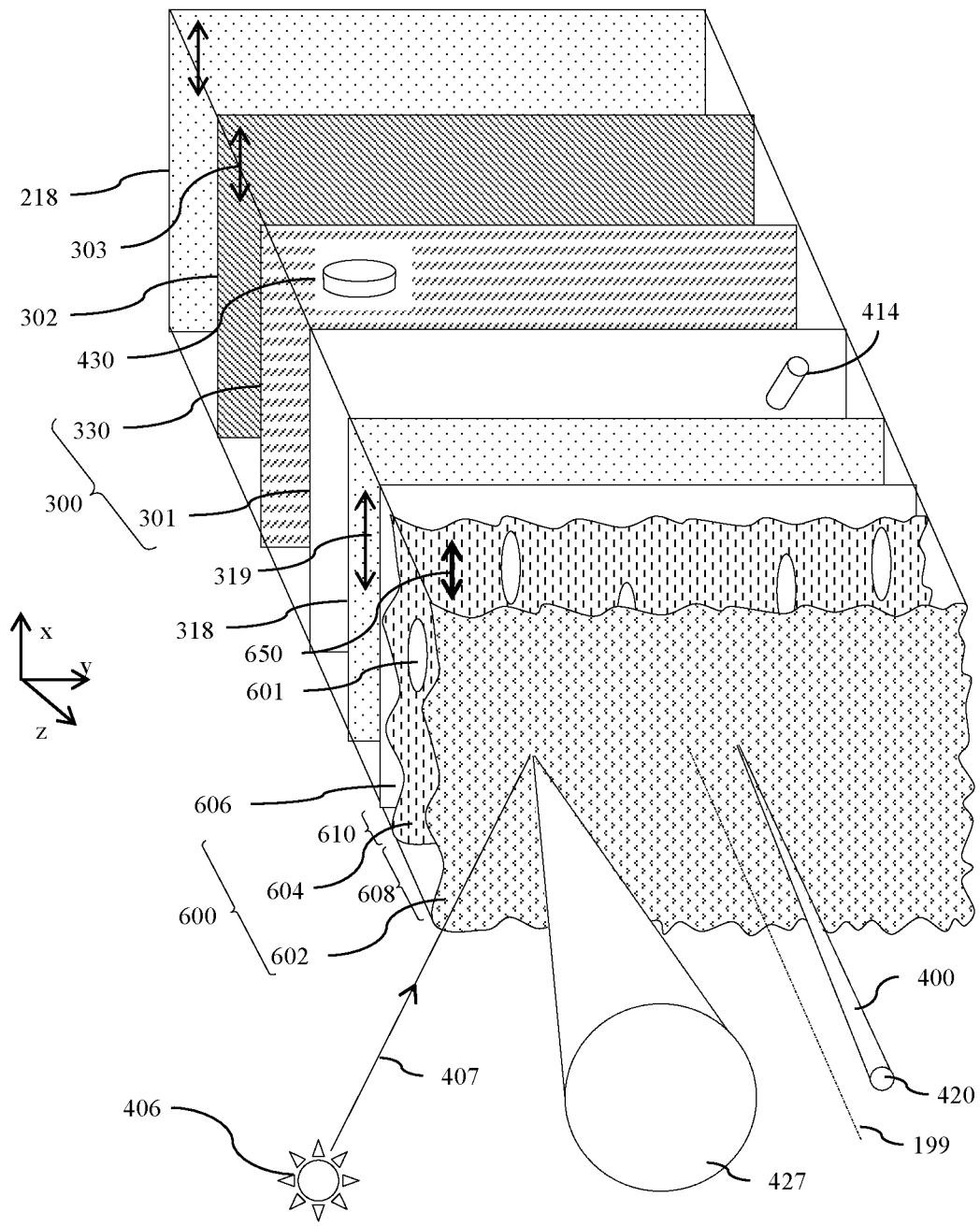
FIG. 1B is a diagram illustrating in front view alignment of optical layers in the optical stack of FIG. 1A.

FIG. 1A is a schematic diagram illustrating in side perspective view an optical stack of a display device 100 for use in ambient illumination 406 that provides incident light rays 407; and FIG. 1B is a schematic diagram illustrating in front view alignment of optical layers in the optical stack of FIG. 1A.

A display device 100 for use in ambient illumination 406 comprises: a spatial light modulator 48 arranged to output light 400; wherein the spatial light modulator 48 comprises an display polariser 218 arranged on the output side of the spatial light modulator 48, the display polariser 218 being a linear polariser.

An additional polariser 318 is arranged on the output side of the display polariser 218, the additional polariser 318 being a linear polariser; and a reflective polariser 302 arranged between the display polariser 218 and the additional polariser 318, the reflective polariser 302 being a linear polariser. Typical polarisers 210, 218, 318 may be polarisers such as dichroic polarisers.

In the embodiment of FIG. 1A, the additional polariser 318 is the output polariser of the display.

At least one polar phase control retarder 300 is arranged between the reflective polariser 302 and the additional polariser 318. The electric vector transmission direction 303 of the reflective polariser 302 is parallel to the electric vector transmission direction 319 of the additional polariser 318. The electric vector transmission direction 303 of the reflective polariser 302 is parallel to the electric vector transmission direction 219 of the display polariser 218.

Thus a display device for use in ambient illumination 406 comprises a spatial light modulator 48 arranged to output light 400. In the present disclosure, spatial light modulator 48 may comprise a liquid crystal display comprising a further display polariser 210 is an input polariser of the spatial light modulator 48, display polariser 218 with substrates 212, 216, liquid crystal layer 214 and red, green and blue pixels 220, 222, 224. Backlight 20 is arranged to illuminate the spatial light modulator 48 and comprises input light sources 15, waveguide 1, rear reflector 3 and optical stack 5 comprising diffusers, light turning films and other known optical backlight structures. Advantageously image uniformity may be increased.

The structure and operation of backlights 20 for use in privacy display are further described with reference to FIGS. 18-22C below. In an illustrative embodiment of FIG. 1A, the luminance at polar angles to the normal to the spatial light modulator greater than 45 degrees may be at most 18%.

The display may further comprise a reflective recirculation polariser 208 arranged between the backlight 20 and spatial light modulator 48. The reflective recirculation polariser 208 arranged between the backlight 20 and input display polariser 210 is different to the reflective polariser 302 arranged between the display polariser 218 and additional polariser 318. Reflective recirculation polariser 208 provides reflection of polarised light from the backlight that has a polarisation that is orthogonal to the electric vector transmission direction of the dichroic input polariser 210. Reflective recirculation polariser 208 does not reflect ambient light 406 to a snooper.

Thus the spatial light modulator 48 comprises a display polariser 218 arranged on the output side of the spatial light modulator 48. The display polariser 218 may be arranged to provide high extinction ratio for light from the pixels 220, 222, 224 of the spatial light modulator 48 and to prevent back reflections from the reflective polariser 302 towards the pixels 220, 222, 224.

Polar phase control retarder 300 is arranged between the reflective polariser 302 and the additional polariser 318. In the embodiment of FIGS. 1A-1B, the polar phase control retarder 300 comprises passive polar phase control retarder 330 and switchable liquid crystal retarder 301, but in general may be replaced by other configurations of at least one retarder, some examples of which are present in the devices described below.

The at least one polar phase control retarder 300 is capable of simultaneously introducing no net relative phase shift to orthogonal polarisation components of light passed by the reflective polariser 302 along an axis along a normal to the plane of the at least one polar phase control retarder 300 and introducing a relative phase shift to orthogonal polarisation components of light passed by the reflective polariser 302 along an axis inclined to a normal to the plane of the at least one polar phase control retarder 300. The polar phase control retarder 300 does not affect the luminance of light passing through the reflective polariser 302, the polar phase control retarder 300 and the additional polariser 318 along an axis along a normal to the plane of the polar phase control retarder 300 but the polar phase control retarder 300 does reduce the luminance of light passing therethrough along an axis inclined to a normal to the plane of the polar phase control retarder 300, at least in one of the switchable states of the switchable retarder 301.

The principles leading to this effect are described in greater detail in U.S. Pat. No. 10,303,030, incorporated by reference herein in its entirety, and arises from the presence or absence of a phase shift introduced by the polar phase control retarder 300 to light along axes that are angled differently with respect to the liquid crystal material of the polar phase control retarder 300.

Polar phase control retarder 300 comprises a switchable liquid crystal retarder 301 comprising a layer 314 of liquid crystal material, and substrates 312, 316 arranged between the reflective polariser 302 and the additional polariser 318. The polar phase control retarder 300 further comprises a switchable liquid crystal retarder 301 comprising a layer 314 of liquid crystal material 414, wherein the at least one polar phase control retarder 300 is arranged, in a switchable state of the switchable liquid crystal retarder 301, simultaneously to introduce no net relative phase shift to orthogonal polarisation components of light passed by the reflective polariser 302 along an axis along a normal to the plane of the at least one polar phase control retarder 300 and to introduce a net relative phase shift to orthogonal polarisation components of light passed by the reflective polariser 302 along an axis inclined to a normal to the plane of the at least one polar phase control retarder.

As illustrated in FIG. 1B in the case when the spatial light modulator 48 is a liquid crystal display, the input electric vector transmission direction 211 at the input polariser 210 provides an input polarisation component that may be transformed by the liquid crystal layer 214 to provide output polarisation component determined by the electric vector transmission direction 219 of the display polariser 218.

The electric vector transmission direction of the reflective polariser 302 is parallel to the electric vector transmission direction of the display polariser 218. Further the electric vector transmission direction 303 of the reflective polariser 302 is parallel to the electric vector transmission direction 319 of the additional polariser 318.

An illustrative embodiment for the plural retarders 300 is described in FIGS. 13A-E below. The substrates 312, 316 illustrated in FIG. 1A of the switchable liquid crystal retarder 301 comprise electrodes 413, 415 (illustrated in FIG. 13A) arranged to provide a voltage across the layer 314 of liquid crystal material 414. Control system 352 is arranged to control the voltage applied by voltage driver 350 across the electrodes of the switchable liquid crystal retarder 301.

Polar phase control retarder 300 further comprises a passive polar phase control retarder 330 as will be described further below. The at least one polar phase control retarder 300 comprises at least one passive retarder 330 which is arranged to introduce no net relative phase shift to orthogonal polarisation components of light passed by the reflective polariser 302 along an axis along a normal to the plane of the at least one passive retarder and to introduce a net relative phase shift to orthogonal polarisation components of light passed by the reflective polariser 302 along an axis inclined to a normal to the plane of the at least one passive retarder.

An output diffuser structure 600 is arranged at the output of the output polariser that is the additional polariser 318, comprising: first and second structured output layers 608, 610 arranged on the output side of the output polariser. In the embodiment of FIG. 1B, the first transparent materials 601 is a birefringent material and has an optical axis 650 that is aligned parallel to the electric vector transmission direction of the output polariser. The structure and operation of the output diffuser structure 600 will be described further below.

The operation of the reflective polariser 302 will be described with reference to FIGS. 14A-17B below. The appearance of the display of FIGS. 1A-1B when operating in a privacy mode will now be described.

Figure 2:
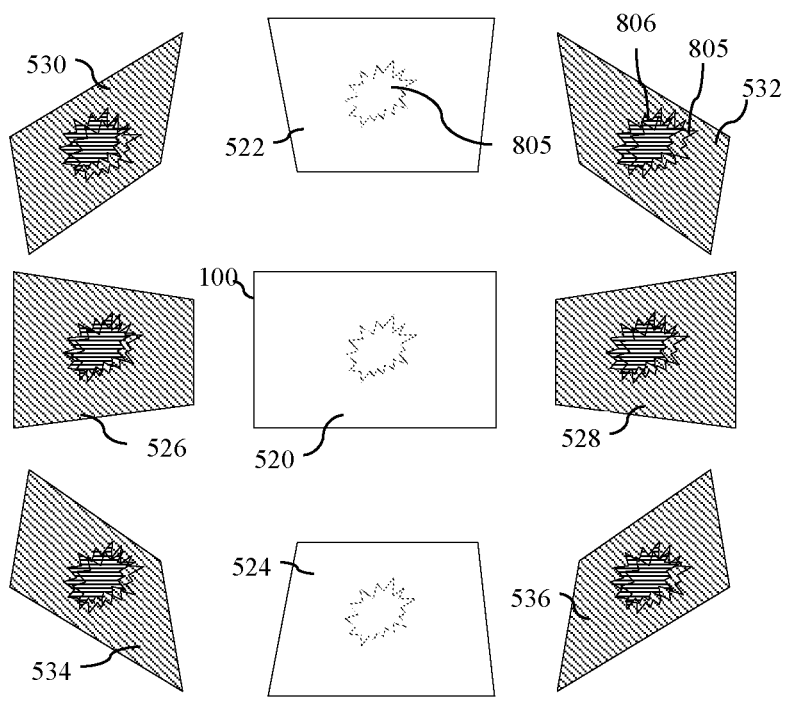
FIG. 2 is a diagram illustrating in front perspective views the appearance of the display of FIGS. 1A-B in a privacy mode of operation.

FIG. 2 is a schematic diagram illustrating in front perspective views the appearance of the display 100 of FIG. 1A operating in privacy mode with illustrative luminance and reflectivity variations as will be described below with reference to FIGS. 12B and 13B from different viewing positions.

Each of the nine perspective views 520, 522, 524, 526, 528, 530, 532, 534 and 536 correspond to a view from the corresponding viewing position.

Upper viewing quadrant views 530, 532, lower viewing quadrant views 534, 536 and lateral viewing position views 526, 528 provide both reduced luminance and increased reflections 606, 805 of ambient light source 406, whereas up/down central viewing region views 522, 524 and head-on view 520 provides much higher luminance and low reflectivity region 805, with substantially no visibility of reflection from reflective polariser 302.

Specular reflections of ambient illumination sources 406 from the front of displays can provide undesirable distracting images that conflict with image content for display users. It would be desirable to provide diffusion of specular reflections from the front of the display without degrading the image visibility to the primary user or the visual security level to an off-axis snooper. Front surface diffusers that reduce the visibility of specular reflections may degrade the visual security level by scattering light into high angles, increasing off-axis luminance.

It would be desirable to provide diffusion of frontal reflections while achieving high image resolution.

Figure 3:
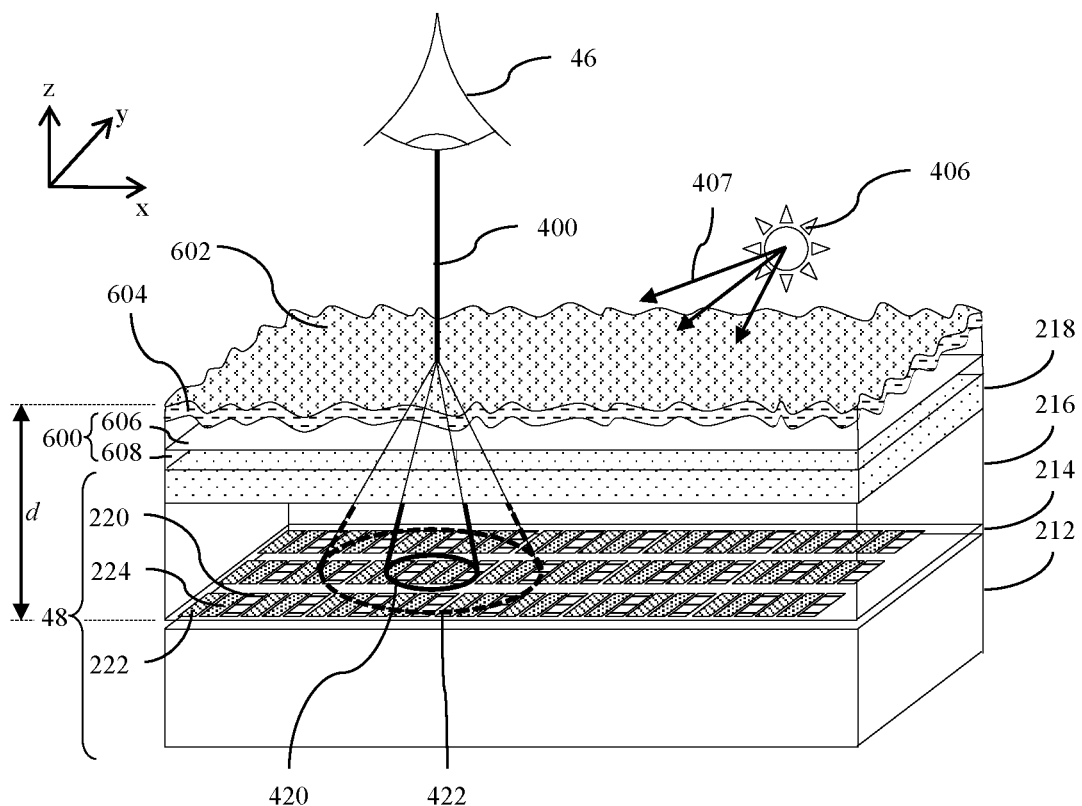
FIG. 3 is a diagram illustrating in side perspective view a high resolution display for use in ambient illumination comprising an emissive spatial light modulator and birefringent diffuser structure.

FIG. 3 is a diagram illustrating in side perspective view a high resolution display for use in ambient illumination comprising an emissive spatial light modulator and output diffuser structure.

In comparison to FIGS. 1A-B the spatial light modulator 48 may be provided by other display types that provide output light 400 by emission, such as organic LED displays (OLED), or micro-LED displays which comprise display polariser 218 that is an output display polariser of the display. By way of comparison with FIG. 1A, in the embodiment of FIG. 3, the spatial light modulator display polariser 218 is the output polariser of the display.

Display polariser 218 may provide reduction of luminance for light reflected from the emissive pixel plane by means of one or more retarders 518 inserted between the output display polariser 218 and OLED pixel plane. The one or more retarders 518 may be a quarter waveplate and is different to the plural retarders 300.

To reduce the specular reflection from the front surface, it would be desirable that the solid angle of the diffusion cone 420 at the pixel plane 214 is not substantially bigger than the individual pixels 220, 222, 224. Diffusers that have high diffusion, may provide large solid angle diffusion cone 422 and undesirably image fidelity may be degraded. Further it would be desirable to increase the distance, d between the pixel plane 214 and the front surface 602 to provide more layers such as plural retarders 300 and touch screen layers (for example illustrated in FIG. 23, below) while maintaining image fidelity.

Features of the arrangement of FIG. 3 not discussed in further detail may be assumed to correspond to the features with equivalent reference numerals as discussed above, including any potential variations in the features.

Figure 4A:
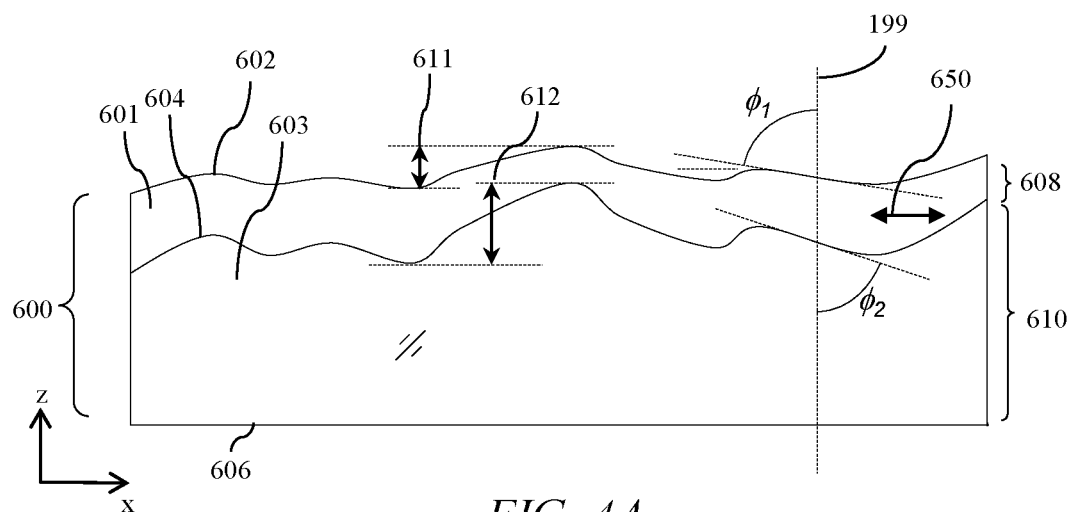
FIG. 4A is a diagram illustrating in side view the structure of an output diffuser structure.

FIG. 4A is a diagram illustrating in side view the structure of an output diffuser structure 600.

First and second structured output layers 608, 610 are arranged on the output side of the output polariser 318 as illustrated in FIG. 1A. The first structured output layer 608 is on the output side of the second structured output layer 610 and has an output surface 602 on the output side. The first and second structured output layers 608, 610 comprise first and second transparent materials 601, 603 that have an interface surface 604 therebetween. At least one of the first and second transparent materials 601, 603 is a birefringent material having an optical axis 650 that is aligned parallel or orthogonal to the electric vector transmission direction 319 of the output polariser 318.

The first structured output layer 608 comprises a first transparent material 601 arranged between an output surface 602 with a first surface relief profile and an interface surface 604 with a second surface relief profile. The second structured output layer 610 comprises a second transparent material 603 arranged between the output polariser that is the additional polariser 318 and the interface surface 604.

The first surface 602 has a surface relief profile and the second surface 604 has a surface relief profile that have the same, aligned shapes. A relative scaling in amplitude along an axis 199 normal to the plane of the output polariser 318 so that the amplitude 611 of the first surface relief profile is less than the amplitude 612 of the second surface relief profile. The amplitude 611 of the profile of the output surface 602 is less than the amplitude 612 of the profile of the interface surface 604 and the scaling factor, s is provided by the amplitude 611 divided by the amplitude 612.

Considering points 615, 617 on the output surface 602 and interface surface 604, that are along the optical axis 199, then the angle $\phi1$ of the surface 602 to the optical axis 199 is greater than the angle $\phi2$ of the interface surface 604 to the optical axis 199.

The input surface 606 of the diffuser structure 600 is typically a planar surface.

The operation of the diffuser structure 600 will now be described.

Figure 4B:
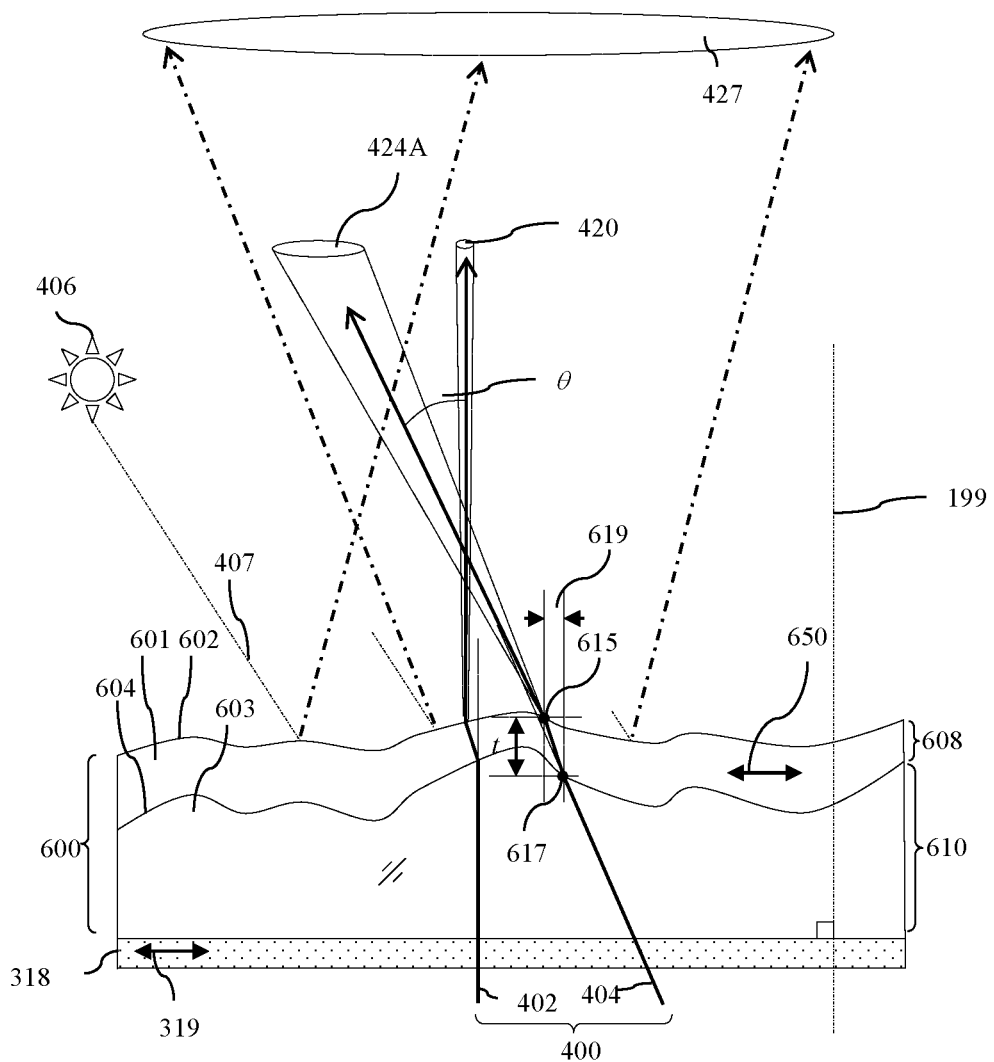
FIG. 4B is a diagram illustrating in side view propagation of transmitted light in an output diffuser structure.

FIG. 4B is a diagram illustrating in side view propagation of transmitted light in an output diffuser structure.

For the output light 400 from the output polariser (that is additional polariser 318) the refractive index of the first transparent material 601 is greater than the refractive index of the second transparent material 603. The normally incident ray 402 is deflected towards the normal of the interface 604 at the point of incidence and propagates through the layer 608. At the output surface 602, the surface angle $\phi1$ is lower than angle $\phi2$ by the scaling factor of the profiles.

If the layer thickness is small, then the scaling factor is arranged such that the ray 402 is directed in substantially the same direction as its input direction from the polariser 318. The small offset in positions of the ray at the interface surface 604 and output surface 602 may provide a small solid angle 420 of diffused light.

Thus the output diffuser structure 600 is capable of simultaneously introducing no net angular deflection of light rays passed by the output polariser along an axis 199 along a normal 199 to the plane of the output polariser and introducing a net angular deflection to light rays passed by the output polariser along an axis inclined to a normal to the plane of the output polariser. Advantageously on-axis light rays may be transmitted with small amounts of diffusion. Image resolution and fidelity may be optimised for an on-axis user.

Off-axis rays 404 have a larger diffusion cone 424A at the output surface. The finite thickness of layer 608 means the incident points 617, 615 are laterally offset by increased distance 619. The reversed ray deflection at the output surface 602 does not compensate for the deflection at the interface 604.

The relative scaling (ratio of thickness 611 to thickness 612), said refractive indices of the first and second transparent materials 601, 603 and thickness, t of the first structured output layer 608 are selected so that the output diffuser structure 600 further introduces a net angular deflection 424A to light rays 404 passed by the output polariser 318 along an axis inclined at angle $\theta$ to a normal to the plane of the output polariser 318.

Advantageously, some image data blurring may increase for images seen by an off-axis snooper. Advantageously the visual security level may be increased for off-axis snoopers.

FIG. 4B further shows that incident rays 407 from ambient light source 406 are diffused into cone 427 by Fresnel reflections at the front surface 602. Advantageously specular reflections are reduced, achieving increased image visibility without distracting specular reflections.

Further the diffusion of pixels 220, 222, 224 for on-axis rays is reduced for increased separation of the pixel plane 214 and the output surface 604. Polar control retarders 300, polariser 318, reflective polariser 302 and touch screens (not shown) may be provided between the pixel plane 214 and the observer. Reflective privacy display with increased visual security level and touch screen operations may be provided advantageously without degradation of image fidelity.

Further scatter of polar light cones from the display are reduced, advantageously achieving reduced luminance and increased reflectivity for off-axis viewing positions and increased visual security level.

Features of the arrangements of FIGS. 4A-B not discussed in further detail may be assumed to correspond to the features with equivalent reference numerals as discussed above, including any potential variations in the features.

It would be desirable to provide increased image blurring for off-axis viewing positions to achieve increased visual security while maintaining high image fidelity for on-axis viewing.

Figure 5A:
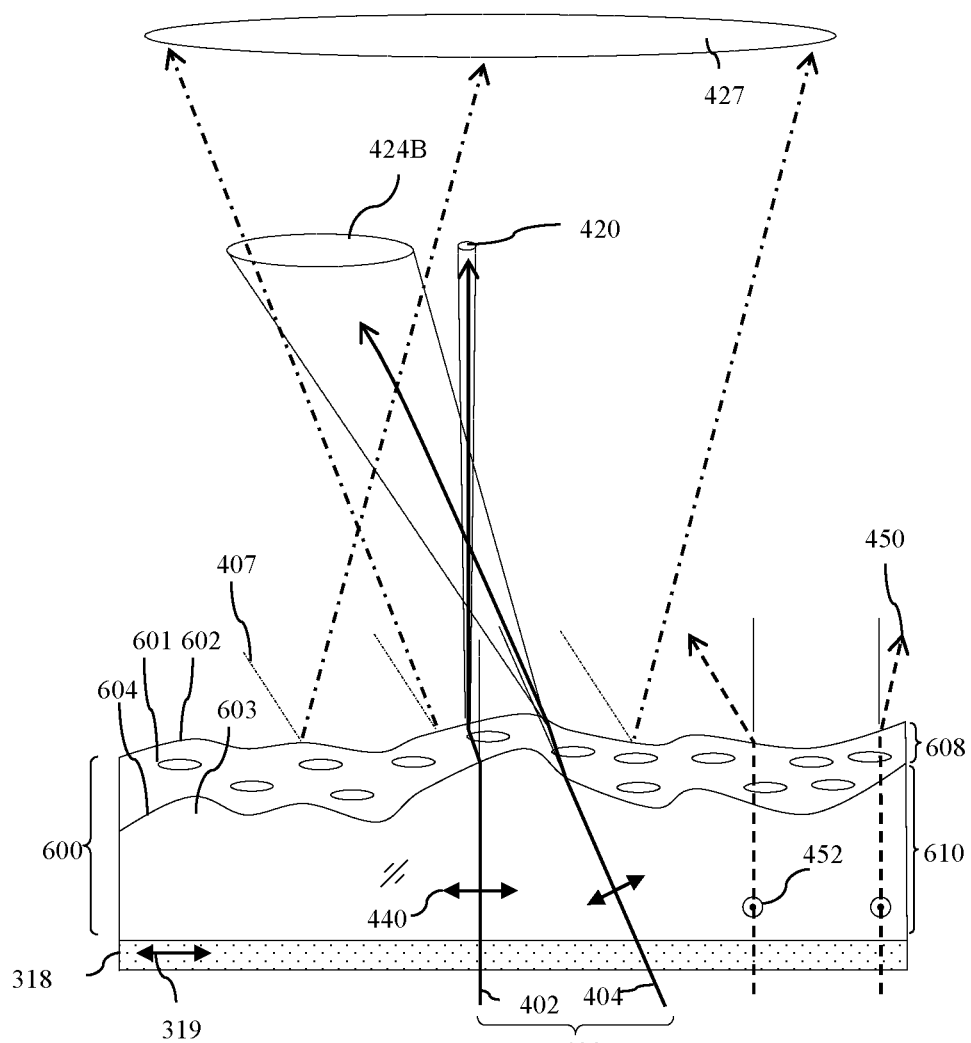
FIG. 5A is a diagram illustrating in side view propagation of transmitted light in a birefringent output diffuser structure.

FIG. 5A is a diagram illustrating in side view propagation of transmitted light in a birefringent output diffuser structure 600. As illustrated in FIG. 1B, the layer 608 comprises a material 601 that is birefringent material 601 with optical axis 650 aligned to the electric vector transmission direction 319 of the output polariser 318.

The birefringent material 601 may be a cured liquid crystal material such as a reactive mesogen liquid crystal material. Advantageously a solid layer may be provided without additional containment means.

The second structured output layer may have an input surface on the input side that is planar. Advantageously a planar support substrate may be provided and low cost achieved.

Light rays 402, 404 may have linear polarisation component 440 and are incident on the extraordinary refractive index of the birefringent material 601. The material 603 may be an isotropic material with refractive index that is less than the extraordinary refractive index of the birefringent material 601. Thus the light rays 440 are transmitted substantially undeflected and high image fidelity and high visual security level in privacy mode is achieved.

By way of comparison, if on-axis light rays 450 were to be transmitted through the diffuser structure 600 with an orthogonal polarisation component 452, then substantially no deflection may be provided at the interface 604 and a large deflection at the output surface 602 so that image fidelity and visual security level may be reduced.

Figure 5B:
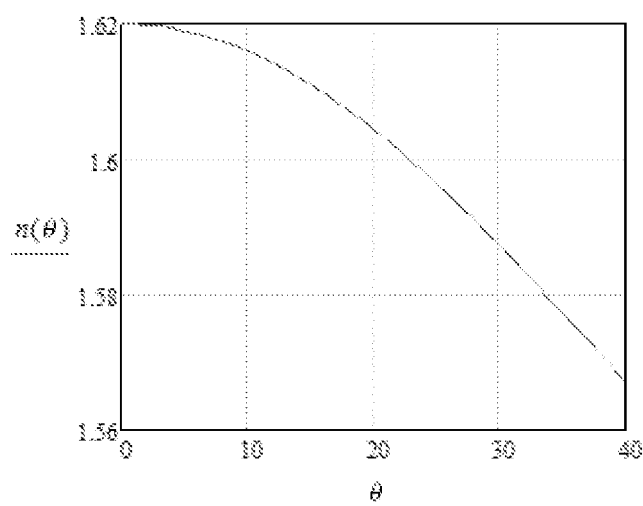
FIG. 5B is a graph illustrating the variation of refractive index for a linearly polarised ray against incident angle in the a birefringent layer.

FIG. 5B is a graph illustrating the variation of refractive index for a linearly polarised ray against incident angle in the birefringent layer 608 for a birefringent material with ordinary index of 1.50 and extraordinary index of 1.62.

As the angle of incidence onto the interface 604 increases, then the refractive index that is seen by the light ray 404 in the layer 608 is reduced. Thus the deflection of the ray is increased in comparison to the arrangement of FIG. 4B. Advantageously the off-axis diffusion cone 424B is increased and visual security level to an off-axis snooper increased due to image blurring.

The reflection of light at the diffuser structure 600 will now be described in further detail.

Figure 5C:
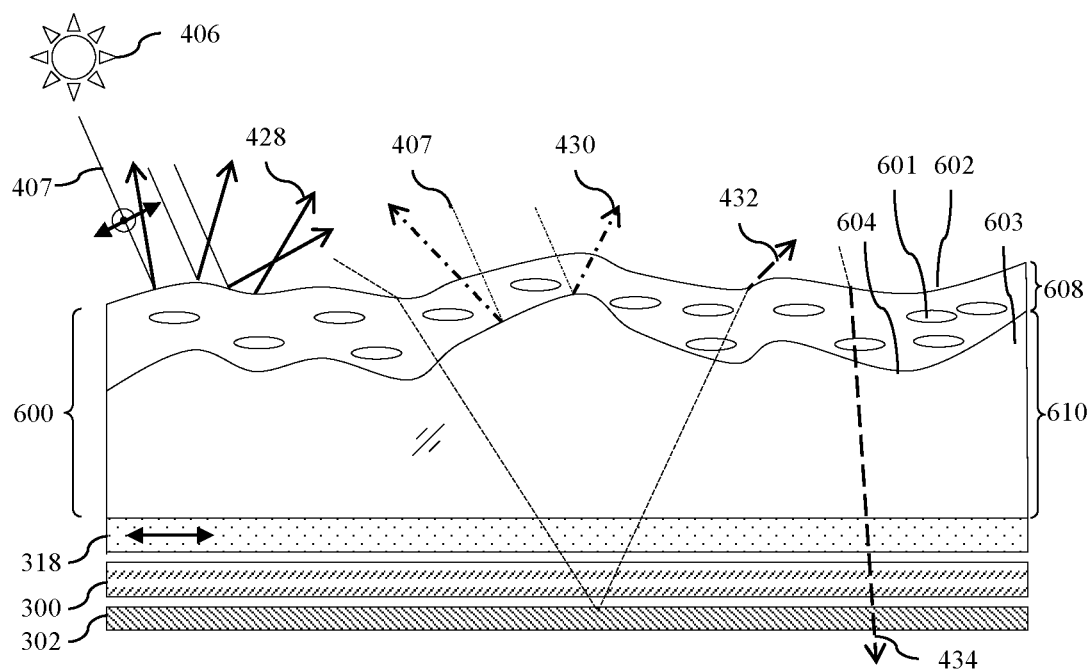
FIG. 5C is a diagram illustrating in side view propagation of reflected light in a birefringent diffuser structure.
Figure 5D:
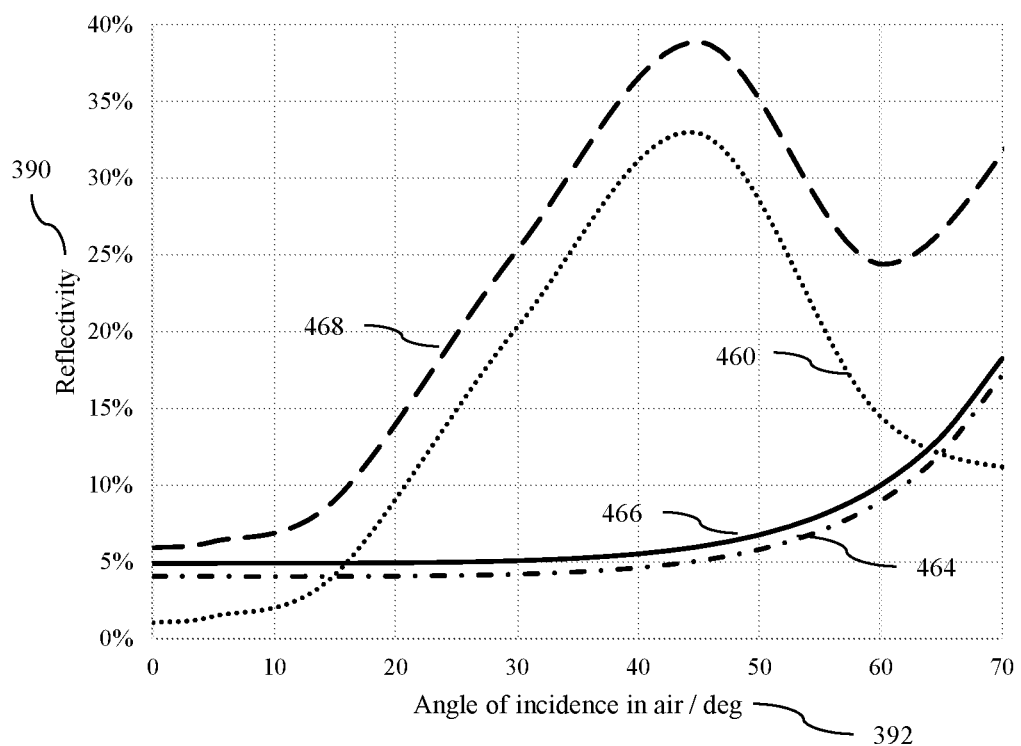
FIG. 5D is a graph illustrating variation of reflectivity with viewing angle for a switchable privacy display and diffuser structures.

FIG. 5C is a diagram illustrating in side view propagation of light rays 407 from an ambient light source 406 in a birefringent diffuser structure 600; and FIG. 5D is a schematic graph illustrating a measurement of the variation of reflectivity 390 with lateral viewing angle in air 392 for some reflected light rays. FIG. 5C further illustrates light rays 428 that are reflected by Fresnel reflections from the output surface 602 and light rays 630 that are reflected from the interface 604.

As will be described in FIGS. 15A-B light rays 432 are transmitted to reflective polariser 302 through polar phase control retarder 300 and reflected to provide angular variation of reflectivity. An illustrative profile 460 of reflectivity of light rays 432 in private mode of operation in the lateral direction for zero elevation is illustrated in FIG. 5D. The combined reflectance of light rays 428 and 430 that are reflected from the output surface 602 and interface 604 are illustrated by profile 466 for the illustrative birefringent material, above. By comparison, the reflectivity of a conventional material with refractive index 1.50 is illustrated by profile 464. Advantageously the birefringent material has an increased reflectivity to achieve increased suppression of specular reflections.

Features of the arrangements of FIGS. 5A-D not discussed in further detail may be assumed to correspond to the features with equivalent reference numerals as discussed above, including any potential variations in the features.

The total display 100 reflectivity for the arrangement of FIG. 1A is illustrated by profile 468. Advantageously the reflectivity to snoopers at high viewing angles is increased and visual security level increased.

The operation of the privacy mode of the display of FIG. 1A will now be described further.

Figure 6A:
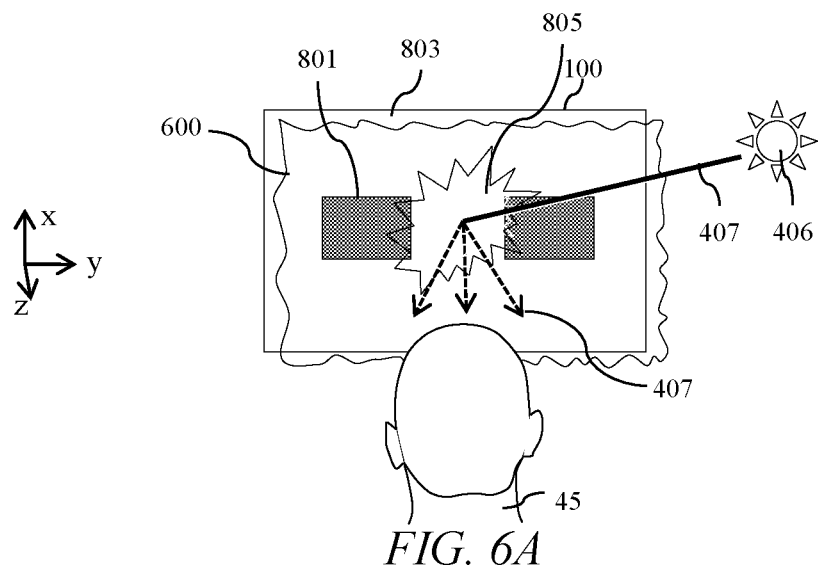
FIG. 6A is a diagram illustrating in front perspective view observation by a display user of reflected ambient light from interface surfaces of a display comprising a birefringent diffuser structure.

FIG. 6A is a diagram illustrating in front perspective view observation by a display user of reflected ambient light from interface surfaces of a display comprising a birefringent diffuser structure.

In operation in both privacy and public modes of operation, primary user 45 observes a full luminance with low display reflectivity. Display 100 may be provided with white image regions 803 and black image regions 801. Head-on display user 45 sees high frequency features such as the border of black and white regions with high image fidelity due to the low diffusion in the head-on direction of the diffuser structure 600. Diffuse rays 407 are reflected from the diffuser structure 600 and a non-specular front reflection 805 is provided by the display. Advantageously high image visibility is achieved with high image fidelity and no distracting specular reflections.

Figure 6B:
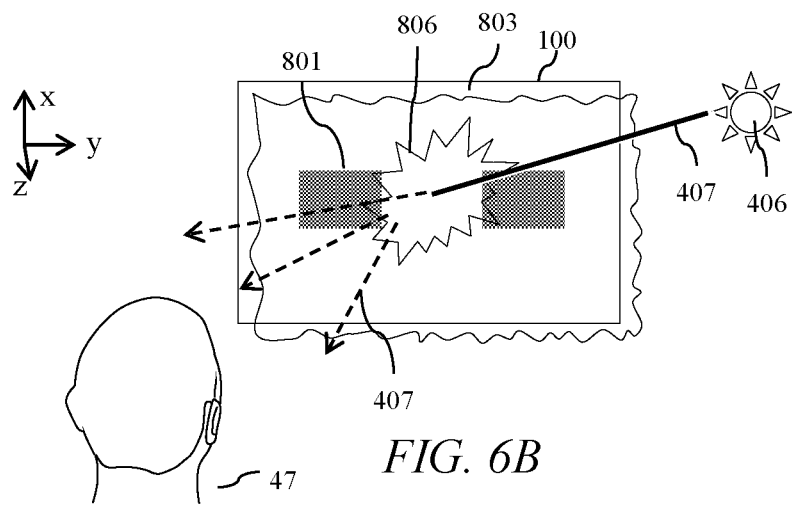
FIG. 6B is a diagram illustrating in front perspective view observation by an off-axis snooper of reflected ambient light for the display of FIGS. 1A-B in public mode comprising a birefringent diffuser structure.

FIG. 6B is a diagram illustrating in front perspective view observation by an off-axis snooper of reflected ambient light for the display of FIGS. 1A-B in public mode comprising a birefringent diffuser structure.

In comparison to FIG. 6A, some increased diffusion may be present that can cause reduced contrast for regions 801 for off-axis users due to off-axis diffusion cone 424 (not shown) providing some reduction of image fidelity, however high luminance and low reflectivity is achieved so that advantageously high image visibility may be maintained.

Figure 6C:
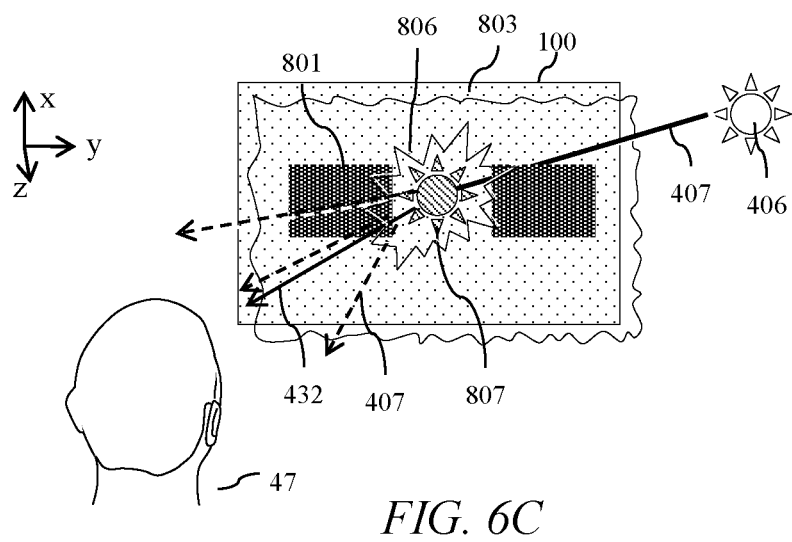
FIG. 6C is a diagram illustrating in front perspective view observation by an off-axis snooper of reflected ambient light for the display of FIGS. 1A-B in privacy mode comprising a birefringent diffuser structure.

FIG. 6C is a diagram illustrating in front perspective view observation by an off-axis snooper of reflected ambient light for the display of FIGS. 1A-B in privacy mode comprising a birefringent diffuser structure 600.

Off-axis user observes a reduced luminance white region 803 and black region 801. Advantageously visual security level is increased.

Reflection of light rays 432 in FIG. 5-C is specular so that a specular image 807 is provided. Advantageously the specular reflections of light rays 432 provide camouflage of image content to the snooper 47 and visual security level is further increased. Diffuse rays 407 are reflected from the diffuser structure 600 and a non-specular front reflection 805 is provided by the display, further reducing image contrast and increasing visual security level.

The operation of a display with no diffuser structure 600 will now be described.

Figure 7A:
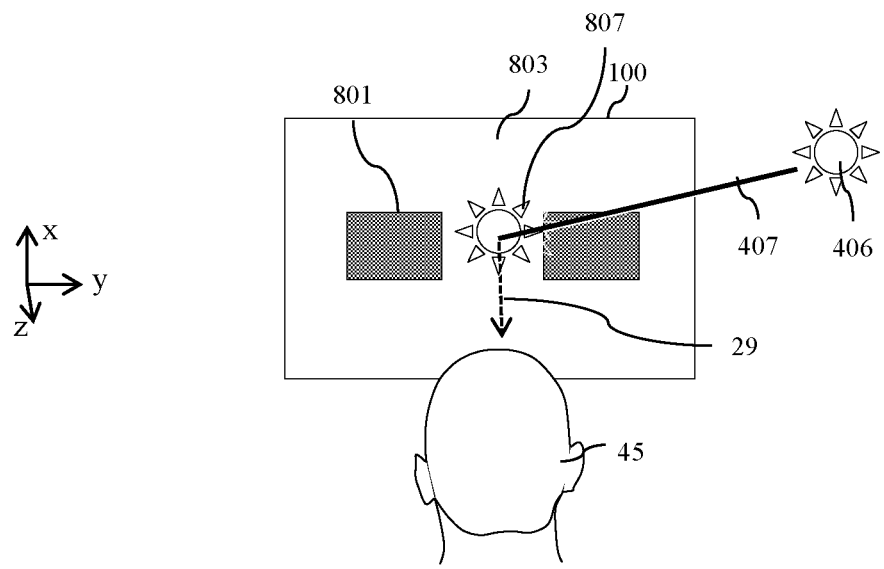
FIG. 7A is a diagram illustrating in front perspective view observation of reflected ambient light from interface surfaces of a display by a display user wherein the display comprises a non-diffusing front surface.

FIG. 7A is a diagram illustrating in front perspective view observation of reflected ambient light from interface surfaces of a display by a display user wherein the display comprises a non-diffusing front surface. In comparison to FIG. 6A, incident light rays 407 are specularly reflected as light rays 29 and an image 807 of the reflected ambient light source 406 is seen on the display surface. Such an image 807 may be distracting and undesirable for the display user.

Figure 7B:
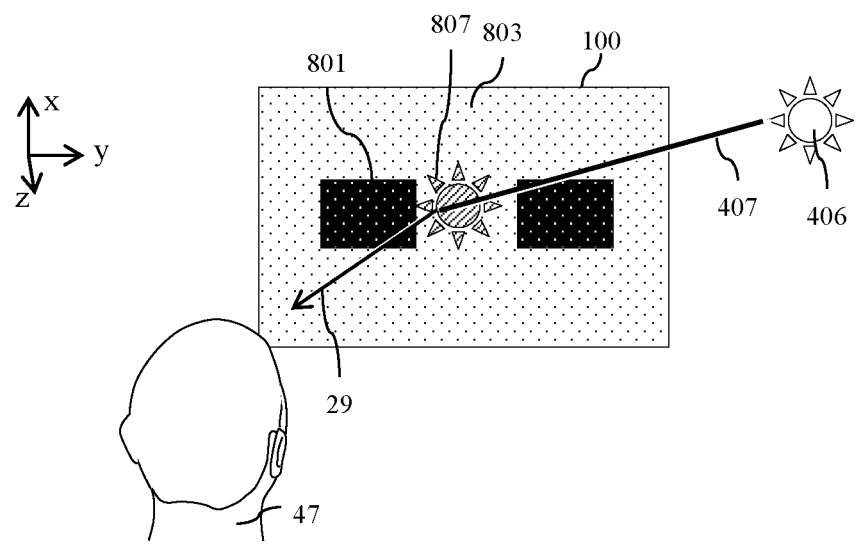
FIG. 7B is a diagram illustrating in front perspective view observation by an off-axis snooper of reflected ambient light for the display of FIGS. 1A-B in privacy mode wherein the diffuser structure is omitted.

FIG. 7B is a diagram illustrating in front perspective view observation by an off-axis snooper of reflected ambient light for the display of FIGS. 1A-B in privacy mode wherein the diffuser structure is omitted. For the snooper 47 in privacy mode the contrast reduction of black regions 801 may not be as great as for FIG. 6C and visual security level may be reduced.

Features of the arrangements of FIGS. 6A-7B not discussed in further detail may be assumed to correspond to the features with equivalent reference numerals as discussed above, including any potential variations in the features.

Further embodiments of the diffuser structure 600 will now be described.

Figure 8A:
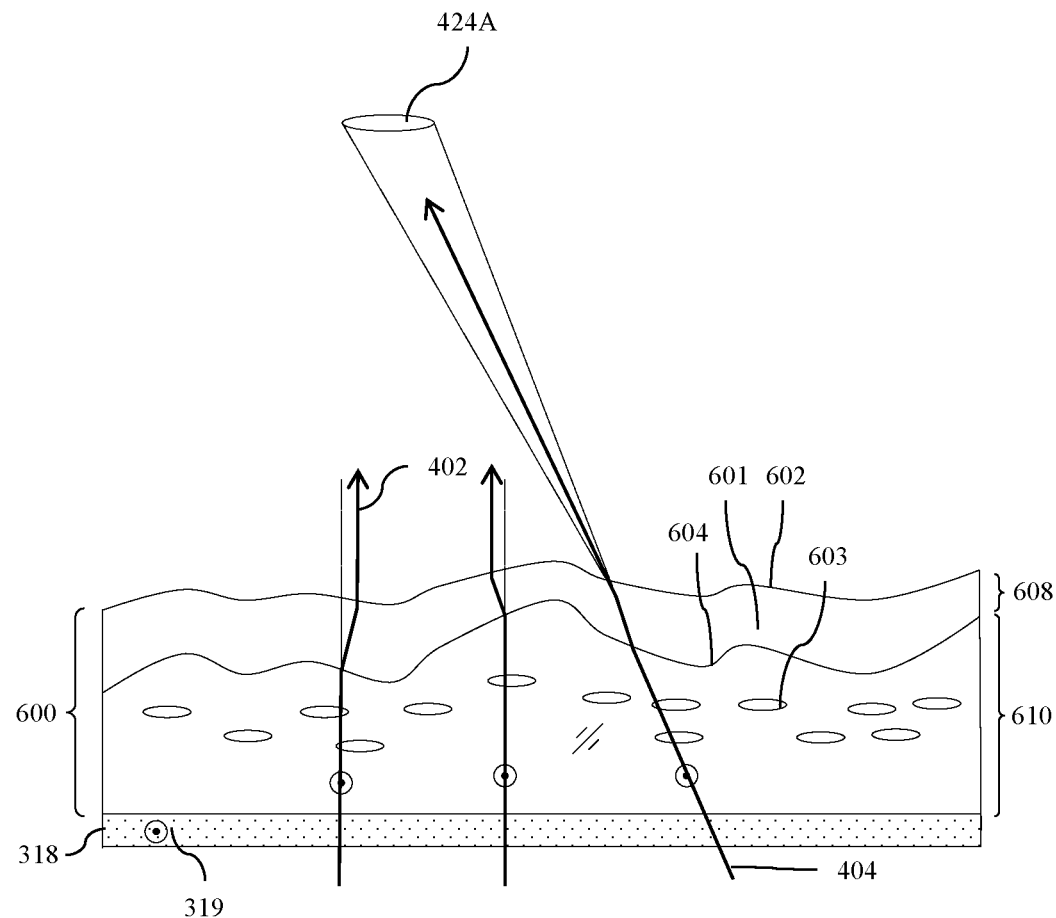
FIG. 8A is a diagram illustrating in side view a birefringent diffuser structure wherein the second transparent material is a birefringent material.

FIG. 8A is a diagram illustrating in side view a birefringent diffuser structure wherein the second transparent material is birefringent.

In one embodiment the first transparent material 601 may be a birefringent material with orthogonal alignment direction to the electric vector transmission direction 319 of the output polariser 318. The mechanical properties of the first transparent layer 608 may be adjusted to be superior to birefringent materials, advantageously increasing device ruggedness during handling. The electric vector transmission direction 319 of the output polariser 318 may be orthogonal to the optical axis 650 of the birefringent material 603 so that the light ray 404 sees a refractive index of the birefringent material 603 that does not change with lateral angle. The off-axis diffusion cone angle 424A may be independent of lateral viewing angle. Advantageously off-axis display users in public mode of operation may be provided with increased fidelity images.

In another embodiment the first transparent material 601 may be an isotropic material with refractive index greater than the ordinary index of the birefringent material 603. Advantageously large refractive index differences may be conveniently provided by known materials.

It may be desirable to protect layers for processing, handling and mechanical ruggedness.

Figure 8B:
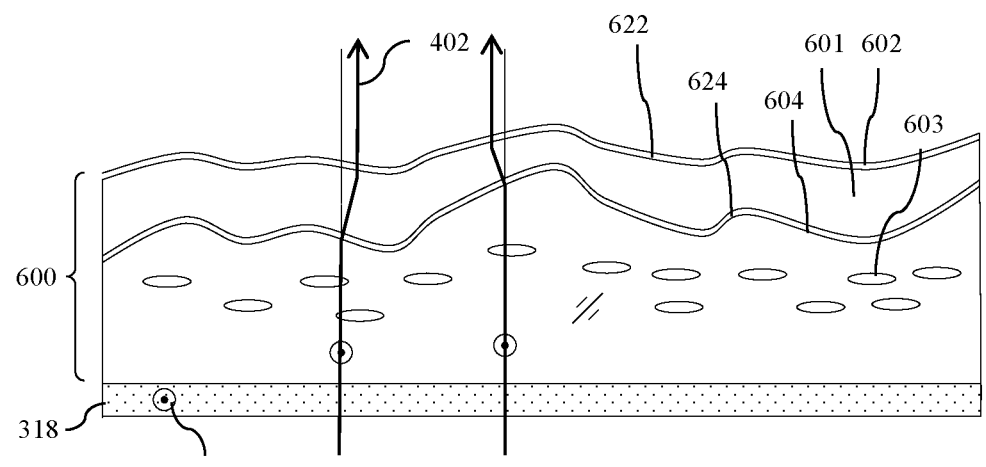
FIG. 8B is a diagram illustrating in side view a birefringent diffuser structure further comprising conformal coating layers.

FIG. 8B is a diagram illustrating in side view a birefringent diffuser structure further comprising optional conformal coating layers 622, 624 arranged on the output surface 602 and/or interface 604 respectively. As the layers 622, 624 are conformal they may provide substantially no change to the optical properties of the diffuser but may achieve increased ruggedness, or may provide birefringent material alignment properties for example. Features of the arrangements of FIGS. 8A-B not discussed in further detail may be assumed to correspond to the features with equivalent reference numerals as discussed above, including any potential variations in the features.

A method to form a diffuser structure 600 will now be described.

Figure 9A:
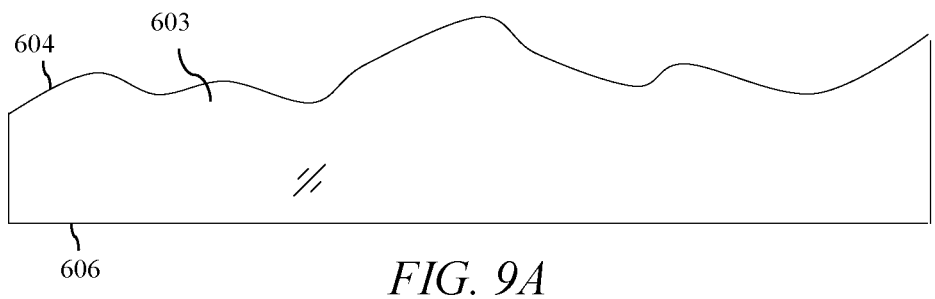
FIG. 9A, FIG. 9B, FIG. 9C, FIG. 9D, FIG. 9E, and FIG. 9F are diagrams illustrating in side view a method to form a diffuser structure.

FIGS. 9A-9F are diagrams illustrating in side view a method to form a diffuser structure. In a first step as shown in FIG. 9A, a structure is provided in an isotropic material 603 with a desirable surface relief profile to form interface surface 604. Such a surface may be provided by moulding in contact with a suitably shaped tool for example. Features of the arrangements of FIGS. 9A-F not discussed in further detail may be assumed to correspond to the features with equivalent reference numerals as discussed above, including any potential variations in the features.

Figure 9B:
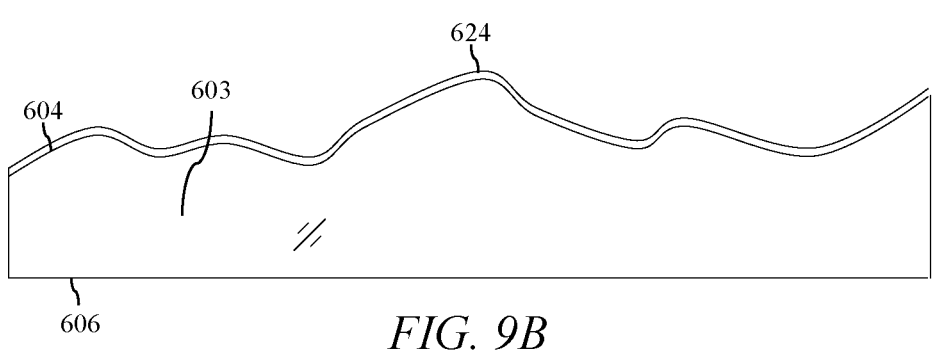

In a second step as shown in FIG. 9B, a conformal alignment layer 624 is formed on the surface 604 and suitable alignment is provided by photoalignment or mechanical rubbing for example.

Figure 9C:
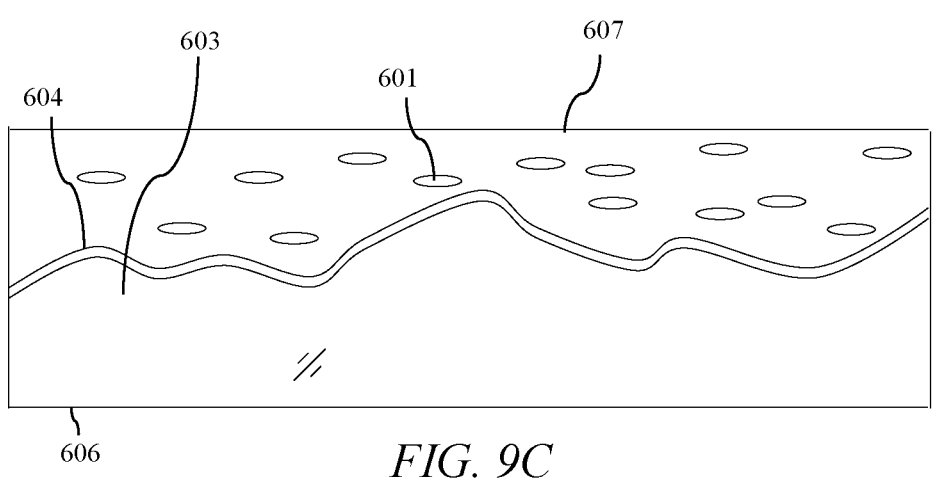

In a third step as shown in FIG. 9C layer of liquid crystal material is formed on the surface and may have a substantially planar upper surface, or may have some degree of adjustment to the underlying structure of the surface 604.

Figure 9D:
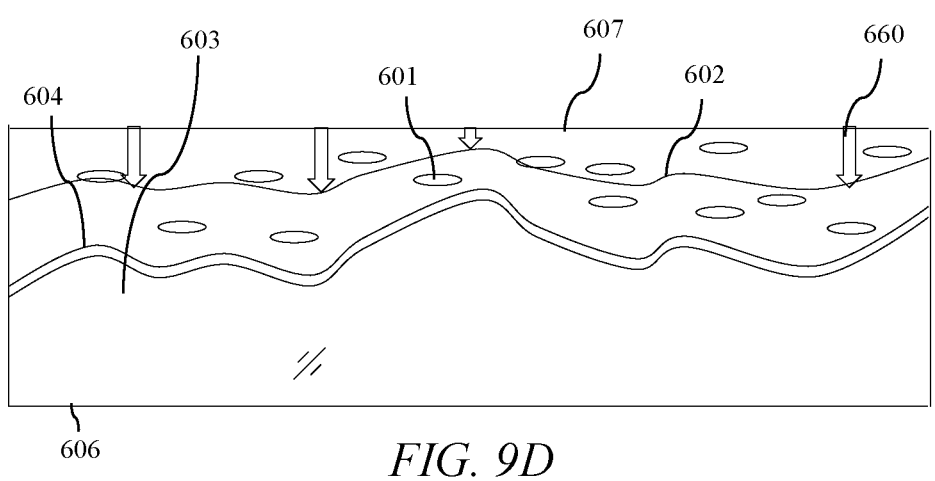
Figure 9E:
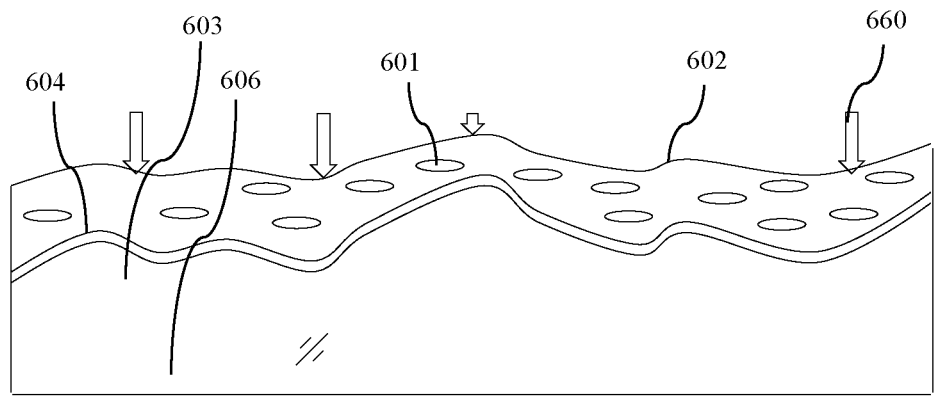

In a fourth step as shown in FIGS. 9D-E, the layer undergoes a shrinking process as indicated by shrinkage arrows 660 such that the profile of the surface 602 after shrinkage is scaled from the profile of the surface 604. Such shrinkage may be controlled by material properties of the material 601 such as solvent content and viscosity, and process conditions such as temperature and vacuum pressure.

Figure 9F:
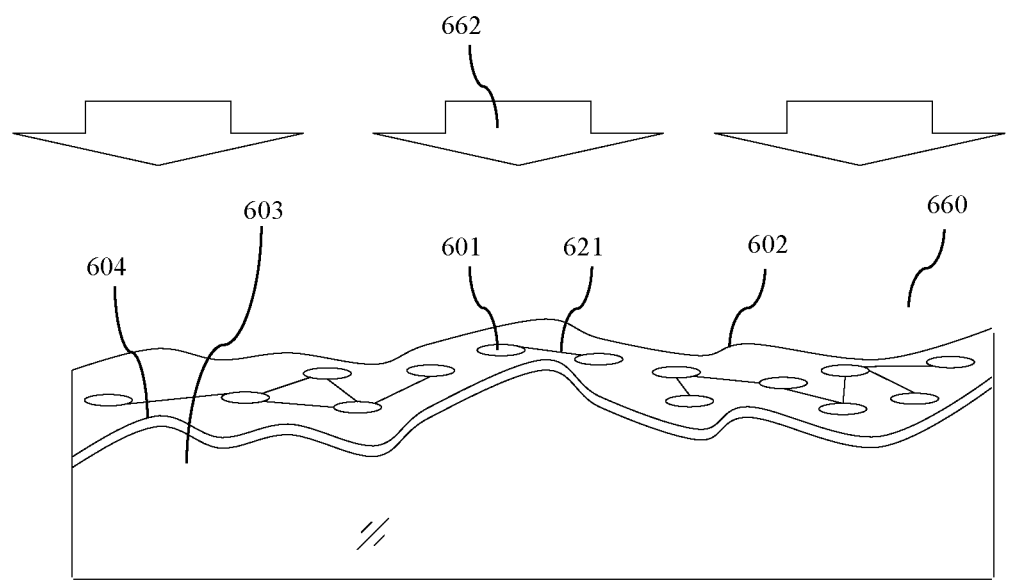

In a fifth step as shown in FIG. 9F after shrinkage the layer is cured, for example by means of UV illumination 662 and/or by thermal curing to provide cross-linking 621. Some shrinkage may also be provided in the curing stage that is compensated for in the fourth step or the fourth and fifth step may be combined.

Advantageously shrinkage and alignment of the birefringent material 601 may be conveniently provided to achieve the scaled profile of the output surface 602 in comparison to the profile of the interface surface 604.

It would be desirable to provide control of the scaling factor.

Figure 10:
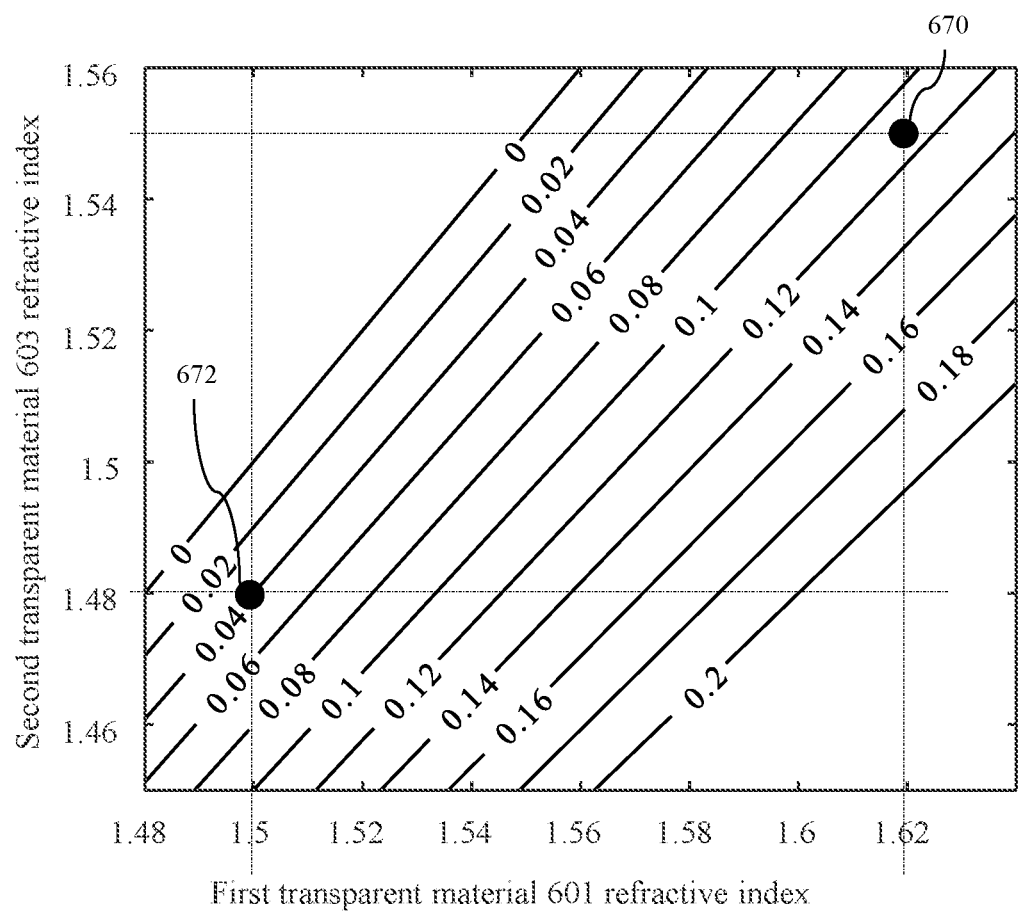
FIG. 10 is a graph illustrating variation of desirable first and second transparent layer refractive indices for different shrinkages to achieve a desirable front surface diffusion.

FIG. 10 is a graph illustrating variation of desirable first and second transparent layer refractive indices for different shrinkages to achieve a desirable front surface diffusion. FIG. 10 is an illustrative embodiment of shrinkage for the refractive indices of different first transparent material 601 and second transparent material 603.

In one illustrative embodiment such as illustrated in FIG. 5A and by process point 670, the first layer may be an aligned reactive mesogen material 601 with extraordinary index of 1.62. As illustrated by process condition 670, if the refractive index of the material 603 is 1.55 then a shrinkage during processing of 11% is desirable to achieve no ray deflection for on-axis rays 402.

In another illustrative embodiment such as illustrated in FIG. 8A and by process point 672, the first layer may be an aligned reactive mesogen material 601 with ordinary index of 1.50. As illustrated by process condition 672, if the refractive index of the material 603 is 1.48 then a shrinkage during processing of 4% is desirable. Such tuning may also be provided for isotropic materials, for example as shown in FIG. 4B.

Advantageously the material system and process conditions can be tuned to achieve desirable diffusion and transmission properties.

As described for FIGS. 5A-B some increase in diffusion with viewing angle may be provided by the change in refractive index of the material 601 or 603 with lateral viewing angle. It may be desirable to provide further increased diffusion for off-axis viewers to achieve increased visual security level.

Figure 11A:
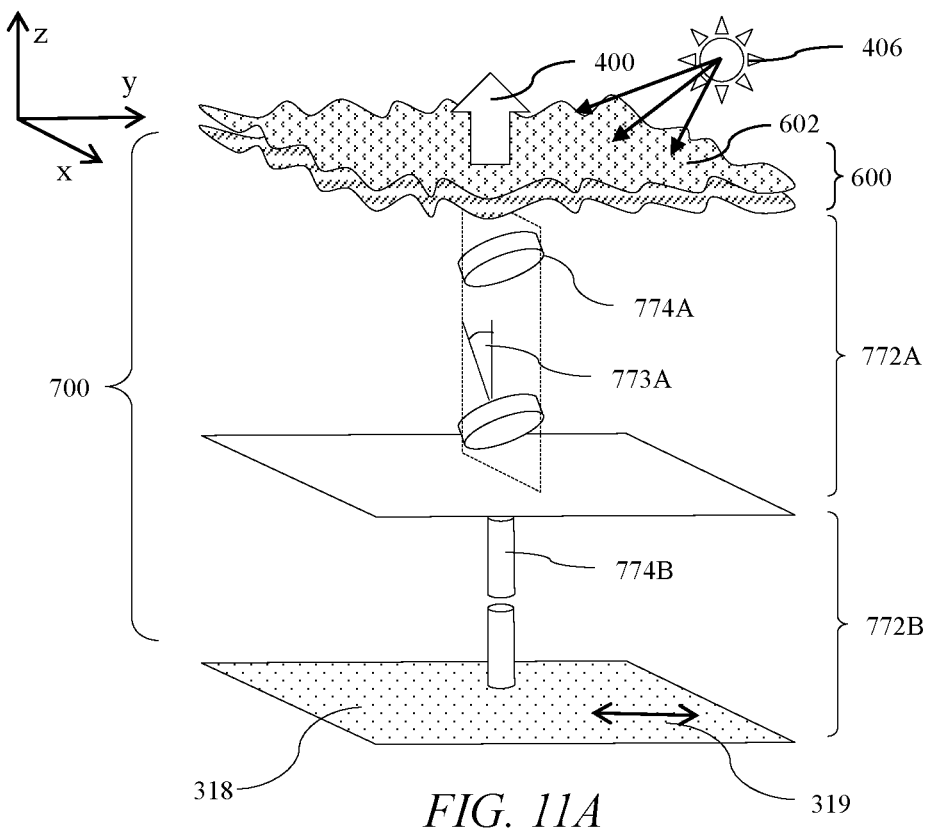
FIG. 11A is a diagram illustrating in side perspective view an output diffuser structure comprising polar diffusion control retarders comprising a negative O-plate tilted in a plane orthogonal to the display polariser electric vector transmission direction and a negative C-plate and arranged to provide field-of-view diffusion modification of a display device.
Figure 11B:
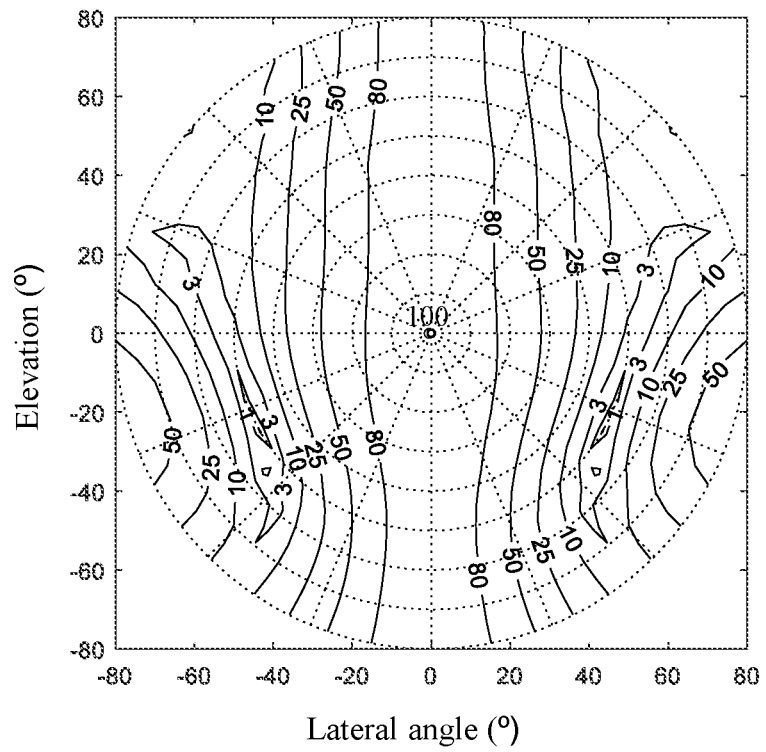
FIG. 11B is a graph illustrating the variation of output transmission with polar direction for transmitted light rays in the passive retarder of FIG. 11A if a polariser were arranged to analyse light output from the output diffuser structure.

FIG. 11A is a diagram illustrating in side perspective view an output diffuser structure comprising polar diffusion control retarders comprising a negative O-plate tilted in a plane orthogonal to the display polariser electric vector transmission direction and a negative C-plate and arranged to provide field-of-view diffusion modification of a display device; and FIG. 11B is a graph illustrating the variation of output transmission with polar direction for transmitted light rays in the passive retarder of FIG. 11A if a polariser were arranged to analyse light output from the output diffuser structure for the illustrative embodiment of TABLE 1. Features of the arrangements of FIGS. 11A-C not discussed in further detail may be assumed to correspond to the features with equivalent reference numerals as discussed above, including any potential variations in the features.

TABLE 1

| | Passive retarder | | | |
|---|---|---|---|---|
| Layer | Type | Out of plane angle/° | In plane angle/° | Δn.d/ nm |
| 272A | Negative O | 65 | 90 | −550 |
| 272B | Positive C | 90 | 0 | +500 |

At least one polar diffusion control retarder 700 is arranged between the output polariser that is the additional polariser 318 (but may for example be the spatial light modulator display polariser 218) and the output diffuser structure 600 wherein the at least one polar diffusion control retarder 700 is capable of simultaneously introducing no net relative phase shift to orthogonal polarisation components of light passed by the output polariser along an axis 199 along a normal to the plane of the at least one polar diffusion control retarder 700 and introducing a relative phase shift to orthogonal polarisation components of light passed by the output polariser along an axis inclined to a normal to the plane of the at least one polar diffusion control retarder 700.

The operation of and alternative arrangements of passive polar control retarders 330 are described in U.S. Pat. No. 10,303,030 when provided between parallel polarisers. The profile of FIG. 11B thus gives an indication of the polarisation state that is incident on the diffuser structure 600 and is shown for illustrative purposes. However, no further additional polariser is provided here, but the incident polarisation falling on the birefringent diffuser structure 600 is adjusted.

Figure 11C:
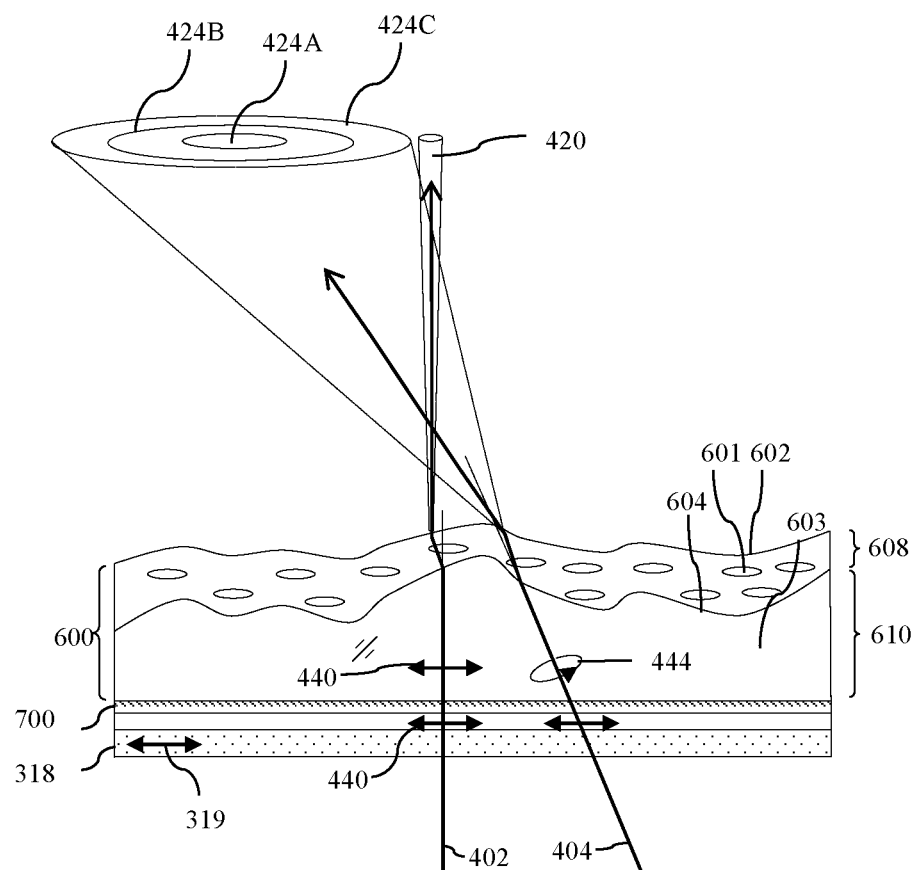
FIG. 11C is a diagram illustrating in side view propagation of transmitted light in a birefringent output diffuser structure comprising the polar diffusion control retarders of FIG. 11A.

FIG. 11C is a diagram illustrating in side view propagation of transmitted light in a birefringent output diffuser structure comprising the polar diffusion control retarders of FIG. 11A.

In comparison to FIG. 5A, the polar diffuser retarder 700 is provided between the polariser 318 and the birefringent layer 608. For on-axis rays 402 there is no change of the polarisation state 440. However, for off-axis rays, the polarisation state 444 is modified so that it is in general an elliptical polarisation state and for certain angles may be a linear polarisation state that has been rotated. The elliptical polarisation state sees a refractive index at the layer 608 that does not compensate for the difference in profiles of the surfaces 602, 604 and thus the diffusion may be increased to provide diffusion cone 424C. For comparison cones 424A and 424B from FIG. 5A and FIG. 8A are also shown.

Advantageously the fidelity of off-axis images seen by a snooper in a privacy display may be degraded and visual security level enhanced.

It may be desirable to maintain image fidelity for off-axis viewing positions in a public mode of operation and degrade off-axis image fidelity in a privacy mode of operation.

Figure 12A:
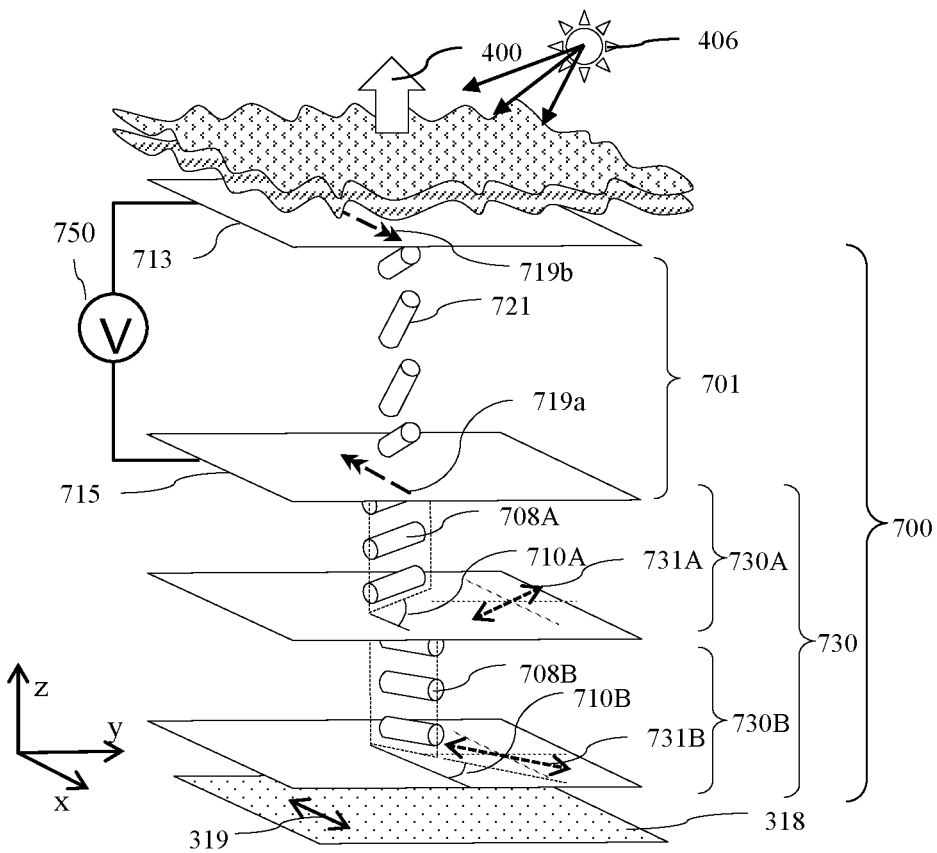
FIG. 12A is a diagram illustrating in perspective side view an arrangement of a switchable polar diffusion control retarder in a privacy mode comprising crossed A-plate passive retarders and homeotropically aligned switchable LC retarder.
Figure 12B:
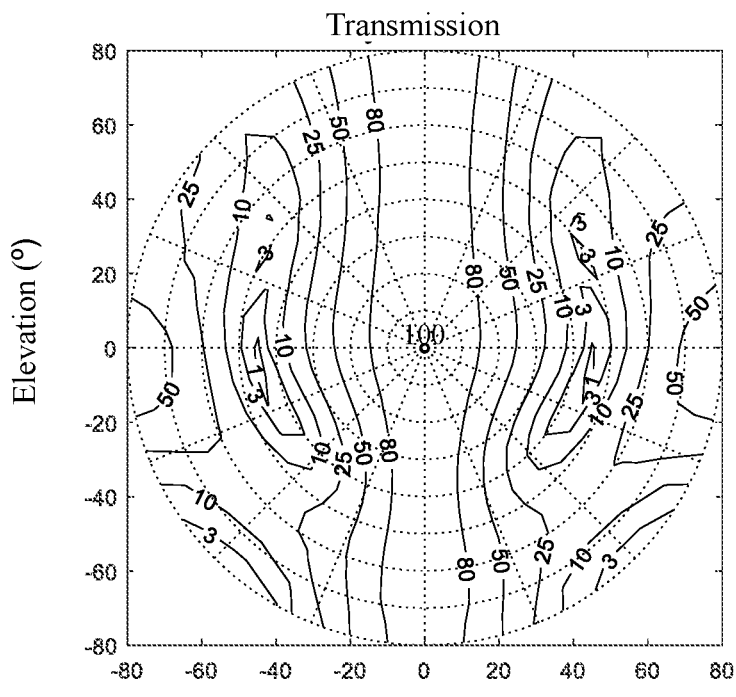
FIG. 12B is a graph illustrating the variation of output transmission with polar direction for transmitted light rays in the passive retarder of FIG. 11A in a privacy mode of operation if a polariser were arranged to analyse light output from the output diffuser structure.

FIG. 12A is a diagram illustrating in perspective side view an arrangement of a switchable polar diffusion control retarder in a privacy mode comprising crossed A-plate passive retarders and homeotropically aligned switchable LC retarder; and FIG. 12B is a graph illustrating the variation of output transmission with polar direction for transmitted light rays in the passive retarder of FIG. 11A in a privacy mode of operation if a polariser were arranged to analyse light output from the output diffuser structure for the illustrative embodiment of TABLE 2. Features of the arrangements of FIGS. 12A-D not discussed in further detail may be assumed to correspond to the features with equivalent reference numerals as discussed above, including any potential variations in the features.

TABLE 2

| | Passive polar control retarders 730 | | Active LC retarder 701 | | | | |
|---|---|---|---|---|---|---|---|
| Mode | Type | Δn.d/ nm | Alignment layers | Pretilt/ deg | Δn.d/ nm | Δε | Voltage/ V |
| Public | Crossed A | +500 @ 45° | Homogeneous | 2 | 750 | 13.2 | 10 |
| Privacy | | +500 @ 135° | Homogeneous | 2 | | | 2.3 |

The at least one polar diffusion control retarder comprises a switchable liquid crystal retarder 701 comprising a layer of liquid crystal material 721, wherein the at least one polar diffusion control retarder 700 is arranged, in a switchable state of the switchable liquid crystal retarder 701, simultaneously to introduce no net relative phase shift to orthogonal polarisation components of light passed by the output polariser 318 along an axis along a normal to the plane of the at least one polar diffusion control retarder 700 and to introduce a net relative phase shift to orthogonal polarisation components of light passed by the output polariser 318 along an axis inclined to a normal to the plane of the at least one polar diffusion control retarder 700.

Electrodes 731, 715 are arranged to provide a controlled voltage by means on voltage controller 750 across the layer of liquid crystal material 721.

In an illustrative embodiment, the switchable liquid crystal retarder 701 comprises two surface alignment layers 719a, 719b disposed adjacent to the layer of liquid crystal material 721 and on opposite sides thereof and each arranged to provide homogeneous alignment in the adjacent liquid crystal material 721. The layer of liquid crystal material 721 of the switchable liquid crystal retarder 701 comprises a liquid crystal material 721 with a positive dielectric anisotropy. The layer of liquid crystal material 721 has a retardance for light of a wavelength of 550 nm in a range from 500 nm to 900 nm, preferably in a range from 600 nm to 850 nm and most preferably in a range from 700 nm to 800 nm. The retarder 730 further comprises a pair of passive retarders 730A, 730B which have optical axes in the plane of the retarders that are crossed, each passive retarder of the pair of passive retarders having a retardance for light of a wavelength of 550 nm in a range from 300 nm to 800 nm, preferably in a range from 350 nm to 650 nm and most preferably in a range from 450 nm to 550 nm.

The passive polar diffusion control retarder 730 is provided by a pair of A-plates 730A, 730B that have crossed axes 731A, 731B. In the present embodiments, 'crossed' refers to an angle of substantially 90° between the optical axes of the two retarders in the plane of the retarders. To reduce cost of retarder materials, it is desirable to provide materials with some variation of retarder orientation due to stretching errors during film manufacture for example. Variations in retarder orientation away from preferable directions can reduce the head-on luminance and increase the minimum transmission. Preferably the angle 710A is at least 35° and at most 55°, more preferably at least 40° and at most 50° and most preferably at least 42.5° and at most 47.5°. Preferably the angle 710B is at least 125° and at most 145°, more preferably at least 130° and at most 135° and most preferably at least 132.5° and at most 137.5°.

The operation of the switchable diffuser of FIG. 12A will now be described.

Figure 12C:
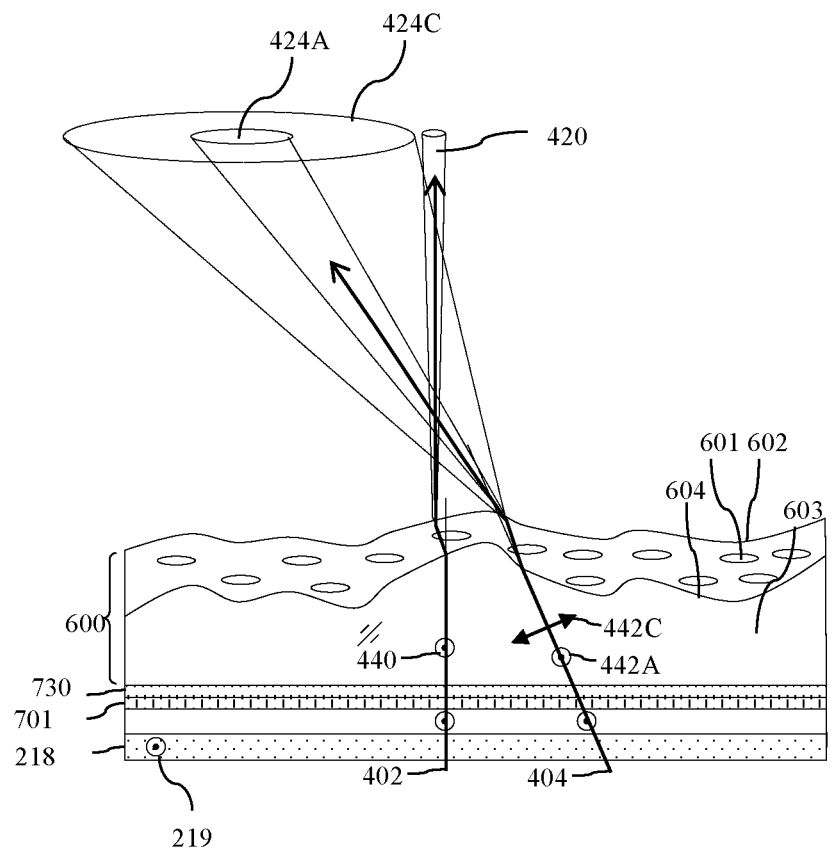
FIG. 12C is a diagram illustrating in side view propagation of transmitted light in a birefringent output diffuser structure comprising the polar diffusion control retarders of FIG. 12A.

FIG. 12C is a diagram illustrating in side view propagation of transmitted light in a birefringent output diffuser structure comprising the polar diffusion control retarders of FIG. 12A.

In comparison to the arrangement of FIG. 11C, the polarisation state that is incident onto the birefringent material 601 of the first transparent layer 608 may have a controlled polarisation state. In the public mode, state 442A may be provided on ray 404 so that the layer 608 provides small amount of diffusion and cone 424A is provided. In privacy mode, the diffuser may be switched so that the polarisation state 442C is provided and increased diffusion provided at the diffusing layer 608. The separation of the diffusing layer 608 from the image pixels 220, 222, 224 (not shown) provides a loss of image fidelity and advantageously increases the visual security level of the display 100. Further increased image privacy may be provided in the absence of an additional polariser, for example if the structure of FIG. 12C is provided with the display of FIG. 3 such that the output polariser is the spatial light modulator polariser 218. Advantageously cost and complexity is reduced.

Figure 12D:
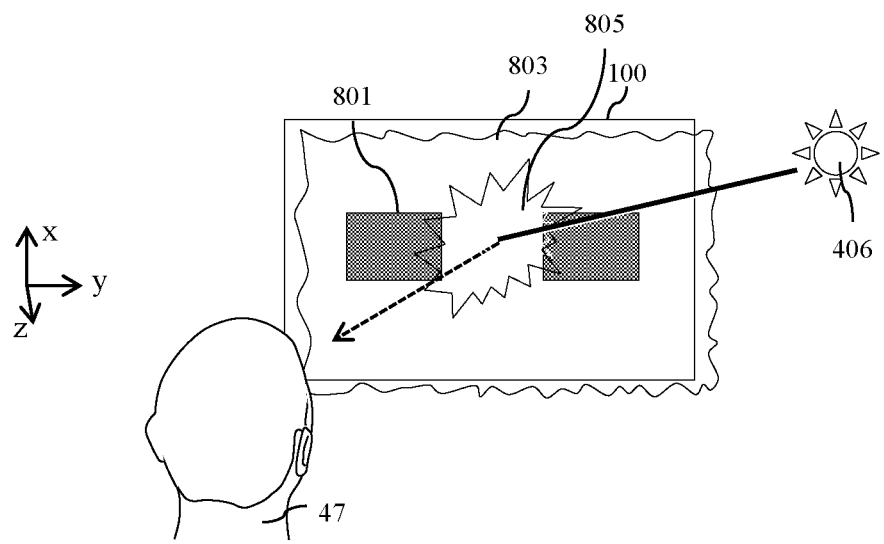
FIG. 12D is a diagram illustrating in front perspective view observation by an off-axis display user of reflected ambient light for the display of FIGS. 1A-B and the diffuser element of FIG. 12A in a public mode of operation.

FIG. 12D is a diagram illustrating in front perspective view observation by an off-axis display user of reflected ambient light for the display of FIGS. 1A-B and the diffuser element of FIG. 12A in a public mode of operation. Advantageously the diffuse reflection 805 from the front of the display is provided without substantial loss of image fidelity.

Example arrangements of privacy display to which output diffuser structures of the present embodiments can be applied will now be described.

It would be desirable to provide a visual security level in a privacy mode by reducing off-axis luminance and increasing off-axis reflectivity, for example as illustrated in FIG. 2. The operation of the polar phase control retarder 300 in FIG. 1A will now be described.

Figure 13A:
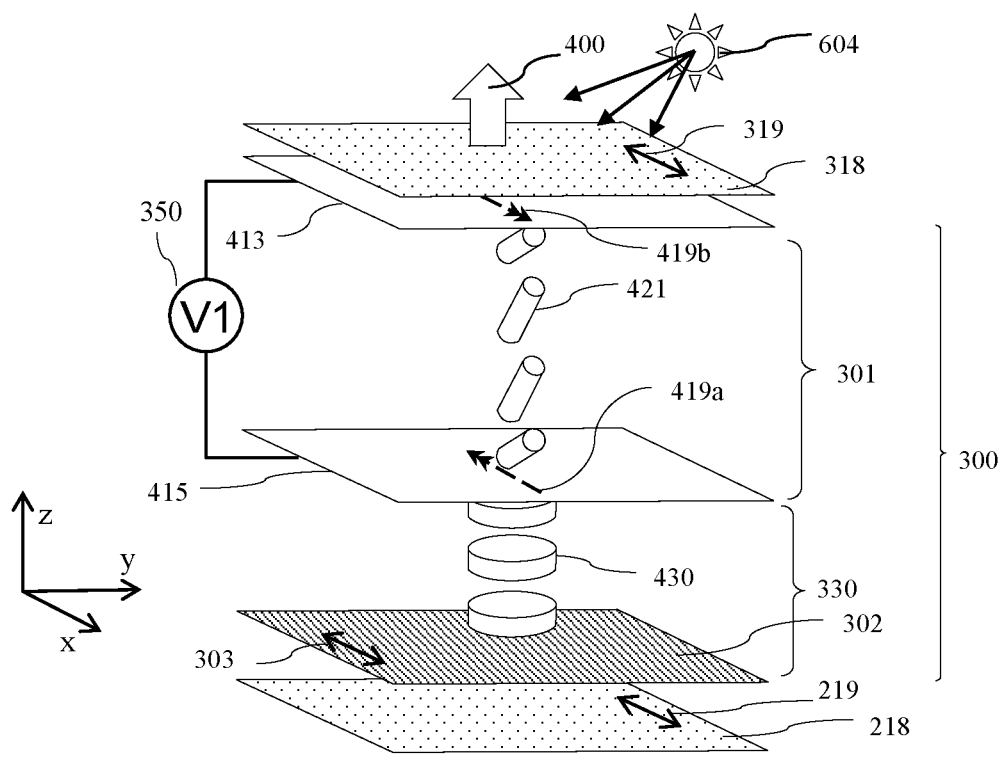
FIG. 13A is a diagram illustrating in perspective side view an arrangement of a switchable retarder in a public mode wherein the switchable retarder comprises a switchable LC layer with homogeneous alignment and a negative C-plate polar control retarder.

FIG. 13A is a schematic diagram illustrating in perspective side view an arrangement of a switchable retarder 300 in a public mode of operation wherein the switchable retarder comprises a switchable liquid crystal retarder 301 with homogeneous alignment and a negative C-plate polar phase control retarder.

The operation of the polar phase control retarder 330 and polarisers 302, 318 of FIG. 13A is different to the polar diffusion control retarder 700, polariser 318 and birefringent output diffuser structure of FIG. 12A. Polar phase control retarder 330 is arranged to provide a phase control of the polarisation state onto the polariser 318 such that a polar luminance control is provided, and to control polar reflectivity from the reflective polariser 302. By comparison the polar diffusion control retarder 700 is arranged to control the polarisation state incident onto the birefringent output diffuser 600 and does not control the luminance of the output but controls the amount of diffusion provided by the diffuser at each polar angle.

Figure 13B:
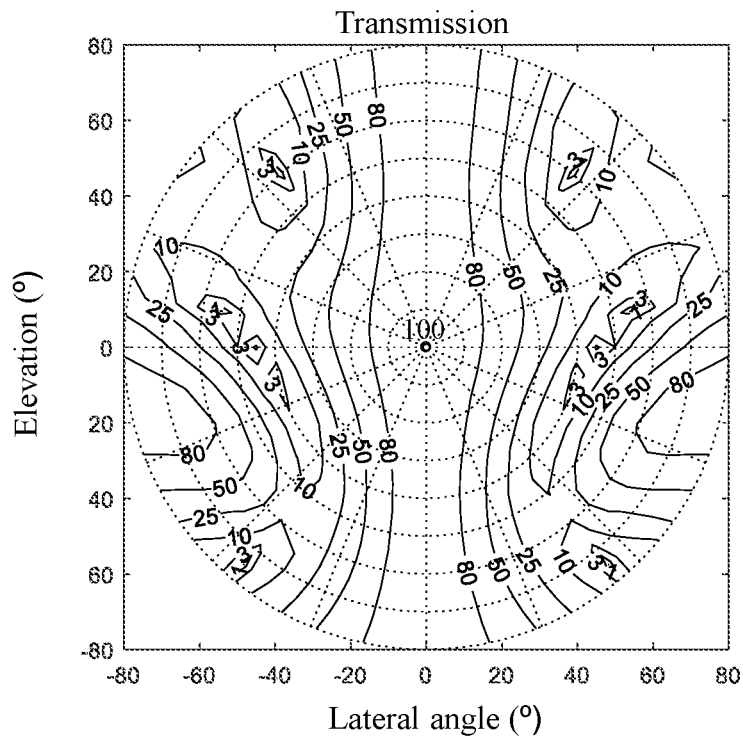
FIG. 13B is a graph illustrating the variation of output luminance with polar direction for transmitted light rays in FIG. 13A in a privacy mode.
Figure 13C:
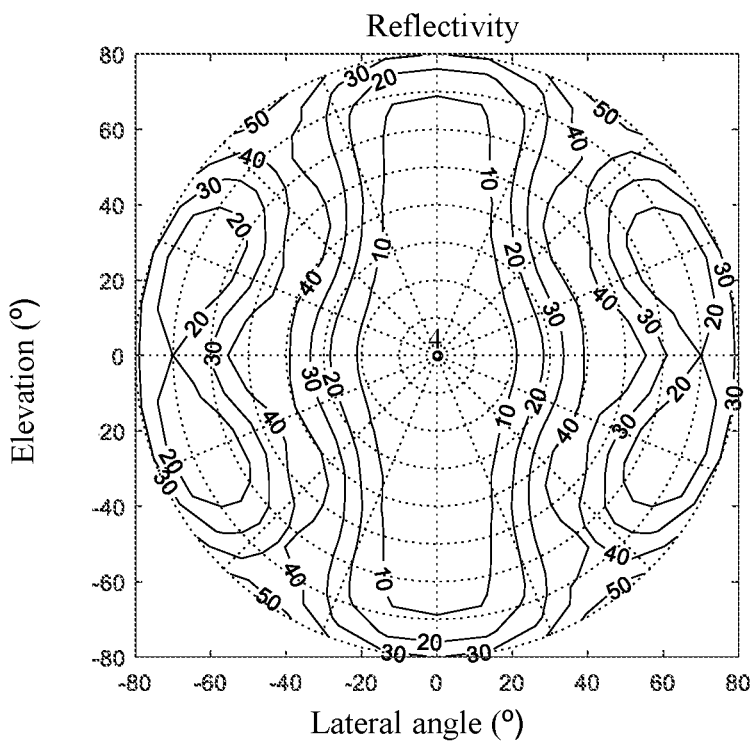
FIG. 13C is a graph illustrating the variation in reflectivity with polar direction for reflected light rays in FIG. 13A in a privacy mode.
Figure 13D:
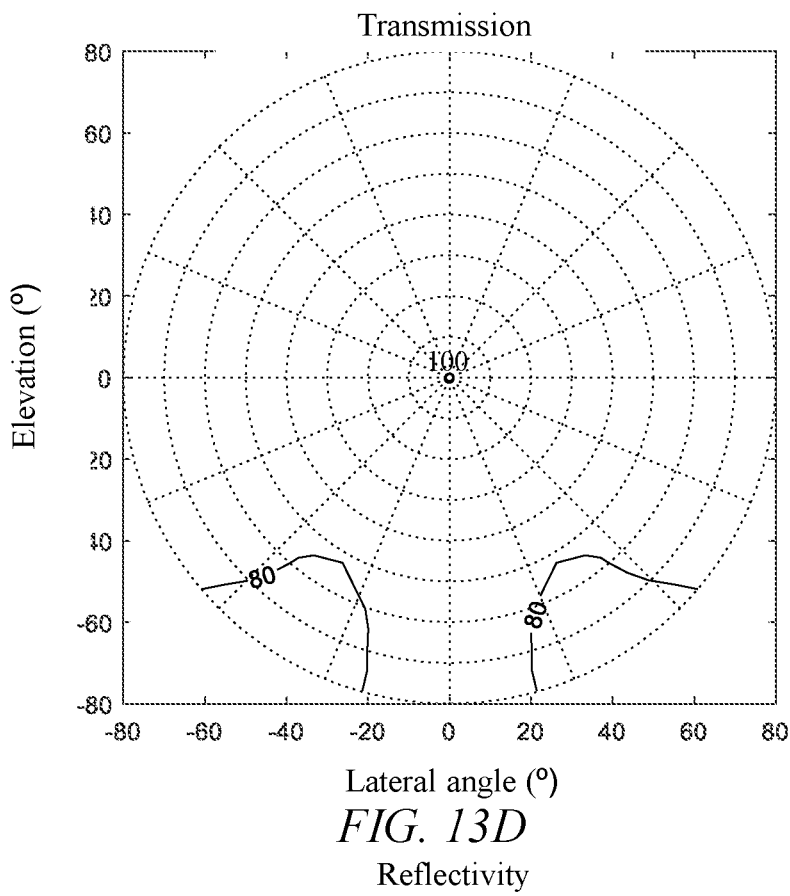
FIG. 13D is a graph illustrating the variation of output luminance with polar direction for transmitted light rays in FIG. 13A in a public mode.
Figure 13E:
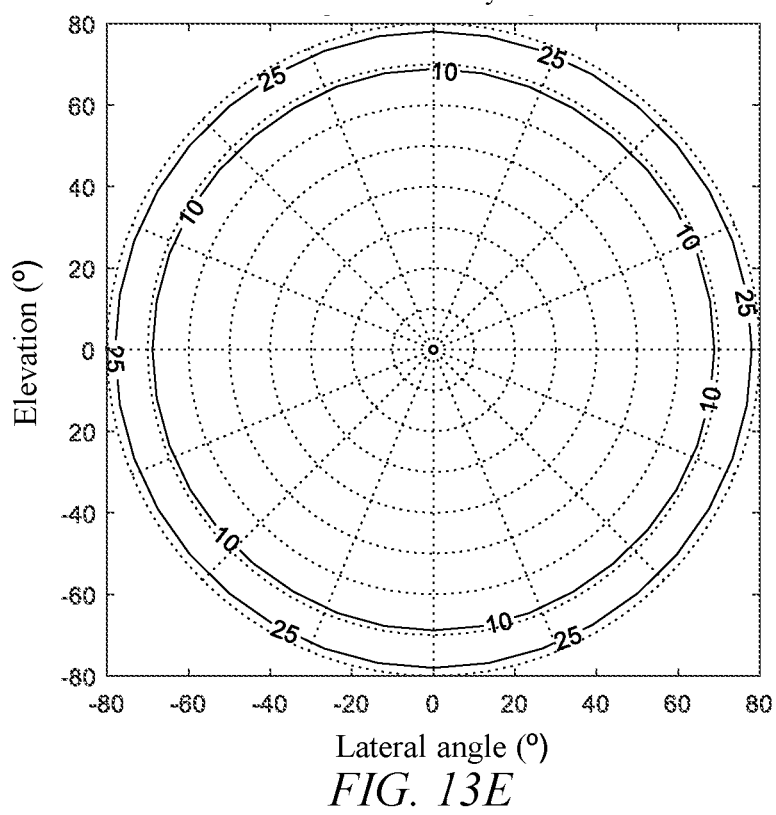
FIG. 13E is a graph illustrating the variation in reflectivity with polar direction for reflected light rays in FIG. 13A in a public mode.

FIG. 13B is a graph illustrating the variation of output luminance with polar direction for transmitted light rays in FIG. 13A in a privacy mode; FIG. 13C is a schematic graph illustrating the variation in reflectivity with polar direction for reflected light rays in FIG. 13A in a privacy mode of operation; FIG. 13D is a schematic graph illustrating the variation of output luminance with polar direction for transmitted light rays in FIG. 13A in a public mode of operation; and FIG. 13E is a schematic graph illustrating the variation in reflectivity with polar direction for reflected light rays in FIG. 13A in a public mode of operation comprising the embodiments illustrated in TABLE 3. Features of the arrangements of FIGS. 13A-E not discussed in further detail may be assumed to correspond to the features with equivalent reference numerals as discussed above, including any potential variations in the features.

TABLE 3

| Mode | Passive polar control retarder(s) | | Active LC retarder | | | |
|---|---|---|---|---|---|---|
| | Type | Δn.d/ nm | Alignment layers | Pretilt/ deg | Δn.d/ nm | Δε | Voltage/ V |
| Public | Negative C | −500 | Homogeneous | 2 | 750 | +13.2 | 10.0 |
| Privacy | | | Homogeneous | 2 | | | 3.8 |

The switchable liquid crystal retarder 301 comprises two surface alignment layers 419a, 419b disposed adjacent to the layer of liquid crystal material 421 and on opposite sides thereof and each arranged to provide homogeneous alignment in the adjacent liquid crystal material 414. The layer 314 of liquid crystal material 414 of the switchable liquid crystal retarder 301 comprises a liquid crystal material 414 with a positive dielectric anisotropy. The layer of liquid crystal material 414 has a retardance for light of a wavelength of 550 nm in a range from 500 nm to 900 nm, preferably in a range from 600 nm to 850 nm and most preferably in a range from 700 nm to 800 nm. The retarder 330 further comprises a passive retarder having an optical axis perpendicular to the plane of the retarder, the passive retarder having a retardance for light of a wavelength of 550 nm in a range from −300 nm to −700 nm, preferably in a range from −350 nm to −600 nm and most preferably in a range from −400 nm to −500 nm.

The passive retarders may be provided using stretched films to advantageously achieve low cost and high uniformity. Further field of view for liquid crystal retarders with homogeneous alignment is increased while providing resilience to the visibility of flow of liquid crystal material during applied pressure.

Arrangements of alternative arrangements of passive polar phase control retarders 330 and liquid crystal retarder 301 are described in U.S. Pat. No. 10,303,030.

Advantageously a public mode of operation may be provided with high luminance and low reflectivity for off-axis and on-axis viewing positions, achieving high image visibility. Further a privacy mode of operation may be provided with a low luminance and high reflectivity for off-axis viewing positions with a high visual security level. Further, front surface diffusion may be provided that does not degrade the image seen by the primary user while achieving reduced visibility of specular reflections to the primary display user.

The propagation of polarised light from the display polariser 218 will now be considered for on-axis and off-axis directions.

Figure 14A:
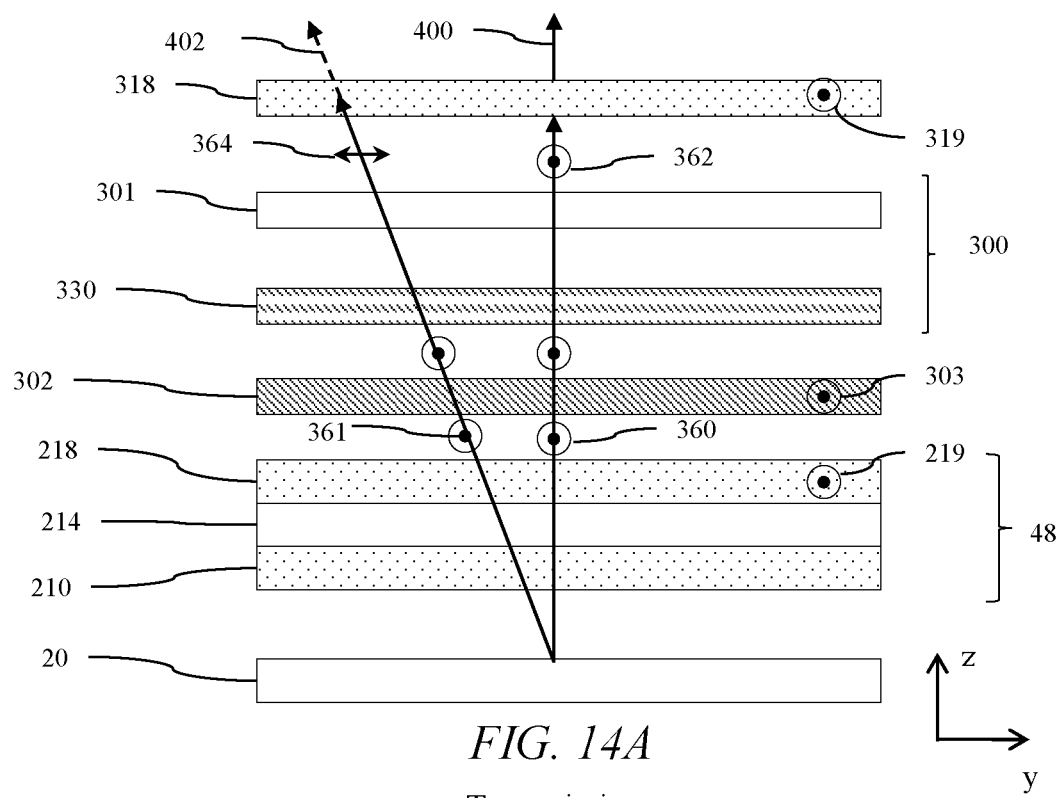
FIG. 14A is a diagram illustrating in side view propagation of output light from a spatial light modulator through the optical stack of FIG. 1A in a privacy mode.
Figure 14B:
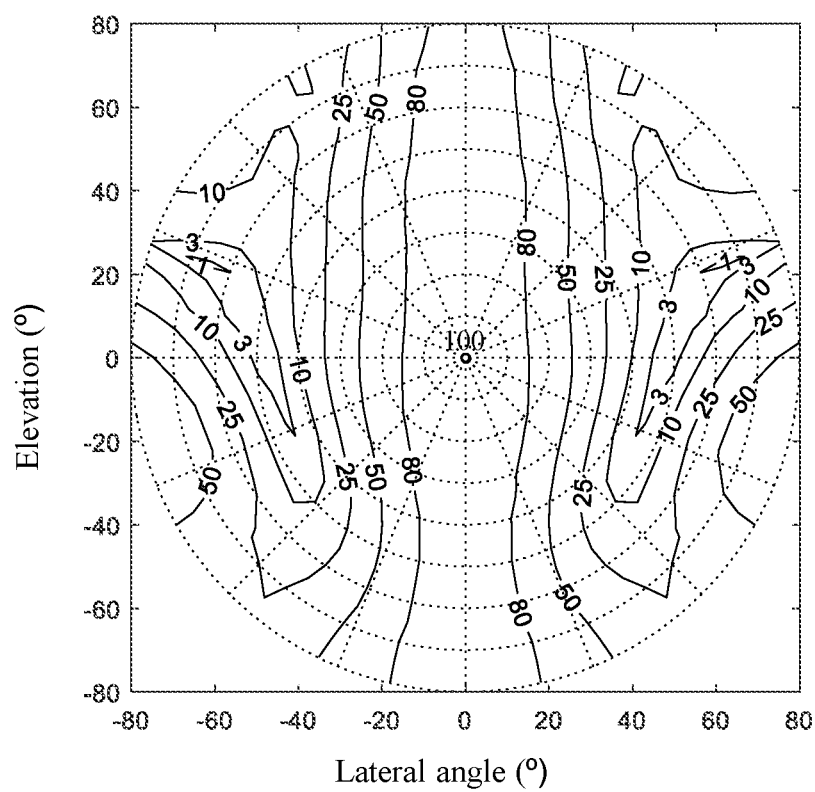
FIG. 14B is a graph illustrating the variation of output luminance with polar direction for the transmitted light rays in FIG. 4A.

FIG. 14A is a schematic diagram illustrating in side view propagation of output light from a spatial light modulator through the optical stack of FIG. 1A in a privacy mode of operation; and FIG. 14B is a schematic graph illustrating the variation of output luminance with polar direction for the transmitted light rays in FIG. 14A. When the layer 314 of liquid crystal material is in a second state of said two states, the polar phase control retarder 300 provides no overall transformation of polarisation component 360 to output light rays 400 passing therethrough along an axis perpendicular to the plane of the switchable retarder, but provides an overall transformation of polarisation component 361 to light rays 402 passing therethrough for some polar angles which are at an acute angle to the perpendicular to the plane of the retarders. Features of the arrangement of FIG. 14A not discussed in further detail may be assumed to correspond to the features with equivalent reference numerals as discussed above, including any potential variations in the features.

Polarisation component 360 from the display polariser 218 is transmitted by reflective polariser 302 and incident on retarders 300. On-axis light has a polarisation component 362 that is unmodified from component 360 while off-axis light has a polarisation component 364 that is transformed by the polar phase control retarder 300. At a minimum, the polarisation component 361 is transformed to a linear polarisation component 364 and absorbed by additional polariser 318. More generally, the polarisation component 361 is transformed to an elliptical polarisation component, that is partially absorbed by additional polariser 318.

Thus in a polar representation of transmission by the polar phase control retarder 300 and additional polariser 318 in a privacy mode, regions of high transmission and regions of low transmission are provided as illustrated in FIG. 14B.

The polar distribution of light transmission illustrated in FIG. 14B modifies the polar distribution of luminance output of the underlying spatial light modulator 48. In the case that the spatial light modulator 48 comprises a directional backlight 20 then off-axis luminance may be further be reduced as described above.

Advantageously, a privacy display is provided that has low luminance to an off-axis snooper while maintaining high luminance for an on-axis observer.

The operation of the reflective polariser 302 for light from ambient light source 406 will now be described.

Figure 15A:
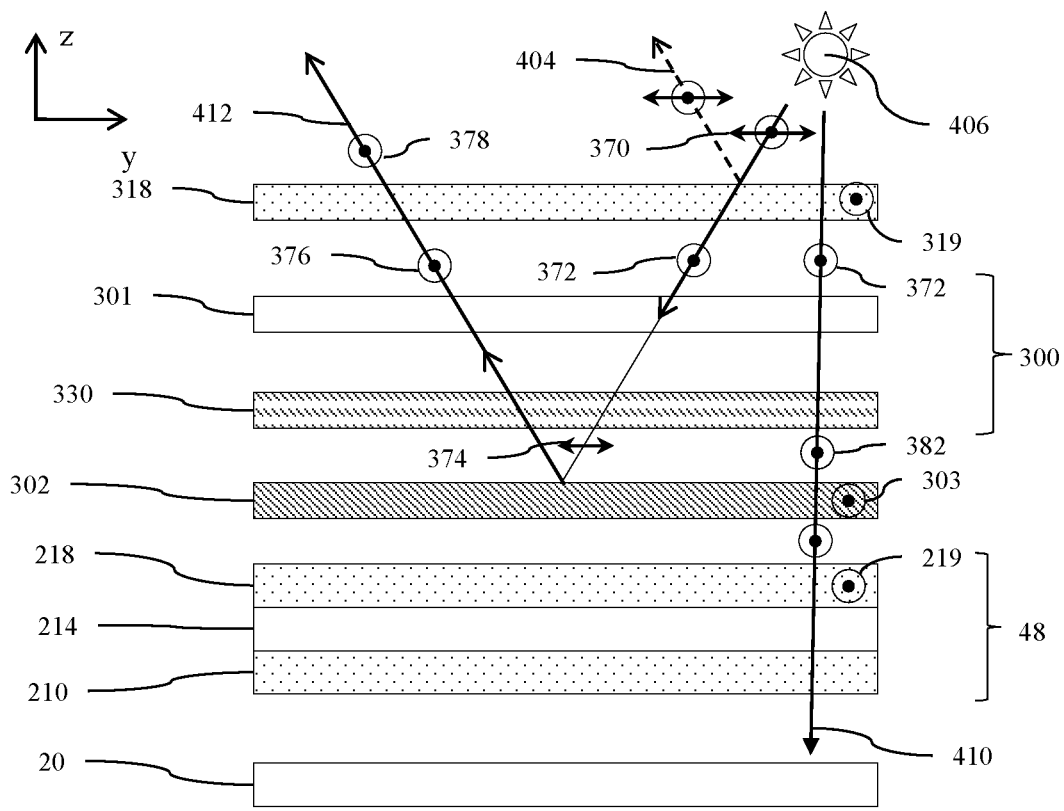
FIG. 15A is a diagram illustrating in top view propagation of ambient illumination light through the optical stack of FIG. 1A in a privacy mode.
Figure 15B:
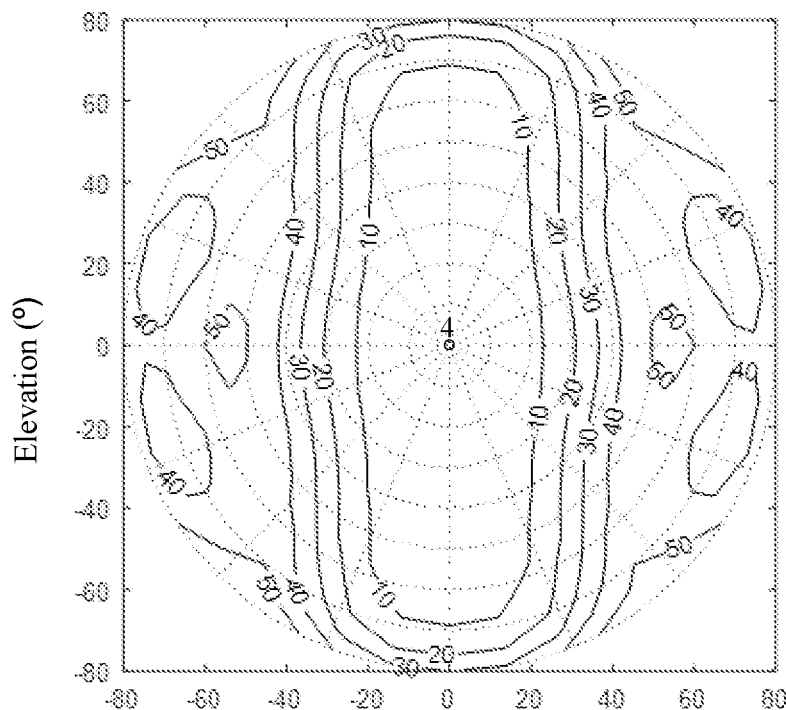
FIG. 15B is a graph illustrating the variation of reflectivity with polar direction for the reflected light rays in FIG. 5A.

FIG. 15A is a schematic diagram illustrating in top view propagation of ambient illumination light through the optical stack of FIG. 1A in a privacy mode of operation; and FIG. 15B is a schematic graph illustrating the variation of reflectivity with polar direction for the reflected light rays in FIG. 15A. Features of the arrangement of FIG. 15A not discussed in further detail may be assumed to correspond to the features with equivalent reference numerals as discussed above, including any potential variations in the features.

Ambient light source 406 illuminates the display 100 with unpolarised light. Additional polariser 318 transmits light ray 410 normal to the display surface with a first polarisation component 372 that is a linear polarisation component parallel to the electric vector transmission direction 319 of the additional polariser 318.

In both states of operation, the polarisation component 372 remains unmodified by the polar phase control retarder 300 and so transmitted polarisation component 382 is parallel to the transmission axis of the reflective polariser 302 and the display polariser 218, so ambient light is directed through the spatial light modulator 48 and lost.

By comparison, for ray 412, off-axis light is directed through the polar phase control retarder 300 such that polarisation component 374 incident on the reflective polariser 302 may be reflected. Such polarisation component is re-converted into component 376 after passing through retarders 300 and is transmitted through the additional polariser 318.

Thus when the layer 314 of liquid crystal material is in the second state of said two states, the reflective polariser 302 provides no reflected light for ambient light rays 410 passing through the additional polariser 318 and then the polar phase control retarder 300 along an axis perpendicular to the plane of the polar phase control retarder 300, but provides reflected light rays 412 for ambient light passing through the additional polariser 318 and then the polar phase control retarder 300 at some polar angles which are at an acute angle to the perpendicular to the plane of the polar phase control retarder 300; wherein the reflected light 412 passes back through the polar phase control retarder 300 and is then transmitted by the additional polariser 318.

The polar phase control retarder 300 thus provides no overall transformation of polarisation component 380 to ambient light rays 410 passing through the additional polariser 318 and then the polar phase control retarder 300 along an axis perpendicular to the plane of the switchable retarder, but provides an overall transformation of polarisation component 372 to ambient light rays 412 passing through the absorptive polariser 318 and then the polar phase control retarder 300 at some polar angles which are at an acute angle to the perpendicular to the plane of the polar phase control retarder 300.

The polar distribution of light reflection illustrated in FIG. 15B thus illustrates that high reflectivity can be provided at typical snooper locations by means of the privacy state of the polar phase control retarder 300. Thus, in the privacy mode of operation, the reflectivity for off-axis viewing positions is increased, and the luminance for off-axis light from the spatial light modulator is reduced as illustrated in FIG. 14B.

Advantageously, a privacy display is provided that has high reflectivity to an off-axis snooper while maintaining low reflectivity for an on-axis observer. As is described above, such increased reflectivity provides increased visual security level for the display in an ambiently illuminated environment.

Figure 16A:
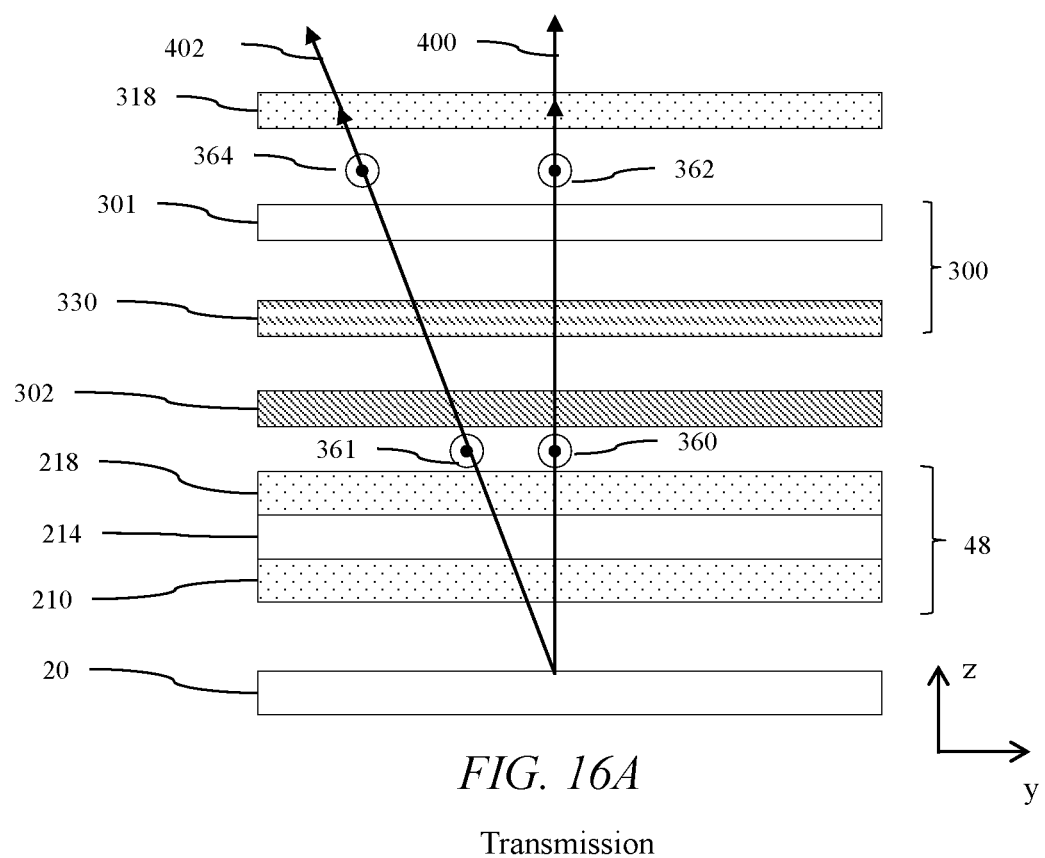
FIG. 16A is a diagram illustrating in side view propagation of output light from a spatial light modulator through the optical stack of FIG. 1A in a public mode.
Figure 16B:
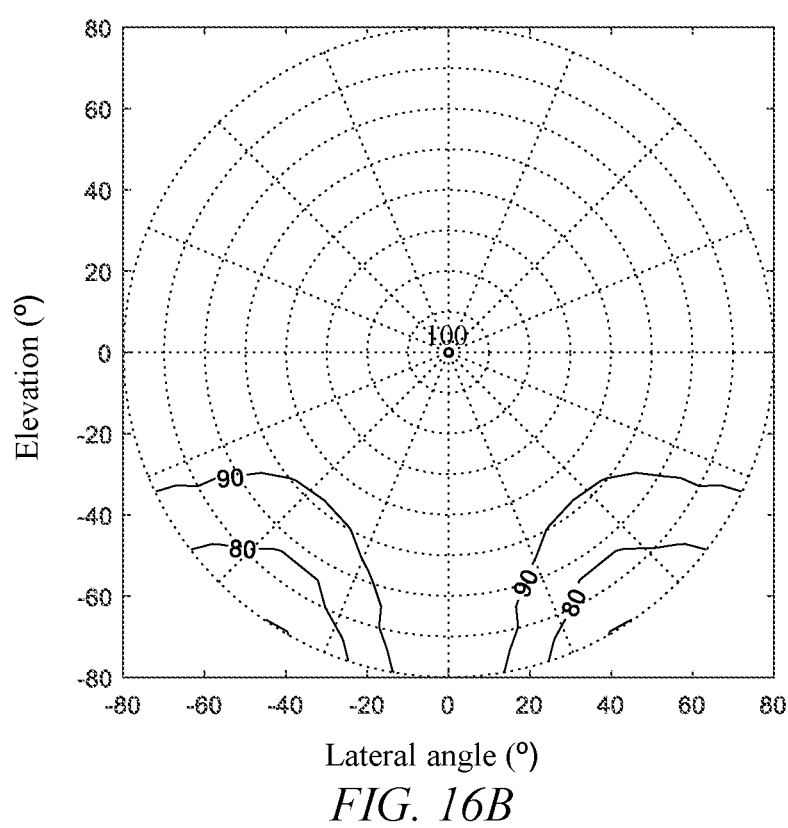
FIG. 16B is a graph illustrating the variation of output luminance with polar direction for the transmitted light rays in FIG. 16A.

FIG. 16A is a schematic diagram illustrating in side view propagation of output light from a spatial light modulator through the optical stack of FIG. 1A in a public mode of operation; and FIG. 16B is a schematic graph illustrating the variation of output luminance with polar direction for the transmitted light rays in FIG. 16A. Features of the arrangements of FIGS. 16A-B not discussed in further detail may be assumed to correspond to the features with equivalent reference numerals as discussed above, including any potential variations in the features.

Thus when the liquid crystal retarder 301 is in a first state of said two states, the polar phase control retarder 300 provides no overall transformation of polarisation component 360, 361 to output light passing therethrough perpendicular to the plane of the switchable retarder 301 or at an acute angle to the perpendicular to the plane of the switchable retarder 301. That is polarisation component 362 is substantially the same as polarisation component 360 and polarisation component 364 is substantially the same as polarisation component 361. Thus the angular transmission profile of FIG. 16B is substantially uniformly transmitting across a wide polar region. Advantageously a display may be switched to a wide field of view.

Figure 17A:
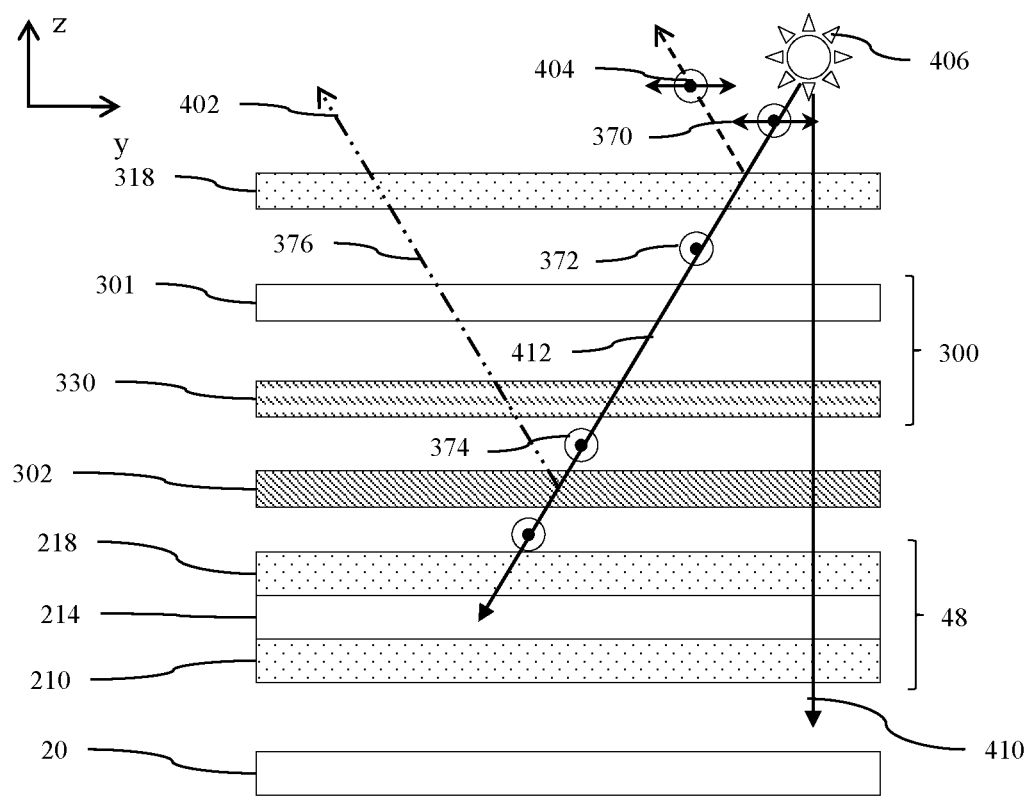
FIG. 17A is a diagram illustrating in top view propagation of ambient illumination light through the optical stack of FIG. 1A in a public mode.
Figure 17B:
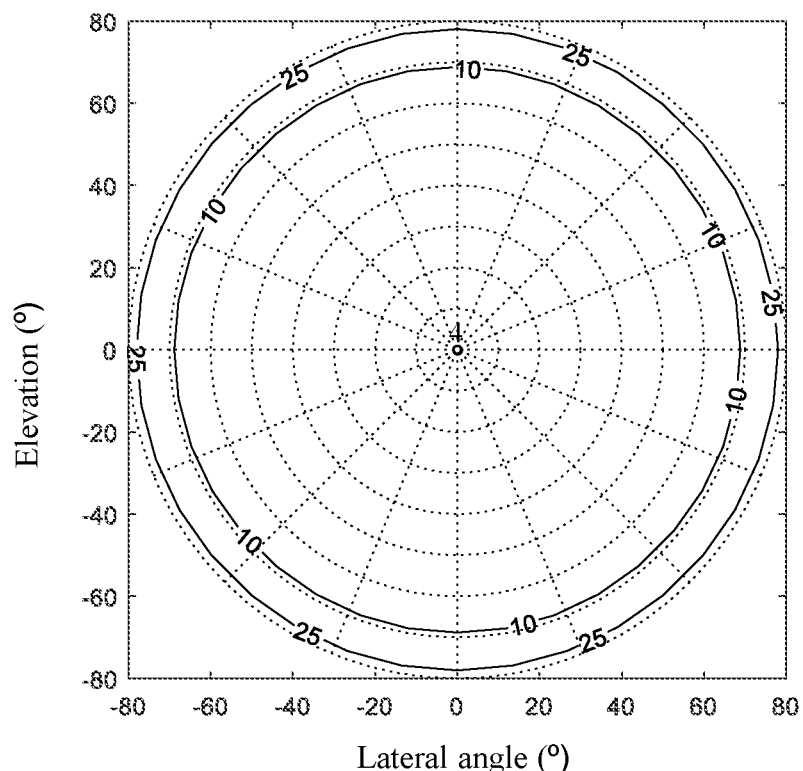
FIG. 17B is a graph illustrating the variation of reflectivity with polar direction for the reflected light rays in FIG. 17A.

FIG. 17A is a schematic diagram illustrating in top view propagation of ambient illumination light through the optical stack of FIG. 1A in a public mode of operation; and FIG. 17B is a schematic graph illustrating the variation of reflectivity with polar direction for the reflected light rays in FIG. 17A. Features of the arrangements of FIGS. 17A-B not discussed in further detail may be assumed to correspond to the features with equivalent reference numerals as discussed above, including any potential variations in the features.

Thus when the liquid crystal retarder 301 is in the first state of said two states, the polar phase control retarder 300 provides no overall transformation of polarisation component 372 to ambient light rays 412 passing through the additional polariser 318 and then the polar phase control retarder 300, that is perpendicular to the plane of the polar phase control retarder 300 or at an acute angle to the perpendicular to the plane of the polar phase control retarder 300.

In operation in the public mode, input light ray 412 has polarisation state 372 after transmission through the additional polariser 318. For both head-on and off-axis directions no polarisation transformation occurs and thus the reflectivity for light rays 402 from the reflective polariser 302 is low. Light ray 412 is transmitted by reflective polariser 302 and lost in the display polarisers 218, 210 or the backlight of FIG. 1A or optical isolator 218, 518 in an emissive spatial light modulator 38 of FIG. 1B.

Advantageously in a public mode of operation, high luminance and low reflectivity is provided across a wide field of view. Such a display can be conveniently viewed with high contrast by multiple observers.

It would be desirable to provide further reduction of off-axis luminance by means of directional illumination from the spatial light modulator 48. Directional illumination of the spatial light modulator 48 by directional backlights 20 will now be described.

Figure 18:
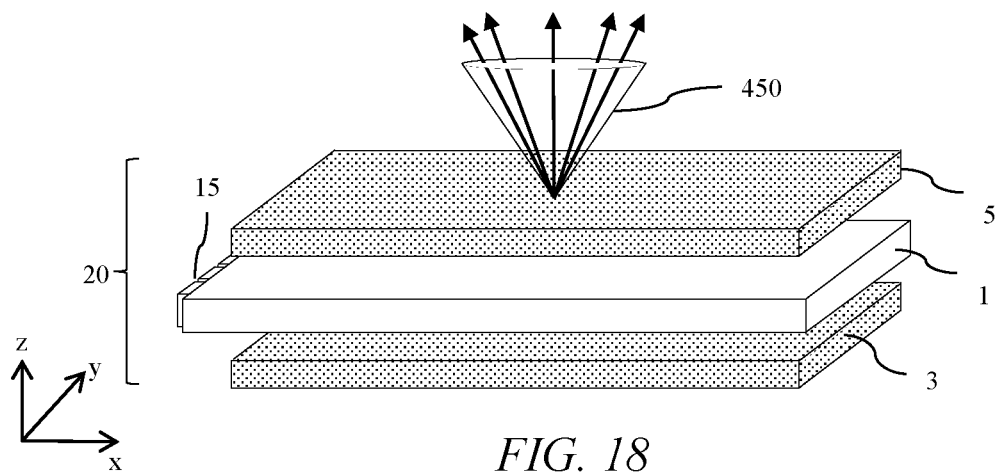
FIG. 18 is a diagram illustrating in front perspective view a directional backlight.
Figure 19:
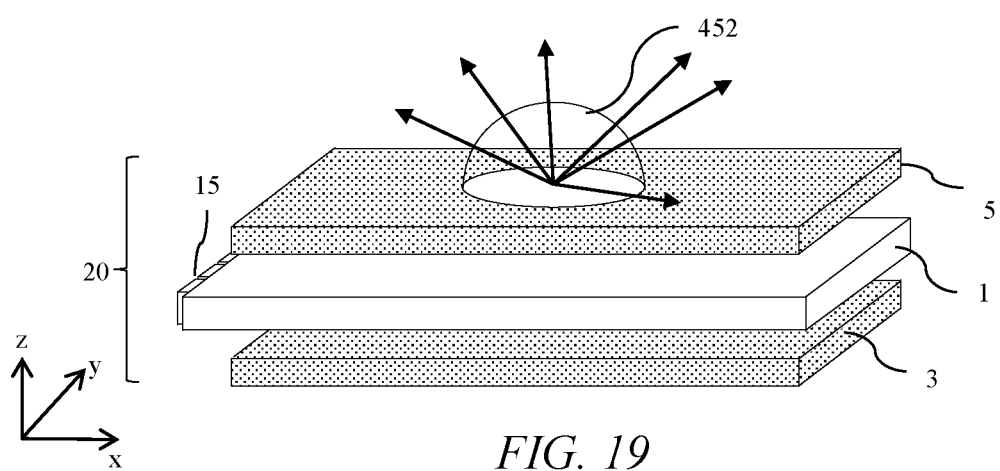
FIG. 19 is a diagram illustrating in front perspective view a non-directional backlight.

FIG. 18 is a schematic diagram illustrating in front perspective view a directional backlight 20 (or 'narrow angle' or 'collimated' backlight), and FIG. 19 is a schematic diagram illustrating in front perspective view a non-directional backlight 20 (or 'wide-angle' backlight or 'non-collimated' backlight), either of which may be applied in any of the devices described herein. Thus a directional backlight 20 as shown in FIG. 18 provides a narrow cone 450, whereas a non-directional backlight 20 as shown in FIG. 19 provides a wide angular distribution cone 452 of light output rays.

Figure 20:
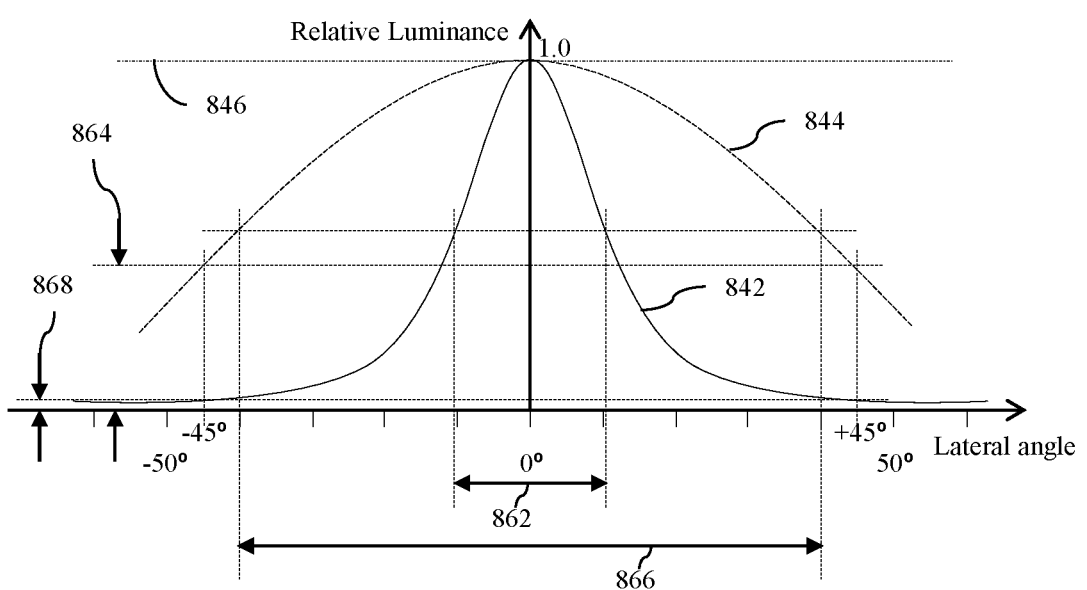
FIG. 20 is a graph illustrating variation with luminance with lateral viewing angle of displays with different fields of view.

FIG. 20 is a schematic graph illustrating variation with luminance with lateral viewing angle for various different backlight arrangements. The graph of FIG. 20 may be a cross section through the polar field-of-view profiles described herein. Features of the arrangements of FIGS. 18-20 not discussed in further detail may be assumed to correspond to the features with equivalent reference numerals as discussed above, including any potential variations in the features.

A Lambertian backlight has a luminance profile 846 that is independent of viewing angle. In the present embodiments, the backlight 20 may be arranged to provide an angular light distribution that has reduced luminance for off-axis viewing positions in comparison to head-on luminance.

A typical wide angle backlight has a roll-off at higher angles such that the full width half maximum of relative luminance may be preferably greater than 40°, more preferably greater than 60° and most preferably greater than 80°. A typical wide angle backlight has a roll-off at higher angles such that the full width half maximum 866 of relative luminance may be greater than 40°, preferably greater than 60° and most preferably greater than 80°. Further the relative luminance 864 at +/−45°, is preferably greater than 7.5%, more preferably greater than 10% and most preferably greater than 20%. Advantageously a display that achieves a roll-off similar to the wide angle backlight may provide high image visibility to off-axis users.

Displays comprising wide angle backlights 20 and only one additional polariser 318 and polar phase control retarder 330 (not comprising further polar phase control retarders 300B and further additional polariser 318B) do not typically achieve desirable visual security level to off-axis users in privacy mode of operation. Desirably such displays may be provided with a directional backlight 20 as will now be described.

The backlight 20 may be a directional backlight that provides a luminance at polar angles to the normal to the spatial light modulator greater than 45 degrees in at least one azimuthal direction that is at most 30% of the luminance along the normal to the spatial light modulator, preferably at most 20% of the luminance along the normal to the spatial light modulator, and more preferably at most 10% of the luminance along the normal to the spatial light modulator. The directional backlight 20 may have a roll-off at higher angles such that the full width half maximum 862 of relative luminance may be less than 60°, preferably less than 40° and most preferably less than 20°. In an illustrative example the luminance 868 at 45 degrees may be 18% of the head-on luminance from the backlight 20.

Such luminance profiles may be provided by the directional backlights 20 described below or may also be provided by wide angle backlights in combination with further additional polariser 318B and polar phase control retarders 300B as described elsewhere herein.

One type of a switchable backlight 20 will now be described.

Figure 21A:
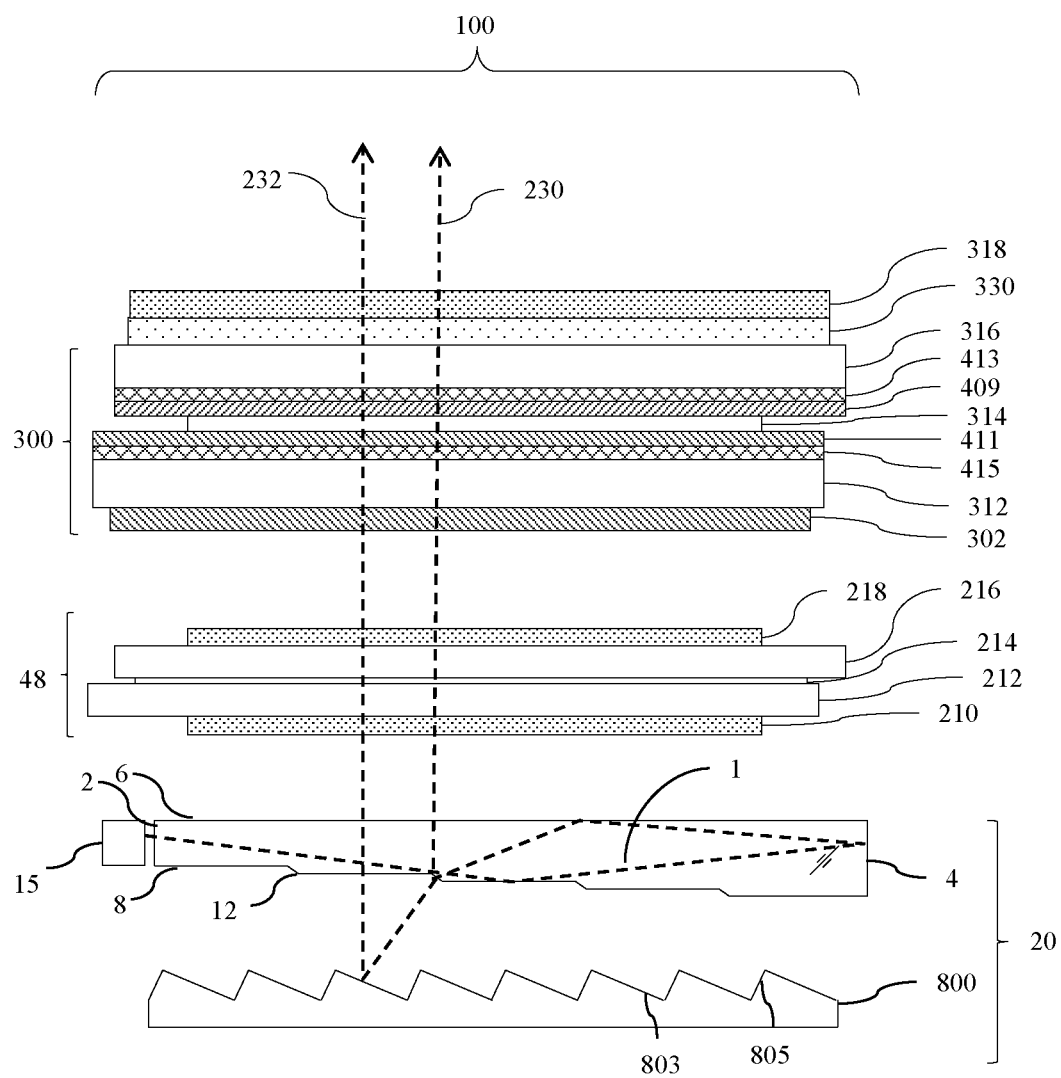
FIG. 21A is a diagram illustrating in side view a switchable directional display apparatus comprising an imaging waveguide and switchable LC retarder.
Figure 21B:
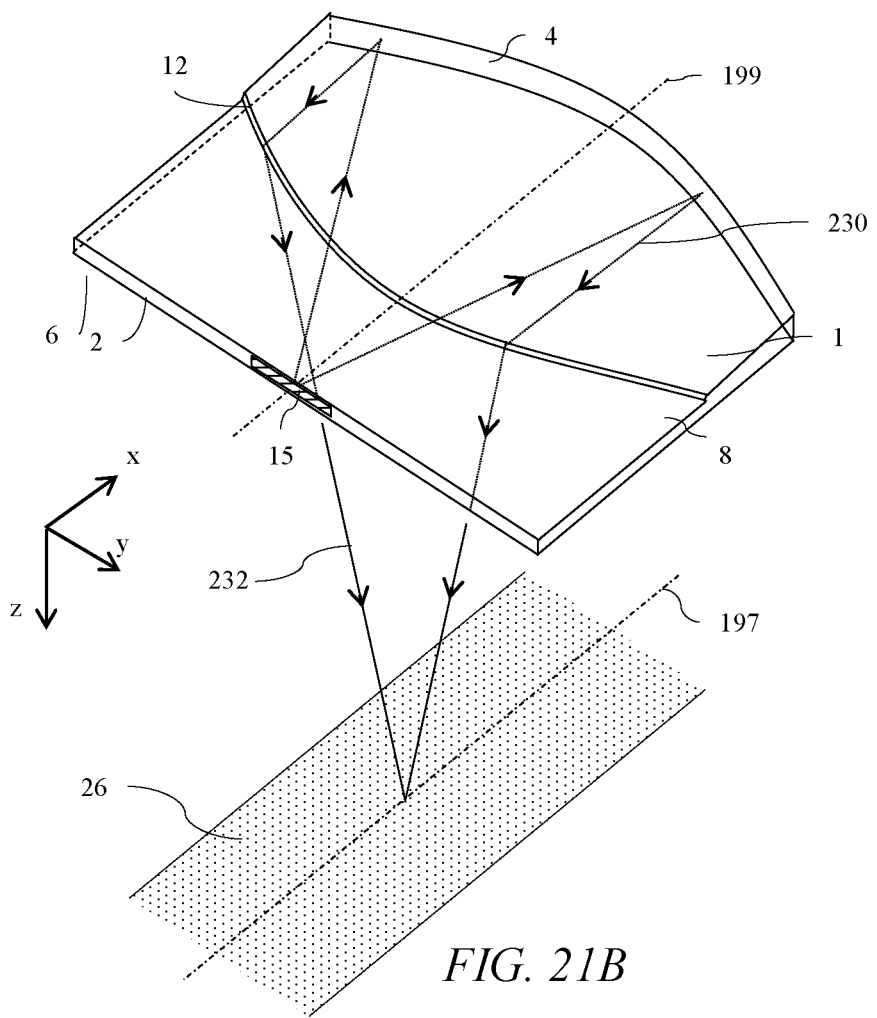
FIG. 21B is a diagram illustrating in rear perspective view operation of an imaging waveguide in a narrow angle mode.

FIG. 21A is a schematic diagram illustrating in side view a switchable directional display apparatus 100 comprising a switchable liquid crystal polar phase control retarder 300 and backlight 20. The backlight 20 of FIG. 21A may be applied in any of the devices described herein and which comprises an imaging waveguide 1 illuminated by a light source array 15 through an input end 2. FIG. 21B which is a schematic diagram illustrating in rear perspective view operation of the imaging waveguide 1 of FIG. 21A in a narrow angle mode of operation.

The imaging waveguides 1 is of the type described in U.S. Pat. No. 9,519,153, which is herein incorporated by reference in its entirety. The waveguide 1 has an input end 2 extending in a lateral direction along the waveguide 1. An array of light sources 15 are disposed along the input end 2 and input light into the waveguide 1.

The waveguide 1 also has opposed first and second guide surfaces 6, 8 extending across the waveguide 1 from the input end 2 to a reflective end 4 for guiding light input at the input end 2 forwards and back along the waveguide 1. The second guide surface 8 has a plurality of light extraction features 12 facing the reflective end 4 and arranged to deflect at least some of the light guided back through the waveguide 1 from the reflective end 4 from different input positions across the input end 2 in different directions through the first guide surface 6 that are dependent on the input position.

In operation, light rays are directed from light source array 15 through an input end and are guided between first and second guiding surfaces 6, 8 without loss to a reflective end 4. Reflected rays are incident onto facets 12 and output by reflection as light rays 230 or transmitted as light rays 232. Transmitted light rays 232 are directed back through the waveguide 1 by facets 803, 805 of rear reflector 800. Operation of rear reflectors are described further in U.S. Pat. No. 10,054,732, which is herein incorporated by reference in its entirety.

As illustrated in FIG. 21B, optical power of the curved reflective end 4 and facets 12 provide an optical window 26 that is transmitted through the spatial light modulator 48 and has an axis 197 that is typically aligned to the optical axis 199 of the waveguide 1. Similar optical window 26 is provided by transmitted light rays 232 that are reflected by the rear reflector 800.

Figure 21C:
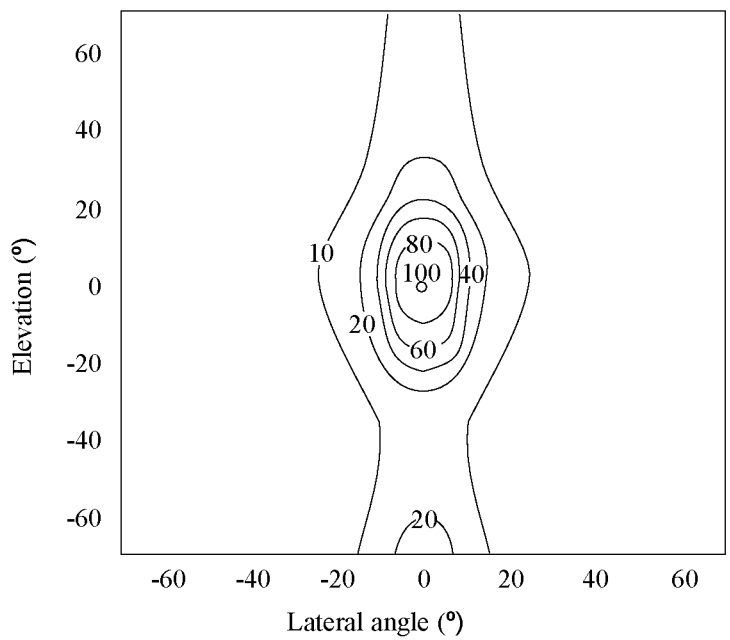
FIG. 21C is a graph illustrating a field-of-view luminance plot of the output of FIG. 21B when used in a display apparatus with no switchable LC retarder.

FIG. 21C is a schematic graph illustrating field-of-view luminance plot of the output of FIG. 21B when used in a display apparatus with no switchable liquid crystal retarder. Features of the arrangements of FIGS. 21A-C not discussed in further detail may be assumed to correspond to the features with equivalent reference numerals as discussed above, including any potential variations in the features.

Thus for off-axis viewing positions observed by snoopers 47 may have reduced luminance, for example between 1% and 3% of the central peak luminance at an elevation of 0 degrees and lateral angle of +/−45 degrees. Further reduction of off-axis luminance is achieved by the plural retarders 301, 330 of the present embodiments.

Backlight 20 may thus further comprise a switchable backlight arranged to switch the output angular luminance profile in order to provide reduced off-axis luminance in a privacy mode of operation and higher off-axis luminance in a public mode of operation.

Another type of directional backlight with low off-axis luminance will now be described.

Figure 22A:
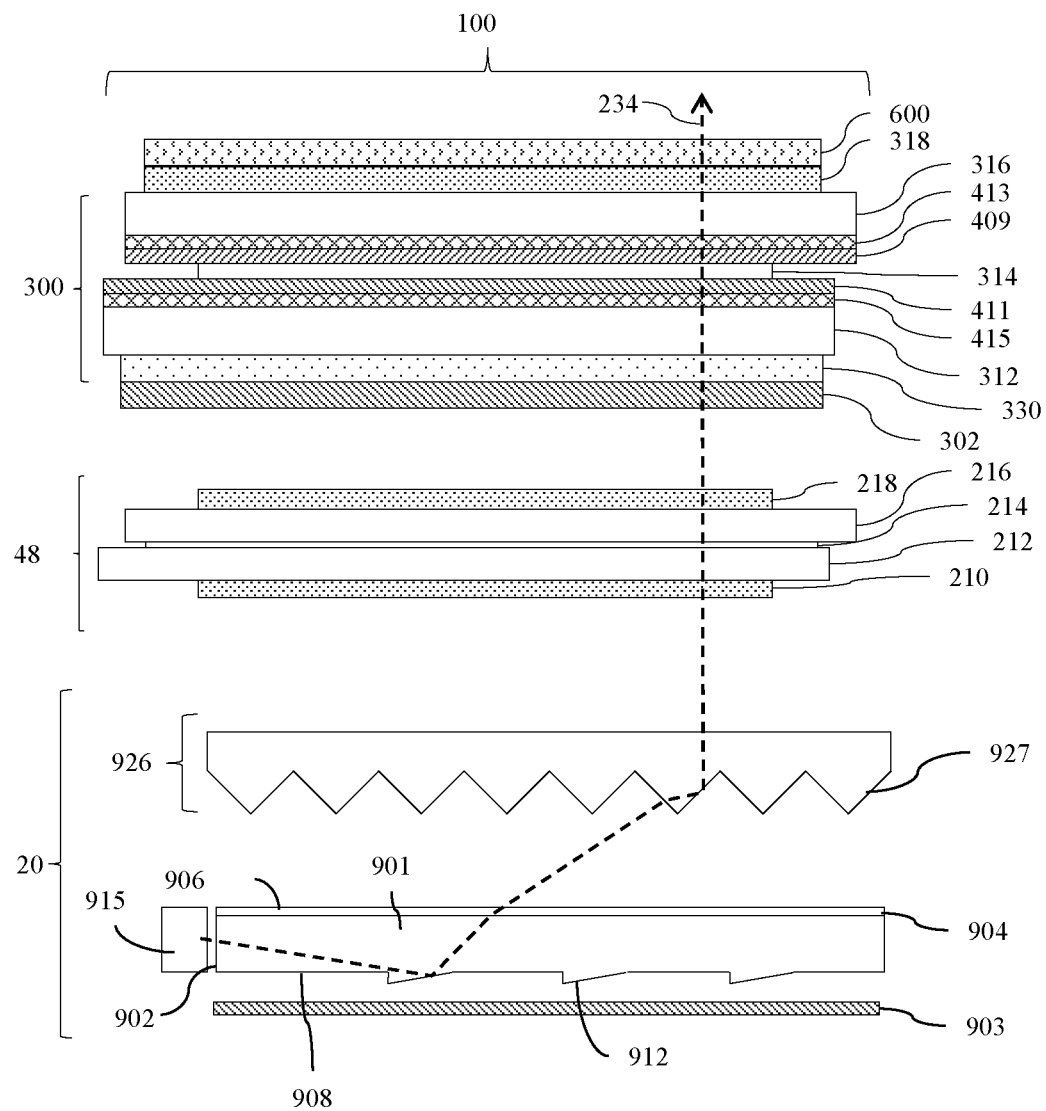
FIG. 22A is a diagram illustrating in side view a switchable directional display apparatus comprising a switchable collimating waveguide and a switchable LC retarder in a privacy mode.

FIG. 22A is a schematic diagram illustrating in side view a switchable directional display apparatus comprising a backlight 20 including a switchable collimating waveguide 901 and a switchable liquid crystal polar phase control retarder 300 and additional polariser 318. The backlight 20 of FIG. 22A may be applied in any of the devices described herein and is arranged as follows.

The waveguide 901 has an input end 902 extending in a lateral direction along the waveguide 901. An array of light sources 915 are disposed along the input end 902 and input light into the waveguide 1. The waveguide 901 also has opposed first and second guide surfaces 906, 908 extending across the waveguide 1 from the input end 2 to a reflective end 4 for guiding light input at the input end 2 forwards and back along the waveguide 1. In operation, light is guided between the first and second guiding surface 906, 908.

The first guiding surface 906 may be provided with a lenticular structure 904 comprising a plurality of elongate lenticular elements 905 and the second guiding surface 908 may be provided with prismatic structures 912 which are inclined and act as light extraction features. The plurality of elongate lenticular elements 905 of the lenticular structure 904 and the plurality of inclined light extraction features deflect input light guided through the waveguide 901 to exit through the first guide surface 906.

A rear reflector 903 that may be a planar reflector is provided to direct light that is transmitted through the surface 908 back through the waveguide 901.

Output light rays that are incident on both the prismatic structures 912 and lenticular elements 905 of the lenticular structure 904 are output at angles close to grazing incidence to the surface 906. A prismatic turning film 926 comprising facets 927 is arranged to redirect output light rays 234 by total internal reflection through the spatial light modulator 48 and compensated switchable liquid crystal polar phase control retarder 300.

Figure 22B:
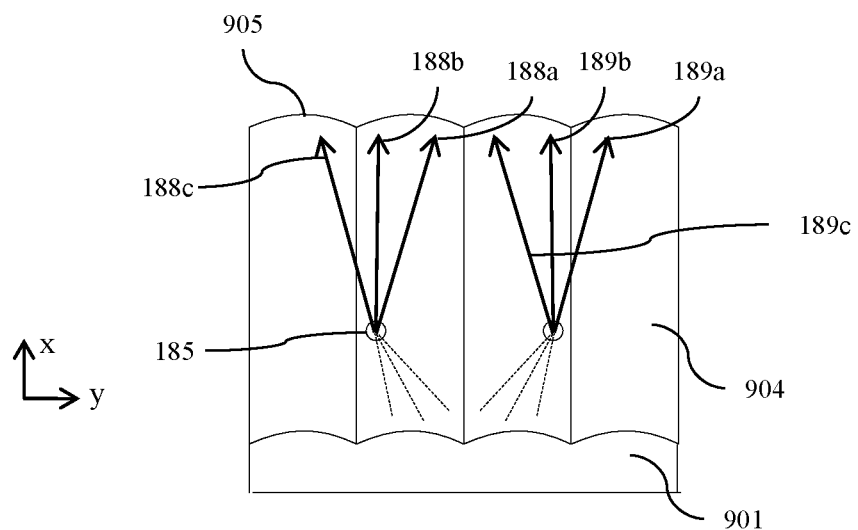
FIG. 22B is a diagram illustrating in top view output of a collimating waveguide.

FIG. 22B is a schematic diagram illustrating in top view output of the collimating waveguide 901. Prismatic structures 912 are arranged to provide light at angles of incidence onto the lenticular structure 904 that are below the critical angle and thus may escape. On incidence at the edges of a lenticular surface, the inclination of the surface provides a light deflection for escaping rays and provides a collimating effect. Light ray 234 may be provided by light rays 188*a-c* and light rays 189*a-c*, with incidence on locations 185 of the lenticular structure 904 of the collimated waveguide 901.

Figure 22C:
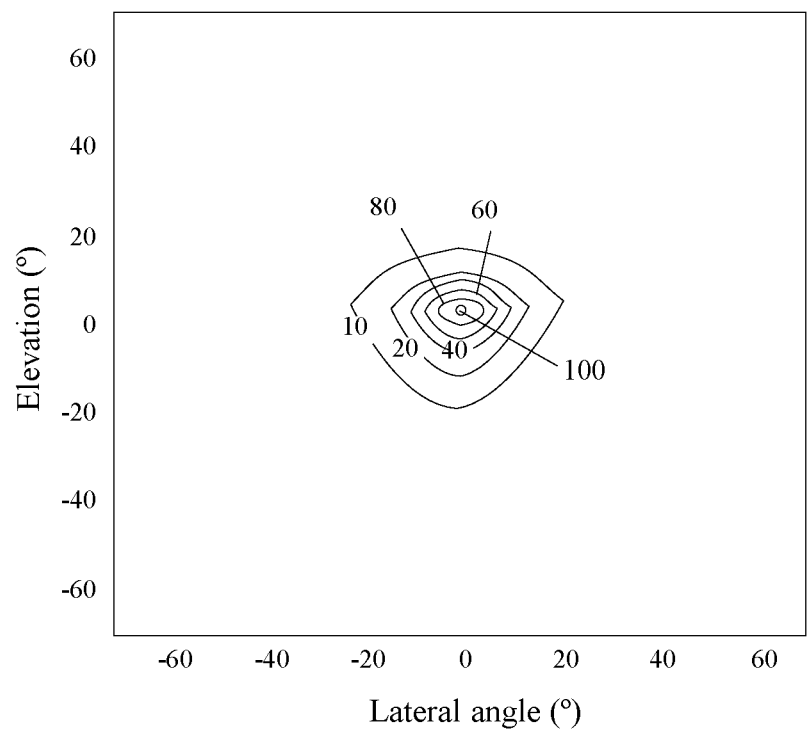
FIG. 22C is a graph illustrating an iso-luminance field-of-view polar plot for the display apparatus of FIG. 22A.

FIG. 22C is a schematic graph illustrating an iso-luminance field-of-view polar plot for the display apparatus of FIG. 22A. Thus a narrow output light cone may be provided, with size determined by the structures of the structures 904, 912 and the turning film 926. Features of the arrangements of FIGS. 22A-C not discussed in further detail may be assumed to correspond to the features with equivalent reference numerals as discussed above, including any potential variations in the features.

Advantageously in regions in which snoopers may be located with lateral angles of 45 degrees or greater for example, the luminance of output from the display is small, typically less than 2%. It would be desirable to achieve further reduction of output luminance. Such further reduction is provided by the compensated switchable liquid crystal polar phase control retarder 300 and additional polariser 318 as illustrated in FIG. 22A. Advantageously a high performance privacy display with low off-axis luminance may be provided over a wide field of view.

Directional backlights such as the types described in FIG. 21A and FIG. 22A together with the plural retarders 301, 330 of the present embodiments may achieve off-axis luminance of less than 1.5%, preferably less than 0.75% and most preferably less than 0.5% may be achieved for typical snooper 47 locations. Further, high on-axis luminance and uniformity may be provided for the primary user 45. Advantageously a high performance privacy display with low off-axis luminance may be provided over a wide field of view, that may be switched to a public mode by means of control of the switchable retarder 301 by means of control system 352 illustrated in FIG. 1A.

Figure 23:
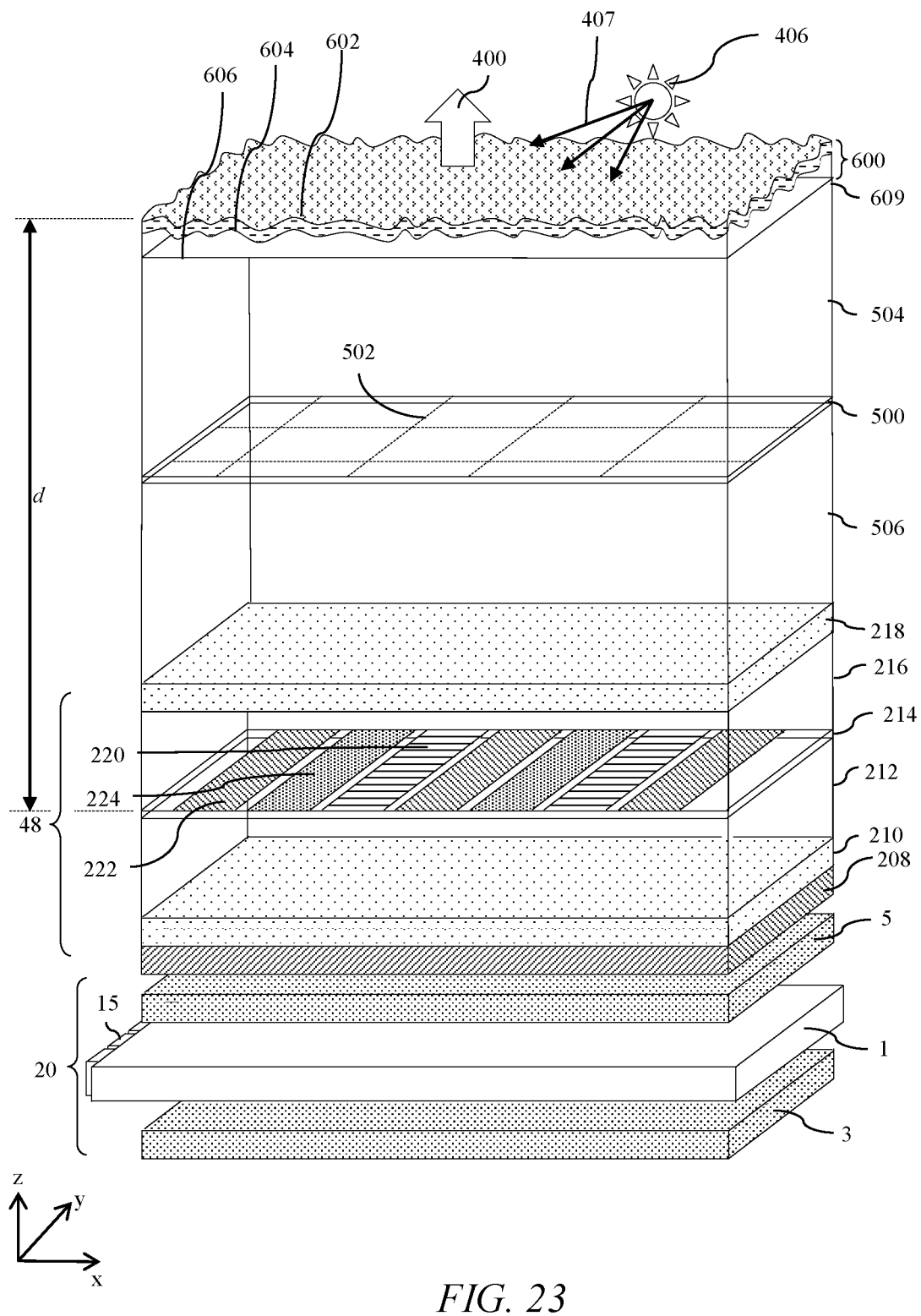
FIG. 23 is a diagram illustrating in side perspective view an alternative construction for a display device.

Although the above description relates to a display device 100 in which the output polariser is an additional polariser 318 that is used in combination with at least one polar phase control retarder 300 and the reflective polariser 302, this is not essential. In some alternative embodiments, the additional polariser 318, at least one polar phase control retarder 300 and the reflective polariser 302 may be omitted. In that case the output polariser may be the display polariser 218 that is an output polariser of the display. As an example of this, FIG. 23 is a diagram illustrating in side perspective view an alternative construction for the switchable privacy display 100 in which is the additional polariser 318, at least one polar phase control retarder 300 and the reflective polariser 302 are omitted. Features of the arrangement of FIG. 23 not discussed in further detail may be assumed to correspond to the features with equivalent reference numerals as discussed above, including any potential variations in the features.

FIG. 23 further illustrates a touch screen 500 with electrodes 502 arranged between the front surface 602 and the layer 214 of the spatial light modulator 48. The touch screen 500 may be arranged on support substrates 504, 406 such that the distance, d between front surface 602 of the output diffuser structure 600 and the pixels is relatively high. As illustrated in FIG. 3, such a large distance may provide increased blurring between adjacent pixels and loss of resolution for front surface diffusers. In the present embodiments, blurring is reduced and advantageously high image fidelity is achieved for high resolution images.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A display device for use in ambient illumination, the display device comprising:
   a spatial light modulator arranged to output light an output polariser arranged on an output side of the spatial light modulator, the output polariser being a linear polariser having an electric vector transmission direction; and
   an output diffuser structure arranged on the output side of the output polariser, the output diffuser structure comprising first and second structured output layers arranged on the output side of the output polariser, the first structured output layer being on the output side of the second structured output layer and having an output surface on the output side, and the first and second structured output layers comprising first and second transparent materials that have an interface surface therebetween, at least one of the first and second transparent materials being a birefringent material having an optical axis that is aligned parallel or orthogonal to the electric vector transmission direction of the output polariser,
   wherein:
   an output surface of the first structured output layer has a first surface relief profile;
   the interface surface has a second surface relief profile;
   the first surface relief profile and the second surface relief profile have the same, aligned shapes but with a relative scaling in amplitude along an axis normal to the plane of the output polariser so that the amplitude of the first surface relief profile is less than the amplitude of the second surface relief profile;
   for light output from the output polariser, the refractive index of the first transparent material is greater than the refractive index of the second transparent material;
   said relative scaling and said refractive indices of the first and second transparent materials are selected so that the output diffuser structure introduces no net angular deflection of light rays passed by the output polariser along an axis along a normal to the plane of the output polariser, and
   the display device further comprises at least one polar diffusion control retarder arranged between the output polariser and the output diffuser structure, wherein the at least one polar diffusion control retarder is capable of simultaneously introducing no net relative phase shift to orthogonal polarisation components of light passed by the output polariser along an axis along a normal to the plane of the at least one polar diffusion control retarder and introducing a relative phase shift to orthogonal polarisation components of light passed by the output polariser along an axis inclined to a normal to the plane of the at least one polar diffusion control retarder.

2. The display device according to claim 1, wherein the at least one polar diffusion control retarder comprises a switchable liquid crystal retarder comprising a layer of liquid crystal material, wherein the at least one polar diffusion control retarder is arranged, in a switchable state of the switchable liquid crystal retarder, simultaneously to introduce no net relative phase shift to orthogonal polarisation components of light passed by the output polariser along an axis along a normal to the plane of the at least one polar diffusion control retarder and to introduce a net relative phase shift to orthogonal polarisation components of light passed by the output polariser along an axis inclined to a normal to the plane of the at least one polar diffusion control retarder.

3. The display device according to claim 2, wherein the at least one polar diffusion control retarder further comprises at least one passive retarder arranged in series with the switchable liquid crystal retarder.

4. A display device for use in ambient illumination, the display device comprising:
   a spatial light modulator arranged to output light;
   an output polariser arranged on an output side of the spatial light modulator, the output polariser being a linear polariser having an electric vector transmission direction; and
   an output diffuser structure arranged on the output side of the output polariser, the output diffuser structure comprising first and second structured output layers arranged on the output side of the output polariser, the first structured output layer being on the output side of the second structured output layer and having an output surface on the output side, and the first and second structured output layers comprising first and second transparent materials that have an interface surface therebetween, at least one of the first and second transparent materials being a birefringent material having an optical axis that is aligned parallel or orthogonal to the electric vector transmission direction of the output polariser,
   wherein:
   an output surface of the first structured output layer has a first surface relief profile;
   the interface surface has a second surface relief profile;
   the first surface relief profile and the second surface relief profile have the same, aligned shapes but with a relative scaling in amplitude along an axis normal to the plane of the output polariser so that the amplitude of the first surface relief profile is less than the amplitude of the second surface relief profile;
   for light output from the output polariser, the refractive index of the first transparent material is greater than the refractive index of the second transparent material;
   said relative scaling and said refractive indices of the first and second transparent materials are selected so that the output diffuser structure introduces no net angular deflection of light rays passed by the output polariser along an axis along a normal to the plane of the output polariser;
   the spatial light modulator has a display polariser arranged on the output side thereof;
   the output polariser is an additional polariser arranged on the output side of the display polariser, the additional polariser being a linear polariser;
   the display device further comprises plural retarders arranged between the additional polariser and the display polariser; and
   wherein the plural retarders comprise at least one polar phase control retarder arranged that is capable of simultaneously introducing no net relative phase shift to orthogonal polarisation components of light passed by the display polariser along an axis along a normal to the plane of the at least one polar phase control retarder and introducing a relative phase shift to orthogonal polarisation components of light passed by the display polariser along an axis inclined to a normal to the plane of the at least one polar phase control retarder.

5. A display device for use in ambient illumination, the display device comprising:

a spatial light modulator arranged to output light;

an output polariser arranged on an output side of the spatial light modulator, the output polariser being a linear polariser having an electric vector transmission direction; and an output diffuser structure arranged on the output side of the output polariser, the output diffuser structure comprising first and second structured output layers arranged on the output side of the output polariser, the first structured output layer being on the output side of the second structured output layer and having an output surface on the output side, and the first and second structured output layers comprising first and second transparent materials that have an interface surface therebetween, at least one of the first and second transparent materials being a birefringent material having an optical axis that is aligned parallel or orthogonal to the electric vector transmission direction of the output polariser, wherein:

an output surface of the first structured output layer has a first surface relief profile;

the interface surface has a second surface relief profile;

the first surface relief profile and the second surface relief profile have the same, aligned shapes but with a relative scaling in amplitude along an axis normal to the plane of the output polariser so that the amplitude of the first surface relief profile is less than the amplitude of the second surface relief profile;

for light output from the output polariser, the refractive index of the first transparent material is greater than the refractive index of the second transparent material;

said relative scaling and said refractive indices of the first and second transparent materials are selected so that the output diffuser structure introduces no net angular deflection of light rays passed by the output polariser along an axis along a normal to the plane of the output polariser;

the spatial light modulator has a display polariser arranged on the output side thereof;

the output polariser is an additional polariser arranged on the output side of the display polariser, the additional polariser being a linear polariser;

the display device further comprises plural retarders arranged between the additional polariser and the display polariser; and the display device further comprises a reflective polariser arranged between the display polariser and the at least one polar phase control retarder, the reflective polariser being a linear polariser.

6. A display device for use in ambient illumination, the display device comprising:

a spatial light modulator arranged to output light;

an output polariser arranged on an output side of the spatial light modulator, the output polariser being a linear polariser having an electric vector transmission direction; and an output diffuser structure arranged on the output side of the output polariser, the output diffuser structure comprising first and second structured output layers arranged on the output side of the output polariser, the first structured output layer being on the output side of the second structured output layer and having an output surface on the output side, and the first and second structured output layers comprising first and second transparent materials that have an interface surface therebetween, at least one of the first and second transparent materials being a birefringent material having an optical axis that is aligned parallel or orthogonal to the electric vector transmission direction of the output polariser, wherein:

an output surface of the first structured output layer has a first surface relief profile;

the interface surface has a second surface relief profile;

the first surface relief profile and the second surface relief profile have the same, aligned shapes but with a relative scaling in amplitude along an axis normal to the plane of the output polariser so that the amplitude of the first surface relief profile is less than the amplitude of the second surface relief profile;

for light output from the output polariser, the refractive index of the first transparent material is greater than the refractive index of the second transparent material;

said relative scaling and said refractive indices of the first and second transparent materials are selected so that the output diffuser structure introduces no net angular deflection of light rays passed by the output polariser along an axis along a normal to the plane of the output polariser, the spatial light modulator has a display polariser arranged on the output side thereof;

the output polariser is an additional polariser arranged on the output side of the display polariser, the additional polariser being a linear polariser, the display device further comprises plural retarders arranged between the additional polariser and the display polariser, and wherein the at least one polar phase control retarder comprises a switchable liquid crystal retarder comprising a layer of liquid crystal material, wherein the at least one polar phase control retarder is arranged, in a switchable state of the switchable liquid crystal retarder, simultaneously to introduce no net relative phase shift to orthogonal polarisation components of light passed by the reflective polariser along an axis along a normal to the plane of the at least one polar phase control retarder and to introduce a net relative phase shift to orthogonal polarisation components of light passed by the reflective polariser along an axis inclined to a normal to the plane of the at least one polar phase control retarder.

7. The display device according to claim 6, wherein the at least one polar phase control retarder further comprises at least one passive retarder arranged in series with the switchable liquid crystal retarder.

* * * * *